(12) United States Patent
Hanna et al.

(10) Patent No.: US 6,761,308 B1
(45) Date of Patent: Jul. 13, 2004

(54) AUTOMATED MERCHANT BANKING APPARATUS AND METHOD

(75) Inventors: J. Richard Hanna, Massillon, OH (US); Randall W. Jenkins, Orrville, OH (US); Mark A. DePietro, Canton, OH (US); Alan J. Rozlosnik, Louisville, OH (US); Robert V. Artino, North Canton, OH (US); Steven R. Davis, North Lawrence, OH (US)

(73) Assignee: Diebold, Incorporated, North Canton, OH (US)

( * ) Notice: Subject to any disclaimer, the term of this patent is extended or adjusted under 35 U.S.C. 154(b) by 0 days.

(21) Appl. No.: 09/408,858

(22) Filed: Sep. 30, 1999

Related U.S. Application Data

(60) Provisional application No. 60/109,941, filed on Nov. 25, 1998, and provisional application No. 60/135,720, filed on May 25, 1999.

(51) Int. Cl.⁷ .............................................. G06F 17/60
(52) U.S. Cl. ........................ 235/379; 705/43; 348/150
(58) Field of Search ................................. 235/379, 380, 235/381, 382; 340/5.53, 5.83, 5.5; 705/43; 348/150, 143; 902/8, 9; 232/1 R, 1 D, 27; 346/22; 396/322, 332; 395/502; 271/225

(56) References Cited

U.S. PATENT DOCUMENTS

| | | | | |
|---|---|---|---|---|
| 3,039,582 A | * | 6/1962 | Simjian | 902/9 X |
| 3,173,742 A | * | 3/1965 | Simijian | 902/9 X |
| 4,245,902 A | * | 1/1981 | Cataldo et al. | 396/502 |
| 5,422,468 A | * | 6/1995 | Abecassis | 235/380 |
| 5,540,425 A | * | 7/1996 | Graef et al. | 271/225 |
| 5,589,855 A | * | 12/1996 | Blumstein et al. | 235/379 X |
| 5,673,333 A | * | 9/1997 | Johnston | 235/379 X |
| 5,774,058 A | * | 6/1998 | Henry et al. | 340/5.5 |
| 5,774,059 A | * | 6/1998 | Henry et al. | 235/380 X |
| 5,973,730 A | * | 10/1999 | Tranchita et al. | 348/143 |
| 6,164,529 A | * | 12/2000 | Peters et al. | 235/379 |
| 2003/0085266 A1 | * | 5/2003 | Simon | 232/27 |

FOREIGN PATENT DOCUMENTS

JP    9-16691 A   *  1/1997

OTHER PUBLICATIONS

D. B. Sharman, D. Zuckert, Self Service Document Processign for Banking Automation, 1995, IEEE, pp. 1–8.*

* cited by examiner

Primary Examiner—Jared J. Fureman
(74) Attorney, Agent, or Firm—Ralph E. Jocke; Daniel D. Wasil; Walker & Jocke

(57) ABSTRACT

An automated merchant banking apparatus (10) which is operative to carry out banking transactions commonly required by merchants. The apparatus includes a user interface (18) which includes a plurality of input and output devices. The apparatus further includes an item accepting depository (54) for accepting deposit items containing currency, instruments or other items of value. The apparatus includes cameras (58,326) for capturing images of a user and deposit items input by the user. The user and item inputs are stored in associated relation in a storage device. The images of the user and the deposit item are also output to the user simultaneously through a display (424) to assure the user that a record of the deposit transaction has been made.

27 Claims, 43 Drawing Sheets

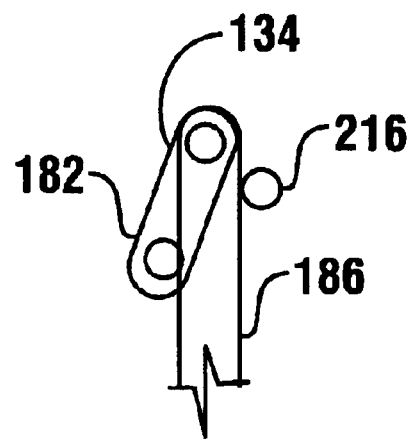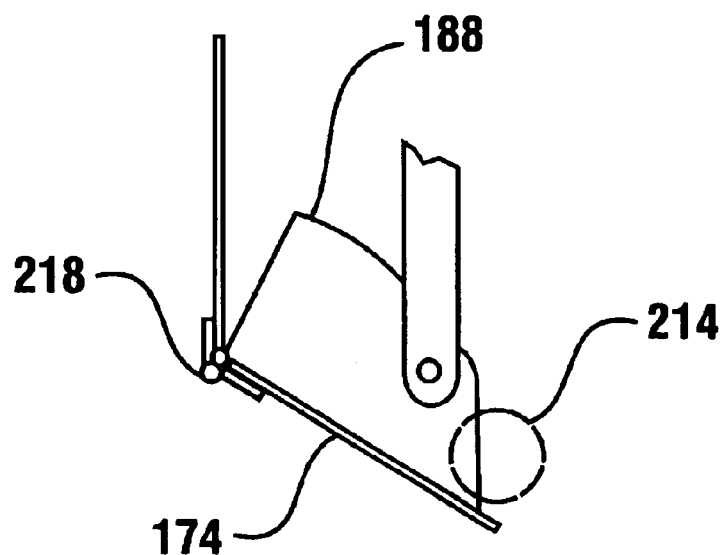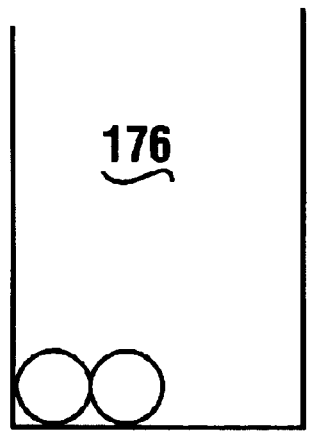
FIG. 17

```
            MERCHANT BANKING CENTER
            CHANGE TRANSACTION DATA

CARD #:           ----------6789
NAME:    OUR TERMINAL
LOCATION:    CANTON, OH
DATE        TIME                    SERIAL#
07/21/98    11:10am                 0057
------------------------------------------
             CHANGE REQUESTED
                         QTY       AMOUNT
$.01    ROLL             02         $1.00
$.05    ROLL             00         $0.00
$.10    ROLL             00         $0.00
$.25    ROLL             02        $20.00
$1      BILL            003         $3.00
$5      BILL            000         $0.00
$10     BILL            000         $0.00
$20     BILL            000         $0.00
------------------------------------------
             CHANGE DISPENSED
                         QTY       AMOUNT
$.01    ROLL             02         $1.00
$.05    ROLL             00         $0.00
$.10    ROLL             00         $0.00
$.25    ROLL             02        $20.00
$1      BILL            003         $3.00
$5      BILL            000         $0.00
$10     BILL            000         $0.00
$20     BILL            000         $0.00
------------------------------------------
CHANGE REQUESTED:                  $24.00
AMOUNT ACCEPTED:                   $25.00
SERVICE FEE:                        $1.00
CUSTOMER RECEIVED:                 $24.00
------------------------------------------
```

Money Exchange Transaction Receipt

Deposit Transaction Receipt

```
              RECONCILIATION REPORT

NAME:     OUR TERMINAL
TERMINAL LOCATION: CANTON, OH
DATE:     Jul 17, 1998
TIME:     1:52pm
SERVICED BY: 000000000000
------------------------------------------

CHANGE DISPENSED (INC DIVERTS)
------------------------------------------
           QTY              AMOUNT
  .01      10               $5.00
  .05      14               $28.00
  .10      13               $65.00
  .25      11               $110.00
  $1       121              $121.00
  $5       39               $195.00
  $10      43               $430.00
  $20      0                $0.00
------------------------------------------

CHANGE AVAILABLE
------------------------------------------
           QTY              AMOUNT
  .01      500              $245.00
  .05      500              $972.00
  .10      500              $2435.00
  .25      500              $4890.00
  $1       6000             $5879.00
  $5       3000             $14805.00
  $10      3000             $29570.00
  $20      0                $0.00
------------------------------------------

CURRENCY ACCEPTED
------------------------------------------
           QTY              AMOUNT
  $1       0                $0.00
  $2       0                $0.00
  $5       2                $10.00
  $10      7                $70.00
  $20      50               $1000.00
  $50      6                $300.00
  $100     0                $0.00
------------------------------------------

MISCELLANEOUS TOTALS
------------------------------------------
           QTY              AMOUNT
CURRENCY
DISPENSED  N/A              $954.00

CURRENCY
AVAILABLE  N/A              $59750.00

CURRENCY
ACCEPTED   65               $1055.00

FEES
ASSESSED   21               $40.00

VOUCHERS   0                $0.00
```

```
        DETAILED DEPOSIT REPORT

NAME:    OUR TERMINAL
TERMINAL LOCATION: CANTON, OH
DATE:    Jul 28, 1998
TIME:    3:16pm
SERVICED BY: 000000000000
------------------------------------------------

------------------------------------------------

DEPOSIT LOG
------------------------------------------------

ACCOUNT #:   1234567890123456789
TERMINAL ID: OUR TERMINAL
TERMINAL LOCATION: CANTON, OH
DATE:    Jul 28, 1998
TIME:    2:27pm
SERIAL#:    0010
DEPOSIT BAG ID:      55555
AMOUNT:    $450.00

------------------------------------------------

ACCOUNT #:   1234567890123456789
TERMINAL ID: OUR TERMINAL
TERMINAL LOCATION: CANTON, OH
DATE:    Jul 28, 1998
TIME:    2:30pm
SERIAL#:    0012
DEPOSIT BAG ID:      55555
AMOUNT:  $20.00

------------------------------------------------

TOTAL DEPOSITS:    0002
TOTAL AMOUNT:      $470.00
```

```
          DEPOSIT SUMMARY REPORT
.................................................

NAME:   OUR   TERMINAL
TERMINAL  LOCATION:  CANTON,   OH
DATE:      Jul 28,   1998
TIME:       3:16pm
SERVICED BY:   000000000000
.................................................
.................................................
              SUMMARY TOTALS
.................................................

TOTAL DEPOSITS:        0002
TOTAL AMOUNT:          $470.00
```
— 452

FIG. 59

AUTOMATED MERCHANT BANKING APPARATUS AND METHOD

This application claims the benefit of U.S. Provisional Application Nos.:

| APPLICATION NO. | FILING DATE |
|---|---|
| 60/109,941 | 11/25/1998 |
| 60/135,720 | 05/25/1999 |

TECHNICAL FIELD

This invention relates to automated banking machines. Specifically this invention relates to an automated banking machine for carrying out banking transactions of the types commonly carried out by merchants.

BACKGROUND ART

Automated banking machines are known in the prior art. The common type of automated banking machine is an automated teller machine (ATM). Automated teller machines have been developed to carry out banking transactions most commonly carried out by consumers. Such transactions include the withdrawal of funds from accounts, the deposit of funds, transfers of funds between accounts, the payment of bills and other types of banking transactions commonly carried out by consumers. Other types of automated banking machines that have been developed perform functions such as ticketing, the dispensing of travelers' checks and the providing of credit to a user for the purchase of merchandise. For purposes of this description an automated banking machine shall be considered to be any machine that carries out transactions involving transfers of value.

Automated banking machines generally have been ill-equipped for use by merchants. Merchants have requirements for different transaction types than the transactions that are commonly carried out by consumers. For example, ATMs commonly dispense one or two denominations of notes. Usually the consumer is not given any choice as to the denomination of notes they will receive from an ATM. This is because ATMs traditionally control the mix of bills dispensed to suit what is available. In contrast, merchants often require many denominations of notes so that they may make change for their customers. Merchants also commonly require specific quantities of notes of particular denominations. For example, a merchant may need many tens, fives and ones to provide as change. A merchant may not need many twenty or fifty dollar denomination notes because these are not needed to provide change as frequently.

ATMs commonly do not dispense or accept coins. Merchants often require coins for the conduct of their business. Merchants who need to provide change may require substantial quantities of coins in various denominations to serve their customers. Some merchants may also need to deposit coins received from customers into the bank. This would particularly be true for merchants who operate coin accepting machines. Most ATMs do not accept deposits of coins.

Merchants may also have a need to exchange currency for coins or to change one form of value for another. Conventional ATMs do not provide such capability. This has often required merchants to deal with live tellers. This can be inconvenient as banks are commonly open only during limited hours. Banks are also consolidating, which has resulted in the closing of many branches. Closed branches are often replaced with ATMs to serve consumers. However, the closing of branches makes it more difficult for merchants to find a full-service branch with human tellers who can serve their special needs.

Merchants also commonly maintain longer hours than banks. As a result, there is often a need for a merchant to deposit the day's receipts after the bank is closed. Night depositories have been installed in banks to enable merchants to place their receipts within the bank while the bank is closed. Night depositories are commonly installed through an exterior wall of a bank building so that items that have been deposited cannot be readily accessed by unauthorized persons. Some night depositories also require a key so they can be opened to insert deposits. Merchants authorized to deposit their receipts in the bank may access the night depository using a key provided to them by the bank.

A drawback associated with using night depositories is that the merchant receives no record of what has been deposited. If on the next business day the bank fails to find the merchant's deposit or if what the bank determines was deposited does not agree with the records of the merchant, disagreements may result. Disputes may also arise as to whether the person who is given the obligation to make the deposit actually did so. As the person in charge of making the deposit is provided with no record from a night depository as to what they deposited, such persons may be suspected of theft. For this reason, merchants commonly only entrust their most senior and trusted people to make deposits into night depositories. This can be costly because it diverts valuable resources of the merchant which could be better used for other purposes.

Thus, there exists a need for an automated merchant banking apparatus and method that satisfies the banking needs of merchants on an automated and more convenient basis.

DISCLOSURE OF INVENTION

It is an object of the present invention to provide an apparatus for carrying out banking transactions commonly required by merchants.

It is a further object of the present invention to provide an apparatus that both dispenses and receives currency in the form of notes and coins.

It is a further object of the present invention to provide an apparatus that can exchange currency or credit for notes or coins.

It is a further object of the present invention to provide an apparatus that accepts deposits of notes, cash, coins, credit slips, checks or other instruments.

It is a further object of the present invention to provide an apparatus that provides an operator with written documentation of the transactions they have conducted.

It is a further object of the present invention to provide an apparatus for carrying out merchant banking transactions that has an improved user interface.

It is a further object of the present invention to provide an apparatus that dispenses rolled coins and which provides for retracting coins which are not taken by a user.

It is a further object of the present invention to provide an apparatus for conducting merchant banking transactions that includes a novel enclosure which is compact, secure and attractive.

It is a further object of the present invention to provide an apparatus and system that notifies different selected entities of a variety of conditions or requirements which exist at the apparatus.

It is a further object of the present invention to provide an apparatus which communicates transaction messages to a remote computer which includes information as to the denominations of notes and coins which make up a deposit or withdrawal.

It is a further object of the present invention to provide a method of operating an automated merchant banking apparatus.

Further objects of the present invention will be made apparent in the following Best Modes For Carrying Out Invention and the appended claims.

The foregoing objects are accomplished in an exemplary embodiment of the apparatus and method of the present invention by an automated merchant banking apparatus. The apparatus includes a user interface. The user interface includes output devices such as a screen and/or audio speakers. The interface further includes input devices such as a card reader, a keypad, function keys and/or a touch screen. The interface is operative to provide instructions to and to receive inputs from users. The interface is operatively connected to one or more terminal processors which are in operative connection with one or more data stores. The data stores include instructions for operating the apparatus in response to various inputs and conditions. The data store further includes records pertaining to transactions conducted using the apparatus as well as data corresponding to connected computers and systems with which the apparatus may exchange messages for carrying out transactions.

The terminal processor is in operative connection with a variety of transaction function devices. The transaction function devices include a note dispenser which selectively dispenses several common varieties of currency notes. The terminal processor is further in operative connection with a note acceptor. The note acceptor is operative to identify and validate a number of different denominations of currency notes. Valid currency notes are accepted into the machine and the user is afforded a corresponding credit.

The merchant banking apparatus of the exemplary embodiment of the present invention further includes a rolled coin dispenser. The rolled coin dispenser dispenses coin rolls in various denominations. The rolled coin dispenser is operative to present coins to a user. If the user fails to take any of the presented rolls a mechanism retracts them into the machine.

The merchant banking apparatus of the exemplary embodiment of the present invention further includes a depository. The depository is operative to receive deposit envelopes in some exemplary embodiments. In other embodiments the depository is operative to receive instruments such as checks, and to cancel such checks and to generate and store images of the deposited instruments.

The merchant banking apparatus of an exemplary embodiment further includes a bag depository. The bag depository is operative to accept and secure the deposited parcels containing cash, coin, credit slips, checks and the like.

The exemplary form of the invention enables a merchant user to receive selected quantities and denominations of coins and notes: The user may pay for these notes either with cash, which is accepted by the note acceptor, or by using a card based account, such as an account associated with a debit or credit card. The user may also make deposits in the form of envelopes or instruments into the depository. A user may further make deposits of large parcels into the bag depository. Using the interface of the machine, the user is enabled to specify precisely what is deposited into the machine and is provided with detailed receipts concerning the deposit. The user is further afforded the opportunity to obtain multiple receipts for a single deposit so that the user may deliver at least one of the receipts to their employer to evidence the making of the deposit, and also maintain at least one for their records in the event the one provided to their employer is lost.

The exemplary embodiment of the present invention further provides a visually reproducible record associated with deposit transactions. This includes in the case of bag deposits, for example, concurrent images or combined images of both the user making the deposit as well as what is deposited. These concurrent images are presented to the user on the screen of the device at the time of the deposit to provide the user further assurance that the deposit is documented. Such records pertaining to deposits may be stored along with transaction information as stored data in the memory in the apparatus, or at another location. This enables the operator of the apparatus to review both transaction and visual image data pertaining to such transactions.

The exemplary embodiment of the present invention further enables the operator of the merchant banking apparatus to monitor levels of dispensed items such as currency and coin. Appropriate entities are given notice selectively concerning the need to replenish such items. Similarly, the exemplary embodiment of the invention monitors the level of deposits accepted by the note acceptor, envelope or instrument depository and bag depository. Appropriate personnel are selectively given notice of the need to service or take action to remove accumulated deposits.

The exemplary form of the automated merchant banking apparatus and method enables merchants to carry out transactions on an automated basis that are necessary to support their business activities. Transactions can be carried out at the convenience of the merchant to conform to their hours of operation. Further, the automated merchant banking apparatus of the exemplary embodiment is secure yet relatively economical to produce and operate. The apparatus can be deployed in locations convenient to many merchants.

BRIEF DESCRIPTION OF DRAWINGS

FIG. 17 is a schematic view of the roll coin retraction unit in a position for supporting coin rolls for presentation to a user.

FIG. 44 is an exemplary money exchange transaction receipt output by the exemplary embodiment.

FIG. 57 is an exemplary reconciliation report produced responsive to transactions conducted at the apparatus shown in FIG. 1.

FIG. 58 is an exemplary detailed deposit report output responsive to transactions conducted at the apparatus shown in FIG. 1.

FIG. 59 is an exemplary deposit summary report summarizing deposit transactions conducted at the apparatus shown in FIG. 1.

BEST MODES FOR CARRYING OUT INVENTION

Figure 1:
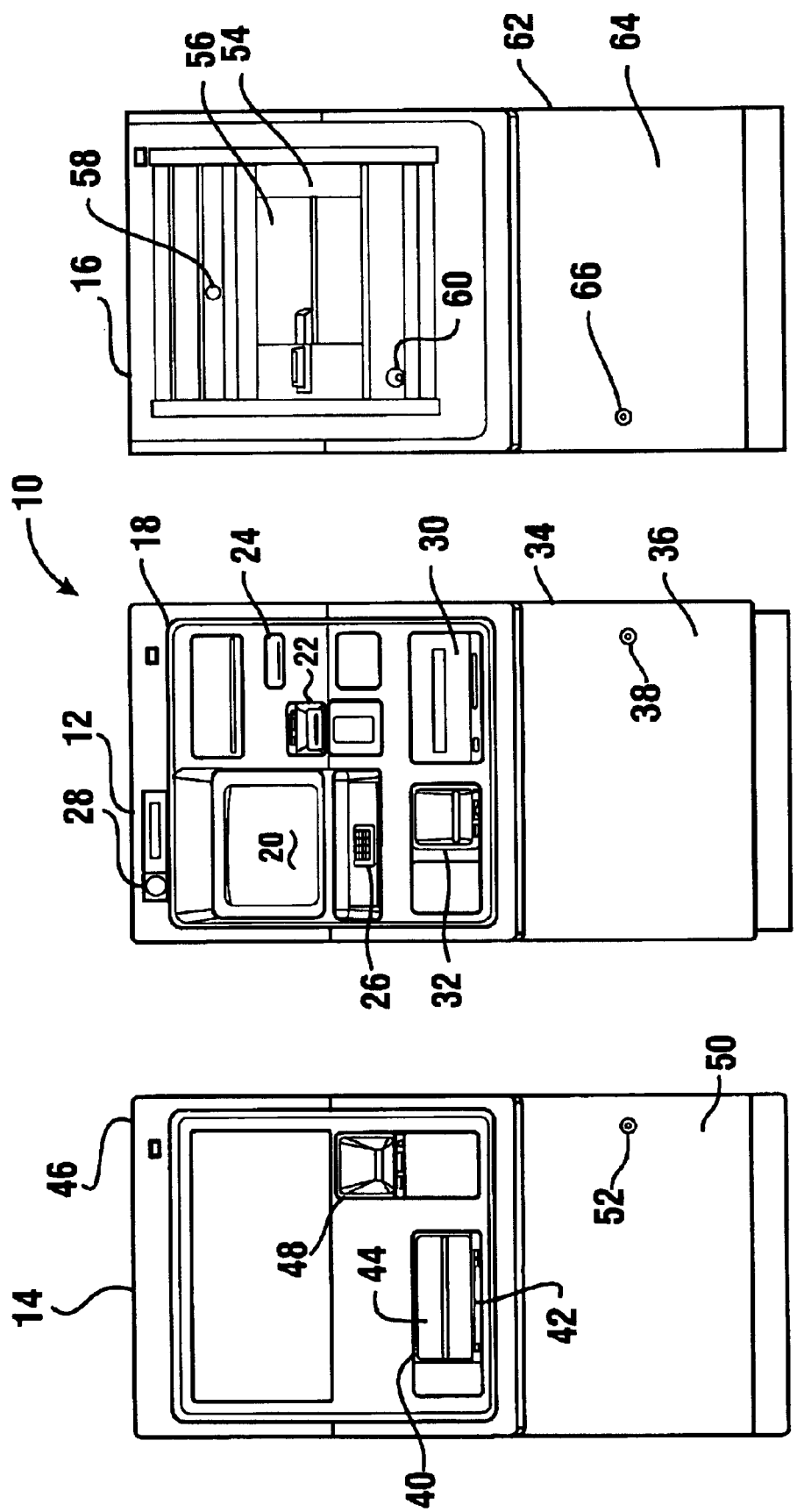
FIG. 1 is a front plan view of an exemplary embodiment of an automated merchant banking apparatus of the present invention.

Referring now to the drawings and particularly to FIG. 1, there is shown therein an exemplary automated merchant banking apparatus of the present invention generally indicated 10. The apparatus of this exemplary embodiment includes a first housing portion 12. Apparatus 10 further includes a second housing portion 14 and a third housing portion 16. It should be understood that while the exemplary embodiment of the apparatus includes three (3) separate housing portions, other embodiments may have a single housing portion or other multiples of separate housings.

First housing portion 12 has in supporting connection therewith a user interface 18. Interface 18 includes input and output devices for providing communications to and for receiving instructions from users of the apparatus. The exemplary user interface 18 includes a screen 20. Screen 20 serves as an output device for providing visual instructions to a user. In an exemplary embodiment, screen 20 is a touch screen and also serves as an input device for receiving inputs when a user brings their finger adjacent to selected areas of the screen.

Interface 18 also includes a card reader schematically indicated 22. Card reader 22 receives inputs from indicia recorded on cards or other articles inserted by users. In the described embodiment card reader 22 is operative to read indicia encoded on a magnetic stripe card. In alternative embodiments card reader 22 may be operative to read information recorded in other forms such as information stored on a chip of a "smart card," optical indicia encoded through bar coding or other optical indicia or other types of information recorded on a card-like article. The particular type of card reader or similar reading device used depends on the requirements of the machine.

Interface 18 further includes a printer schematically indicated 24. Printer 24 is operative to deliver printed articles through a printer slot shown in the interface of the machine. Printer 24 is operative to deliver a plurality of different types of printed documents to a user, examples of which are later described.

Interface 18 further includes a keypad 26. Keypad 26 is operative to accept manual inputs from a user operating the machine. It should be understood that while in the exemplary embodiment shown, a telephone type keypad is used, other embodiments of the invention may include typewriter type keyboards and other types of key sets including function keys or other types of instruction keys. The type of keypad and/or other input keys used will depend on the types of inputs that are required to be received for operation of the machine.

It should be understood that the input and output devices described in connection with the apparatus are exemplary and other embodiments may include additional and other types of input and output devices. Such devices may include, for example, audio output devices, touch sensitive output devices and other devices for indicating information to a user. Likewise, other types of input devices may be used for receiving information from users. These may include, for example, visual input devices, audio input devices, a mouse, fingerprint, iris, retina or other biometric reading devices and other types of devices which are capable of receiving information or instructions from the user.

First housing portion 12 further includes a camera 28. Camera 28 in this exemplary embodiment serves as an input device for capturing images of persons conducting transactions at the machine. In alternative embodiments camera 28 may function as part of a user identification system which is used for identifying users by their appearance and voice such as is shown in U.S. patent application Ser. No. 09/037, 559 filed Mar. 9, 1998, now U.S. Pat. No. 6,023,688, the disclosure of which is incorporated herein by reference.

Apparatus 10 further includes a note dispenser schematically indicated 30. Note dispenser 30 is operative to dispense various denominations of notes to users of the apparatus in response to instructions input to the machine. Note dispenser apparatus 30 may have various forms, such as a mechanism that dispenses notes of various denominations from storage canisters housed within the housing of the machine. Alternative embodiments of the invention may include note dispensers that have the capabilities of both accepting, identifying, storing and dispensing notes such as is shown in U.S. patent application Ser. No. 60/067,319 filed Nov. 28, 1997, or U.S. patent application Ser. No. 08/980,467 filed Nov. 28, 1997, both of now U.S. Pat. No. 6,273,413, which are owned by the Assignee of the present invention and which are incorporated herein by reference as if fully rewritten herein.

Apparatus 10 further includes a depository schematically indicated 32. Depository 32 in embodiments of the invention may include a depository for accepting envelope-type deposits. Envelope-type deposits may include cash, checks or other items representative of value which are inserted and stored in depository envelopes. Alternatively or in addition, depository 32 may include a depository mechanism for accepting and identifying instruments such as checks, such as a mechanism of the type shown in U.S. Pat. No. 5,422, 467, the disclosure of which is incorporated herein by reference as if fully rewritten herein.

Depositories which are operative to accept instruments such as checks may be operative to cancel and image such instruments. Such mechanisms may be further operative to generate messages which enable the machine to credit the user's account responsive to the information which is obtained from the instruments through their processing in the-machine. It should be understood that the cash accepting and/or dispensing functions as well as the instrument accepting and imaging functions may be carried out using a single mechanism such as is shown in U.S. patent application Ser. No. 08/980,467 which is incorporated herein by reference. Of course, other types of depository and dispensing mechanisms may be used.

Figure 27:
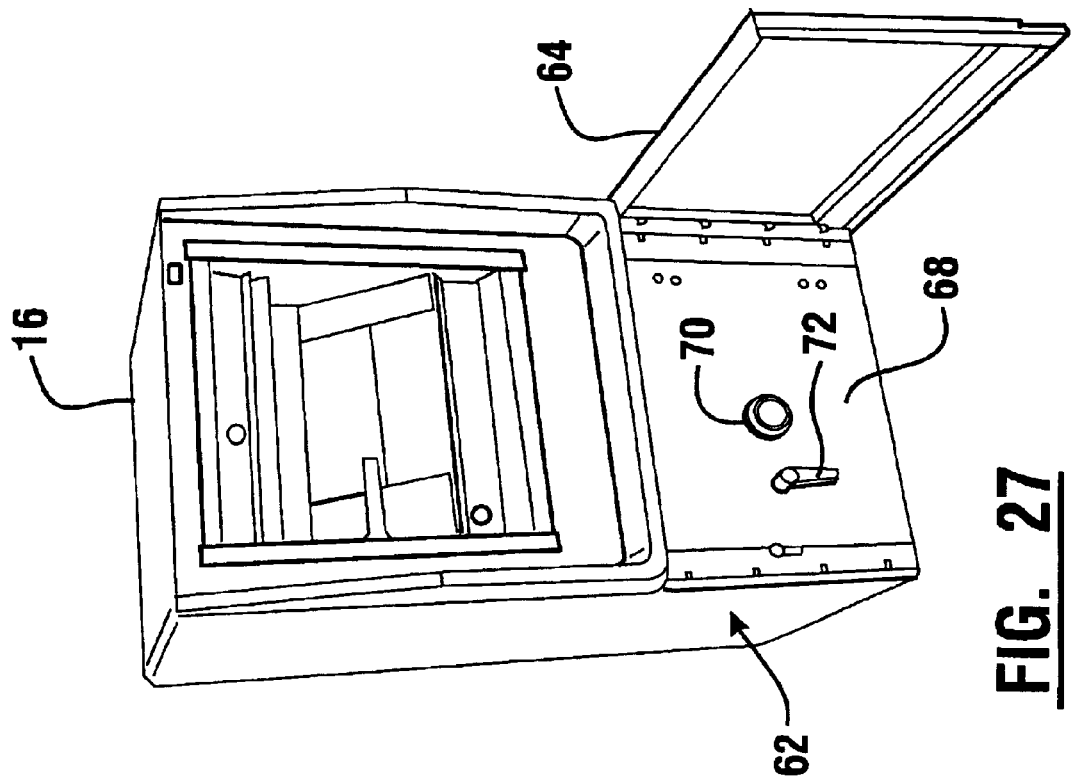
FIG. 27 is a view similar to FIG. 26 with the lower fascia door shown in an open condition.

Apparatus 10 further includes in first housing portion 12 a secure chest portion 34. Secure chest portion 34 resides in the lower portion of housing portion 12 in the exemplary embodiment and is used to secure notes for later dispense as well as deposited items therein. A fascia cover 36 overlies a door which can be opened by authorized persons to obtain access to the interior of the secure chest portion. The fascia cover 36 has a lock 38 thereon. Lock 38 can be opened by persons having a key thereto. Once the fascia cover is opened with the key, access to the outer face of the door of the secure chest is obtained. In this condition the handle and dial input device for the lock are exposed. A similar handle and dial input device along with a fascia cover are employed on third housing portion 16. FIG. 27 shows the fascia cover on that housing in an open position with the dial and handle of a secure chest door exposed thereon. Authorized personnel who have the key to lock 38 as well as the combination which enables accessing the chest portion of housing portion 12 are enabled to access the notes, instruments and other items stored in the chest. Such persons are enabled to remove and/or replenish such items. It should be understood that in some embodiments the same individuals may be authorized to access and service components within all of the housing portions of the apparatus, while in alternative embodiments different persons may be authorized to access the interior of certain housing portions and not others.

Second housing portion 14 includes a rolled coin dispenser unit schematically indicated 40. Rolled coin dispenser unit is operative to selectively dispense various denominations of coin rolls. As later described in detail, the rolled coin dispenser is in operative connection with a coin presenter and retraction unit 42 that enables users to access dispensed coin rolls and retracts untaken coin rolls into an area of the machine that is not generally accessible by a user. The coin presenter and retraction unit generally includes a door 44 in overlying relation thereof. The coin presenter and retraction unit is accessible through an opening in a movable fascia cover unit 46 that is later described in detail. The movable fascia cover unit is operative to move outward responsive to unlocking a door which secures an interior area of second housing portion 14. The outward movement of the movable fascia cover unit enables the unit to be opened without interfering with other components of the apparatus.

The apparatus further includes a note acceptor schematically indicated 48. Note acceptor 48 is operative to accept and identify various denominations of currency bills inserted by user. As later discussed, the note acceptor 48 is further operative to credit a user for the value of accepted notes. A user may use the credit for purposes of exchanging such notes for other denominations of notes or rolled coin, or for crediting the user's account. In alternative embodiments the note acceptor may be combined with a note dispenser 30 and/or the instrument acceptor 32 which operate in the manner of the devices described in the disclosures which are incorporated herein by reference.

Second housing portion 14 further includes a fascia cover 50. Fascia cover 50 can the opened by opening a lock 52 which can be opened by authorized persons. Opening lock 52 enables a fascia cover 50 to be moved to expose a combination dial of a lock, and a handle or other mechanism that can be used for opening a door overlying the interior of second housing portion 14.

Third housing portion 16 includes a bag depository. The bag depository includes a depository head portion 54. Depository head portion 54 includes a movable door 56 which covers an access opening 57. Door 56 can be opened by persons authorized to make deposits into an interior area inside the apparatus. Depository head portion 54 further includes a camera 58 which serves as an external imaging device which has a field of view which includes an exterior area outside the housing of the apparatus and is operative to capture images of persons making deposits therein in a manner later discussed. Depository head portion 54 in the exemplary embodiment further includes a key lock 60. Key lock 60 may be operated by keys inserted by authorized persons. In certain embodiments the appropriate key must be inserted before the bag depository door 56 can be opened. Alternatively, the bag depository door may be opened without a key as a result of inputs to the user interface. The apparatus may alternatively be configured to require both appropriate inputs to one or more input devices of the user interface and a key to make deposits.

The third housing portion 16 of the apparatus further includes a chest portion schematically indicated 62. Chest portion 62 is an internal area of the housing operative to securely hold bags of deposited materials that have been deposited into the apparatus. A fascia cover 64 overlies a chest door of the chest portion. Fascia cover 64 includes a lock 66 which can be opened by authorized persons to provide access to the components which control access to the interior of the secure chest.

FIG. 27 shows housing portion 16 with the fascia cover in an open position. A chest door 68 overlies the chest portion 62 of the housing 16. A combination accepting dial 70 can be used to input combinations. If the correct combination is input, a handle 72 connected to an appropriate boltwork will move the mechanisms holding door 68 in a closed position and enable door 68 to be opened. Opening door 68 enables removal of the bag deposits from an interior area of the housing. After such bag deposits have been removed, the door 68 may be closed and the boltwork resecured. As previously discussed, housing portion 12 may have a similar secure door. The boltwork and locking mechanism used to secure the doors overlying the housings may be similar to that discussed later in connection with housing portion 14 or may be any other suitable locking mechanism and boltwork for purposes of securing the doors.

Figure 2:
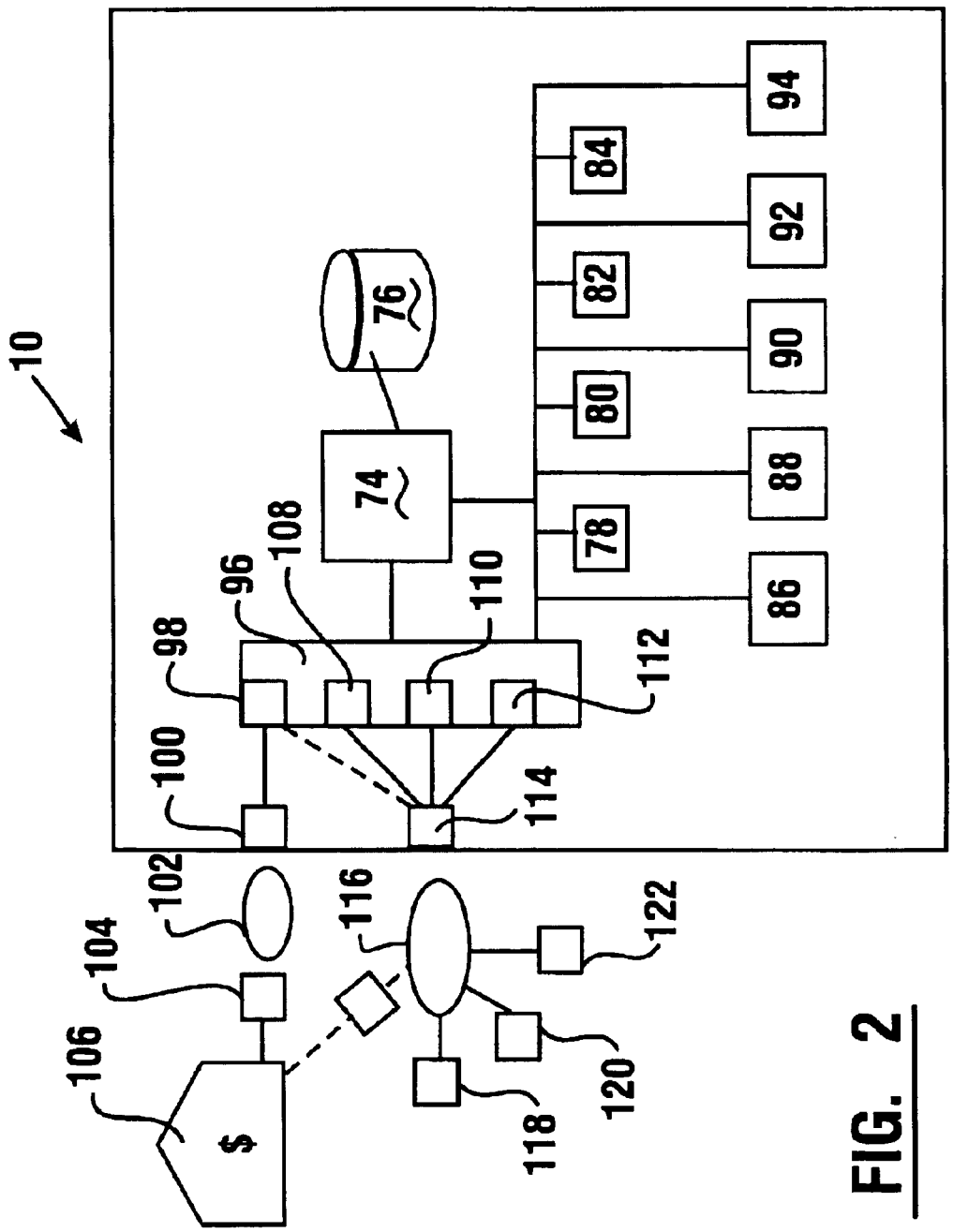
FIG. 2 is a schematic view of hardware and software components which comprise the apparatus shown in FIG. 1 and an exemplary system in which it is operated.

FIG. 2 shows a schematic view of hardware and software components of the apparatus 10. Apparatus 10 includes a terminal processor schematically indicated 74 which serves as a controller for controlling devices in the apparatus. Terminal processor 74 may be a single computer or may include one or more processors or computers which are operative to control the operation of the apparatus.

Terminal processor 74 is in operative connection with one or more data stores 76. Data store 76 is operative to hold programmed instructions for controlling operation of the apparatus as well as records including information concerning transactions conducted at the apparatus. Terminal processor 74 is in operative connection through appropriate interfaces with transaction function devices 78, 80, 82, 84, 86, 88, 90, 92 and 94. Transaction function devices include devices that are operative to carry out activities related to transaction functions in the machine. The transaction function devices may include for example the input and output devices of the interface 18. The transaction function devices may further include items such as the printers 24, cameras 28, 58 and other devices. The transaction function devices may further include note dispenser 30, depository 32, note acceptor 48 and other devices which are operative to either provide or accept notes or other instruments from users of the machine. The transaction function devices further include roll coin dispenser 40, bag depository head portion 54 and other devices within the machine. The transaction function devices include devices which are controlled or which receive information from one or more terminal processors 74 are required to control or receive information from in the operation of the machine. The particular types of transaction function devices used in the machine depends on the particular apparatus and the transaction functions that it carries out.

In alternative embodiments each transaction function device may have its own processor(s) and data store(s) for purposes of identifying itself to other connected devices, for controlling the associated hardware in response to transaction events and for generating events to which other devices may react. An exemplary system of connected devices of this type may operate using Jini™ technology from Sun Microsystems. Systems which are connected with such devices may not require a separate device for carrying out the functions of the terminal processor 74. Rather these functions may be accomplished by the multiple processors and data stores distributed among the transaction function devices, each of which serves as a terminal processor. Those skilled in the art may devise other processor configurations for control and coordination of operation between the transaction function devices.

The terminal processor 74 as well as the transaction function devices of the exemplary embodiment shown in FIG. 2 are in operative connection with one or more communication subsystems schematically indicated 96. The communication subsystem provides communication between the apparatus and other components with which the apparatus must communicate to carry out transactions. Subsystem 96 includes for example a software driver 98. Software driver 98 communicates through an interface device 100 with a communications network 102. Communications network 102 in this exemplary embodiment may be an ATM communications network or one or more networks such as CIRRUS®, PLUS® or other suitable communications network. The network is connected through an interface 104 to a source of monetary value schematically indicated 106. The source of monetary value 106 may be a bank or other electronic clearing house, credit card processor or similar entity which through a computer connection is operative to transfer funds between accounts.

In the exemplary embodiment one or more sources of monetary value are accessible through the network 102. The sources affect the transfer of funds between the accounts associated with the merchants who use the merchant banking apparatus and the customers of such merchants who have provided payments through credit slips, checks or other instruments deposited in the apparatus. Such transfers may occur virtually instantaneously or on a periodic batch basis electronically when the apparatus has the capability of automatically reading such instruments. If the apparatus does not have such capabilities the credits are made after the deposits are reviewed and verified. A plurality of sources of monetary value 106 may be connected to the machine through the network. Such entities are capable of transferring funds between the accounts of the user and entities with which the user has accounts, as well as the operator of the banking apparatus, so as to account for funds deposited into or taken from the banking apparatus by the user. Various approaches for connecting to sources of monetary value may be used with various embodiments of the invention. These may include for example, lease line connections, dial-up connections, or wireless connections to local and wide-area networks.

The communication subsystem of the exemplary embodiment further includes servers 108, 110 and 112. Servers 108, 110 and 112 are operative to communicate through a communications interface 114 with a network 116. Network 116 may be any suitable local or wide-area network for communicating messages. Network 116 may include the Internet. In this exemplary embodiment network 116 is a network suitable for communicating TCP/IP messages to a variety of remote servers and computers schematically indicated 118, 120 and 122. As schematically indicated in FIG. 2, the sources of monetary value 106 may also be accessible through a network 116 rather than through a separate network connection as previously discussed.

Embodiments of the invention may communicate messages between the apparatus 10 and remotely connected servers in the manner described in U.S. patent application Ser. No. 09/077,337 filed May 27, 1998, the disclosure of which is incorporated by reference as if fully rewritten herein. In the manner of the incorporated disclosure, apparatus 10 may communicate with various servers operated by financial institutions or other sources of monetary value schematically indicated 118 in FIG. 4. Such sources of monetary value may include a server operated by the bank of the particular merchant user of the machine. The server operated by the merchant's bank may have a particular "home page" or series of pages including HTML, XML or other mark up language documents which make up an application. This application when accessed using a browser operative in a processor of the banking apparatus provides a user interface tailored to the particular merchant user of the machine. The pages may include programs or instructions for carrying out transactions and/or for operating transaction function devices. This may facilitate operation of the apparatus by the merchant and their employees.

Such a customized user interface application may be particularly useful where a merchant user has particular types of documents to be deposited or other types of transactions that may not be common to other merchant users of the machine. This approach enables the presentation of user interfaces which use terminology that will be known to employees of the particular merchant user because they are used in connection with the operations of the user. This may include, for example, deposits of particular types of discount or promotional coupons, vouchers, scrip, or other things that the merchant user may accept as payment for goods or services. It may alternatively involve different language screens for persons whose primary language differs from most users. Such customized interfaces facilitate the operation of the machine by each particular user.

The interfaces and applications may be designed to carry out transactions using the nomenclature and/or trademarks utilized by the merchant user. For example, a user may have certain practices in which it places predetermined types or amounts of items in combination or together as a named article. For example, a merchant user may place a certain type and/or amount of currency in a blue bag, another type and/or amount in a red bag, credit card vouchers from MasterCard® credit cards in a white bag and other types and/or amounts of things in other colored deposit bags. The application may operate to cause the user interface to present instructions for deposit transactions using terminology which refers to the colored bags. The application may also calculate deposit types and amounts based on inputs corresponding to the merchant's nomenclature. Of course the bag example is one of many possible arrangements and business methods under which a merchant may have unique nomenclature or unique things (or collections of things) the merchant has defined. The merchant's unique application preferably uses this nomenclature and knowledge of its meaning in program logic to present an interface that is easy for the merchant's employees to understand and which can carry out any unique transactions or calculations that may be required for the particular merchant's transactions.

Another example of a particular merchant user application may be one where the user has certain types of receipts which are subject to tax, duty or tariff, such as a sales tax, and other types of receipts that are not. Alternatively, the merchant may provide different items that may be subject to taxes, duties or tariffs at different rates. The merchant may segregate receipts on this basis or otherwise categorize the amount of such receipts. The merchant's customized application may be prepared to accept the input of amounts in such multiple categories. The application may also operate to calculate and escrow the amounts of the taxes, duties or tariffs, and/or may coordinate with other systems to electronically transfer the correct portions of the deposited funds to the appropriate collection authorities.

Other examples of customized applications and interfaces may account for the escrowing of amounts paid but not yet earned, as well as for later transfers from escrow accounts to other accounts. Other customized merchant applications may account for the payment of royalties on certain types of receipts, for example a franchisee who pays royalties in calculated amounts to a third party on at least some types of receipts. Other merchants may be entitled to rebates or incentives from third parties on certain types of receipts or for compensation due to acceptance of coupons. Applications for such merchants may include the input of pertinent amounts or other data related to such items and the calculation of the amount of credits or rebates. The application may also operate to coordinate with other systems to receive and transfer the amounts due to the merchant.

Customized merchant applications may also be integrated with computer programs and systems run by the merchant or with third parties to facilitate other activities. Such activities may involve tax calculation and payment on behalf of the merchant, inventory tracking and/or theft or fraud detection. The applications described herein are merely exemplary of the types and uses of customized merchant applications for the merchant banking apparatus of the invention.

Alternatively, or in addition, the automated banking machine may include a contact or non contact input device such as an infrared coupler or a data port. The merchant may load data needed by a customized or non customized merchant banking application into a portable memory module. The portable memory module may be a hand held device or may be attached to an article to be deposited. The portable module may include a processor connected to the memory and couplers appropriate for communication. The module may be used to provide inputs to the banking machine in place of at least some manual and card inputs. This speeds transaction times. The machine may in addition receive and/or store certification data in the memory of the module to serve as documentation that the information in the module was communicated to the machine.

The apparatus 10 and its associated terminal processor of the exemplary embodiment shown may further operate in the manner of the incorporated disclosure or through other means to connect to remote marketing servers 120. Marketing servers 120 may be selectively accessed based on rules established by the operators of the machine 10 and the network 16 to provide information which may be of interest to merchant users of apparatus 10. Such information may include, for example, opportunities for loan terms or investments available to small business people which are offered by financial institutions. Such connections may be based on the identity of the particular user operating the machine as determined through the indicia encoded on a card or other information presented to input devices of the apparatus. Marketing servers 120 may be operatively connected to one or more marketing databases 122 to determine appropriate presentations to provide to each particular user of the machine. Such presentations may be made during dwell times during transactions at the apparatus 10, such as when the apparatus is waiting for a response from a remote computer, or at other times as may be appropriate. In certain embodiments the presentations made through the marketing servers are directed specifically at the user on a target market or segment of one basis so as to tailor the presentations to the expected needs or interests of the user.

Figure 3:
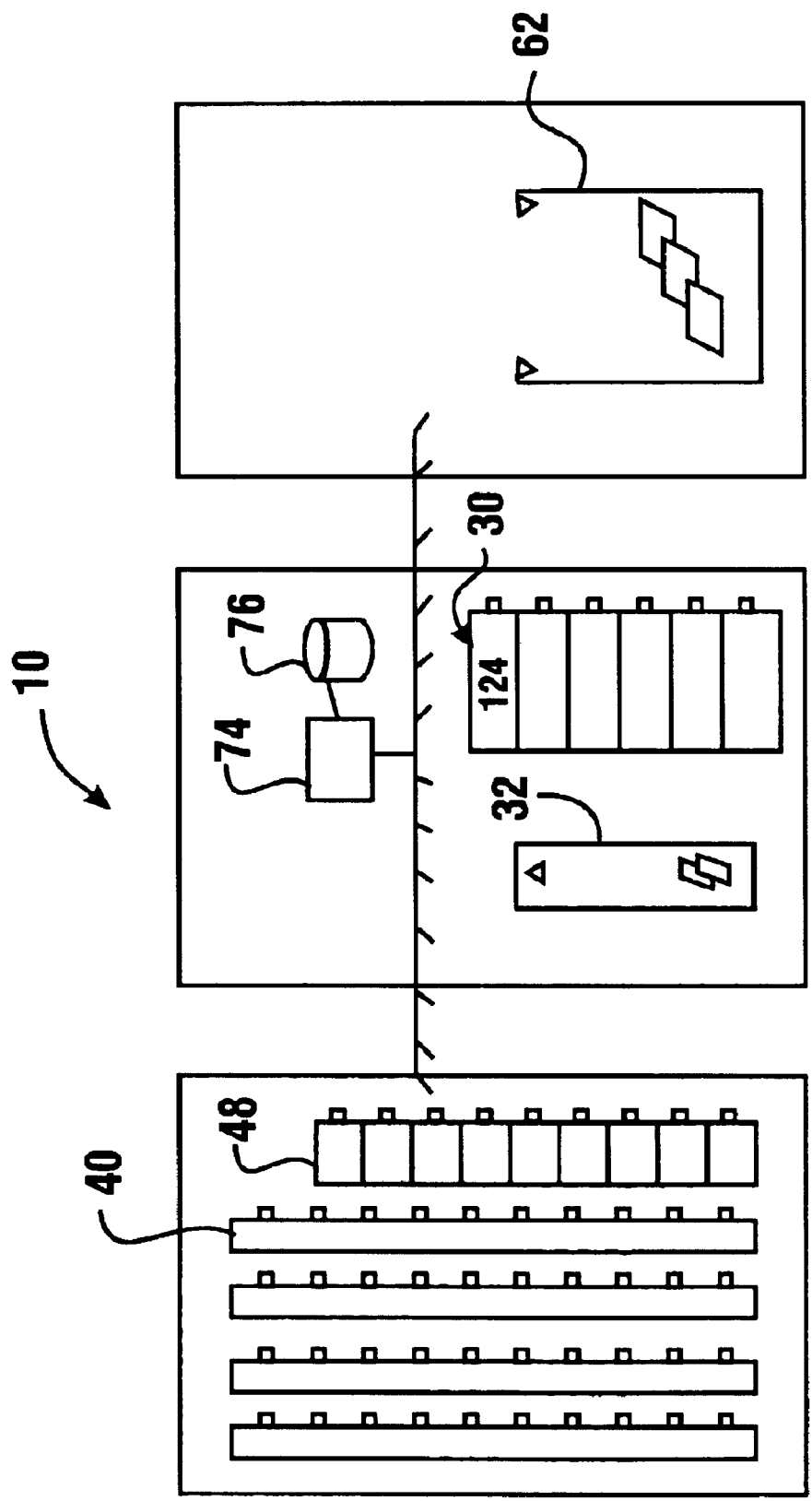
FIG. 3 is a schematic view of exemplary transaction function devices included in the apparatus shown in FIG. 1.

As schematically represented in FIG. 3, the terminal processor 74 is operatively connected to sensors. The sensors sense conditions of transaction function devices. For example, the transaction function devices may include note dispensing mechanisms 30 which have note containing canisters 124. The note containing canisters may be of the type shown in U.S. Pat. No. 4,871,085, the disclosure of which is incorporated herein by reference. Such note containing canisters 124 include indicators which provide signals representative of quantities of notes remaining in such canisters. The terminal processor is operative to receive such signals and to take action in accordance with the programs stored in its data store 76.

Likewise, the terminal processor 74 is in operative connection with other sensors in various transaction devices. For example, a sensor in depository 32 may be operative to provide signals indicative of the depository approaching a filled condition necessitating removal of items deposited therein. Similarly, note acceptor 48 is operative to indicate to the terminal processor 74 signals indicative of a status thereof. Similarly, the roll coin dispensers 40 and the chest portion 62 of the bag depository have sensors operatively connected therewith and provide signals indicative of status or other operational information to the terminal processor 74. The terminal processor 74 operates responsive to the receipt of such signals in accordance with its programming to notify appropriate entities.

Terminal processor 74 is operative to generate messages in response to the signals it receives from the transaction function devices. These messages are delivered through one or more servers residing on computers in the apparatus 10. The messages are delivered through the network 116 to other computers and communication devices. Such messages may be selectively delivered to entities responsible for remedying or reacting to conditions that are sensed at the various transaction function devices. Such messages may include, for example, messages indicative of malfunctions in various devices. Messages about malfunctions may be routed to computers or other devices 126 associated with persons providing repair services. Repair servicers may be selectively notified depending on the particular malfunction being sensed. In addition, the repair servicers may be selectively notified based on time of day, machine location or other parameters which dictate which repair servicer is to be notified of the particular condition. To achieve this, the system may operate in accordance with the teachings of the system shown in U.S. patent application Ser. No. 08/813,511 filed Mar. 7, 1997, now U.S. Pat. No. 5,984,178, the disclosure of which is incorporated herein by reference as if fully rewritten herein.

Figure 4:
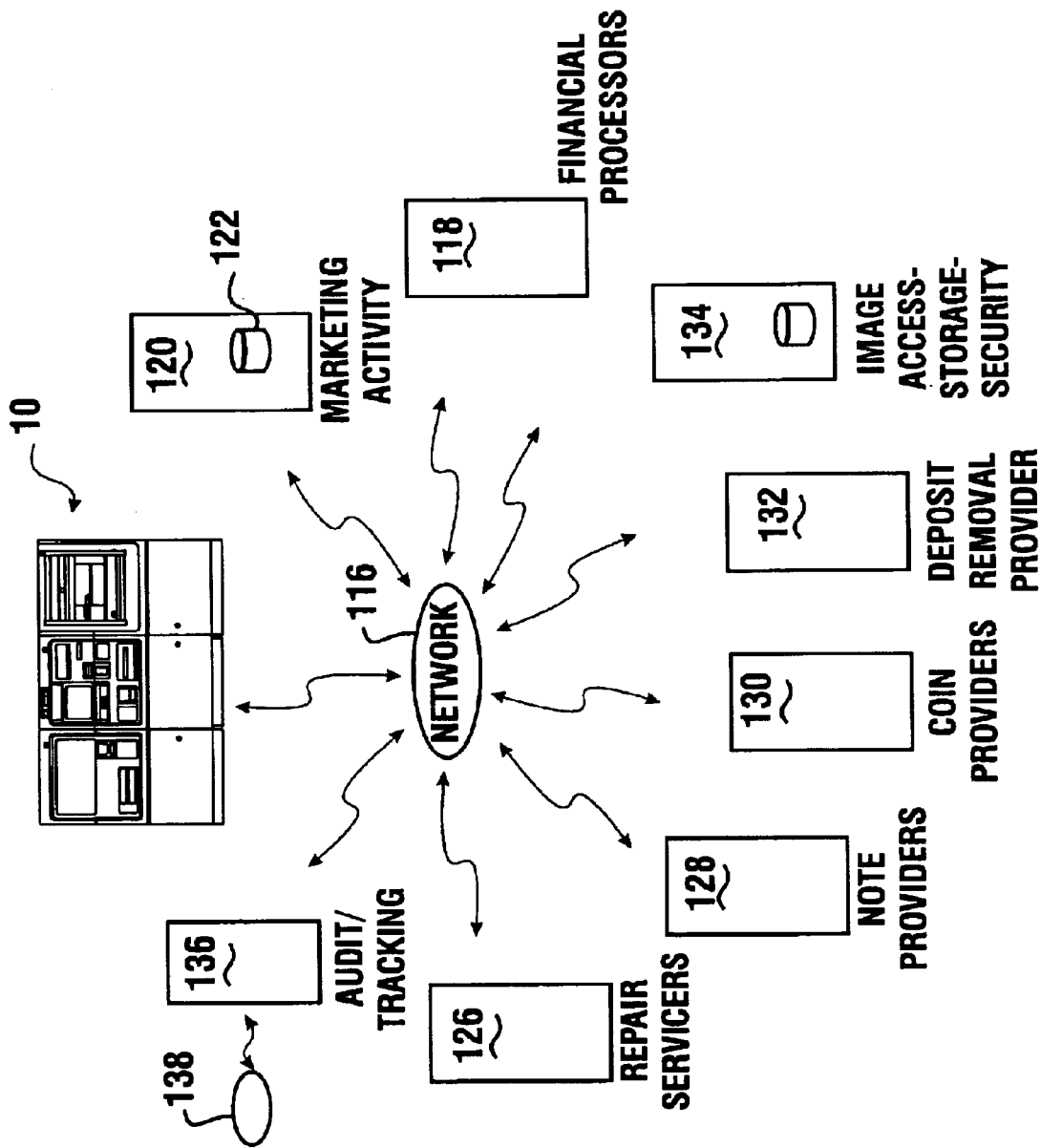
FIG. 4 is a schematic view of the apparatus shown in FIG. 1 in connection with various remote computers to a network.

The terminal processor may further operate to indicate particular conditions to other entities responsible for handling conditions which arise at the apparatus. For example, as indicated in FIG. 4, a need to replenish a note supply may be communicated selectively through the network 16 to a computer 128. Computer 128 may be associated with an entity responsible for replenishing the supply of notes in the dispensers within the machine. When the terminal processor receives signals indicative of a need to replenish coin rolls, messages may be routed through the network 116 to one or more computers schematically indicated 130. Computer 130 may be associated with entities responsible for replenishing rolled coin within the apparatus 10. If the depository 32 or bag depository 62 needs entities to be emptied, appropriate messages may be provided to computers 132 associated with persons responsible for removing items from depositories.

Messages may be provided in the manner of the incorporated disclosure to different entities and through different mediums depending on the nature of the conditions sensed at the apparatus 10. Messages may also be selectively provided based on the type of notes, coins, or deposits which need to be supplied or removed, the time of day, the urgency of the situation, levels of security required and so on.

Exemplary embodiments of the invention enable selectively providing notices to entities which have the ability to take the appropriate action at the apparatus 10 whenever such conditions occur. Embodiments of the invention which are designed to serve merchant banking customers may require particularly prompt action to remedy conditions which might impede operation of the apparatus as merchants may have fewer options for conducting banking transactions than do consumers, particularly during non-banking hours.

The exemplary embodiment of the apparatus of the invention includes cameras 28, 58 and 326 later described. These cameras are preferably connected to systems for capturing and delivering image data of the type commercially available as the AccuTrack™ digital recording and playback system commercially available from Diebold, Incorporated and as shown in U.S. patent application Ser. No. 60/103,731 filed Oct. 9, 1998, the disclosure of which is incorporated by reference as if fully rewritten herein. Such cameras operate in the apparatus 10 in connection with the terminal processor or other connected processors and data stores, to capture and store image data in a digital format related to operation of the apparatus by users. The image data may be selectively stored in memory at the apparatus 10 and accessed by appropriate personnel through the network 116 in the manner discussed in the incorporated disclosure.

Image server 134 shown in FIG. 4 is an example of a computer connected to the network for purposes of accessing and receiving image data from the apparatus 10. Image server 134 may be connected to a data storage medium for archiving image data and associated transaction data for purposes of documenting transactions by users at the apparatus 10. Alternatively, banking personnel or authorized merchant users may be provided with access to the network 116 through appropriate servers or other gateways. Such access may enable a merchant to access the image data associated with their particular transactions. In this way a merchant may verify that deposits have been made for the day from each of their outlets. The merchant or bank may also access the image data which shows the particular employee who made deposits from each outlet as well as the transaction data associated with each such deposit. In this way, a merchant may keep track of the status of their accounts as well as the employees who are responsible for making such deposits.

The ability to determine remotely the making of deposits, the amounts and the times that such deposits are made, enable a merchant to keep close track of their accounts as well as other information concerning their business. This also enables a merchant to keep better track of cash flows and to make the best use of available resources. This may include making transfers of funds as soon as they become available. For example, merchants may be enabled to make deposits of funds into overnight accounts on which they may earn interest, and then obtain reversion of the funds the following business day into their non-interest or lower interest checking accounts. The ability to track and obtain the immediate use of funds may be valuable particularly in a merchant banking environment.

Computer 136 represents an audit and tracking server which may be used by merchants or banking personnel in reviewing available information concerning activity within the system. As previously discussed, computer 136 may also serve as a gateway or firewall for providing access from other networks such as a schematically indicated network 138. It should be understood that in various embodiments of the invention, network 138 may include a publicly accessible network including a wide-area network such as the Internet. It should be understood, however, that in embodiments of the invention appropriate security measures should be taken to prevent access by unauthorized persons to financial and other data.

Figure 5:
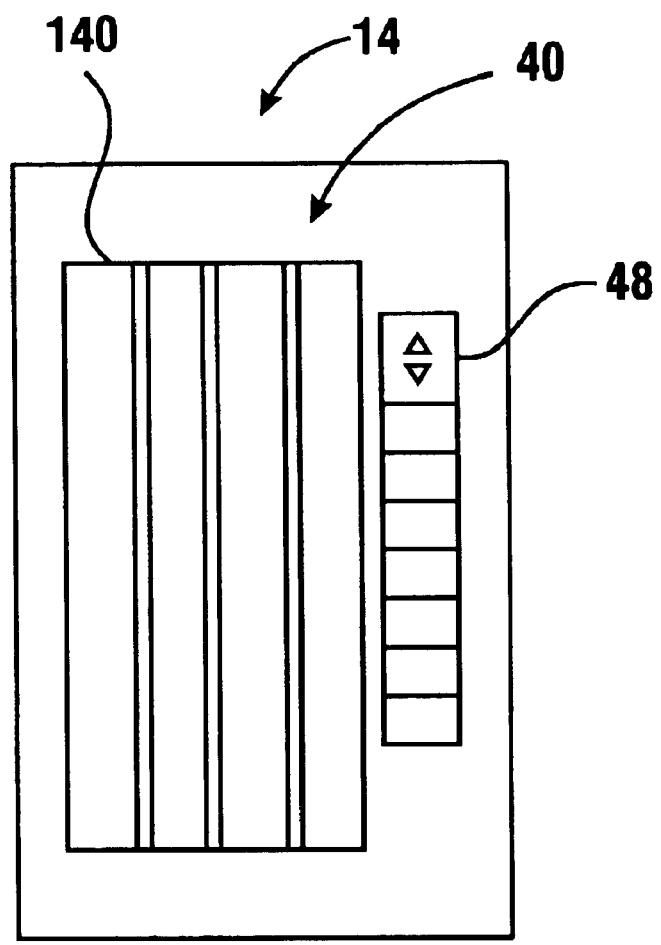
FIG. 5 is a schematic view of the rolled coin dispenser and note acceptor units of the embodiment shown in FIG. 1.
Figure 6:
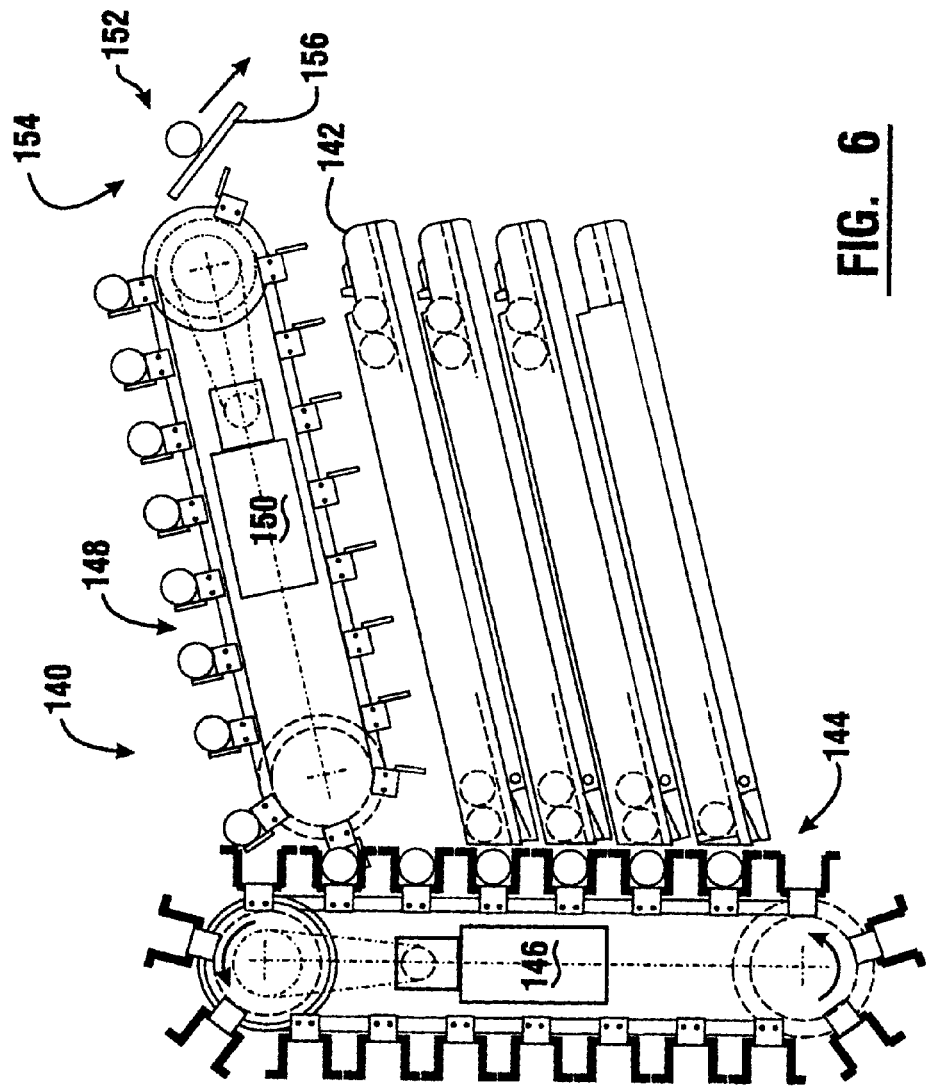
FIG. 6 is an exemplary embodiment of a rolled coin dispenser unit used in connection with an apparatus of the invention.

FIG. 5 shows schematically the components housed in the second housing portion 14 of the apparatus 10. In the described embodiment, housing portion 14 includes the note acceptor apparatus 48 for accepting currency bills as well as a rolled coin dispenser device 40. The rolled coin dispenser device in the exemplary embodiment includes a plurality of rolled coin dispensers 140. An example of a rolled coin dispenser 140 is shown schematically in FIG. 6. Rolled coin dispenser 140 in this exemplary embodiment is similar in construction to that shown in UK Patent Application No. 2,314,062. Of course in other embodiments of the invention, other types of rolled coin dispensers may be used.

In this exemplary embodiment rolled coins of similar size and denomination are stored in cassettes 142. Cassettes 142 are configured to bias the coin rolls therein toward a vertical elevator conveyor 144. The elevator conveyor 144 is driven by a drive 146 in the direction indicated to accept coin rolls from the cassettes and to move coin rolls to an outlet conveyor 148. The outlet conveyor 148 is driven by a drive 150 to move coin rolls from the elevator conveyor to a coin outlet 152. Sensors schematically indicated 154 are positioned adjacent to the coin outlet for detecting when coin rolls are dispensed therethrough. The coin rolls passing through the coin outlet are supported on a ramp 156. The coin ramp 156 directs coins to a straightening, delivery and retracting mechanism. In the exemplary form of the invention, the apparatus includes at least one coin dispensing mechanism 140 for four denominations of coins, specifically pennies, nickels, dimes and quarters. Of course in other embodiments, additional coin types and coin dispensing mechanisms may be used.

Coins dispensed by the coin dispensing mechanisms 140 in the-exemplary embodiment are each delivered through the coin straightening, delivery and retracting mechanism 162. Mechanism 162 is shown in FIGS. 8–11. Mechanism 162 includes a housing 164. Housing 164 is supported on an interior face of door 160. Housing 164 has supported thereon a deflector supporting shaft 166 (see FIG. 10). Deflectors 168 are rotatably supported on shaft 160. Each deflector 168 is mounted in a passage 170. Each passage 170 corresponds to a respective one of the rolled coin dispensers. Dividers 172 separate the passages so that in the exemplary embodiment each passage will receive coin rolls of only one denomination when such rolls are dispensed.

The passages 170 are bounded at the lower end by a movable door member 174. The movable door member is rotatably mounted in supporting connection with the housing through a pivot for a purpose later discussed. The movable door member 174 overlies a coin retraction pocket 176 or container which serves as a storage area (see FIG. 17).

Figure 8:
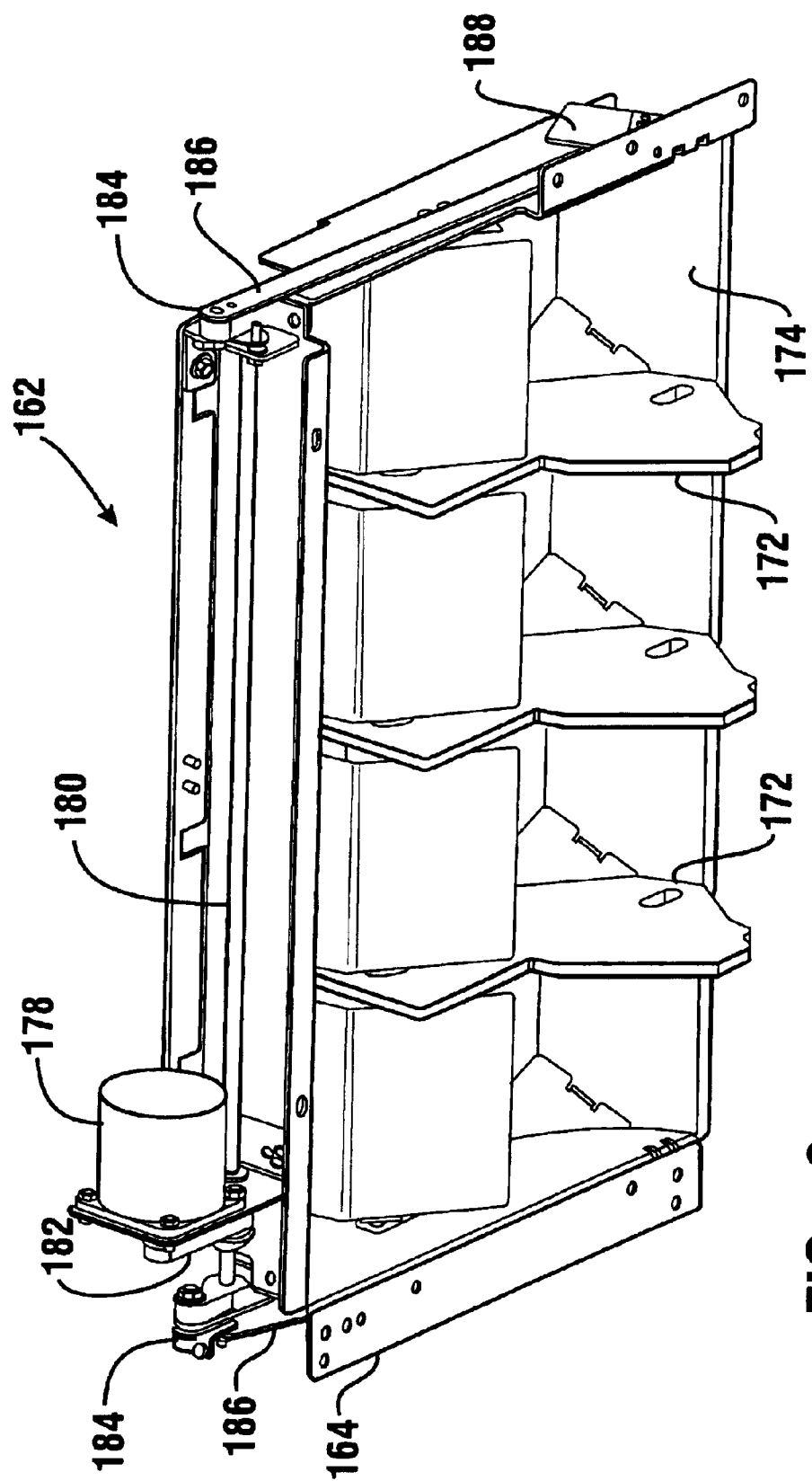
FIG. 8 is an isometric view of a rolled coin delivery and retraction mechanism used in connection with the rolled coin dispenser of the apparatus shown in FIG. 1.

A drive 178 shown in FIG. 8 is operatively connected to the door member 174 through a transmission mechanism. The transmission mechanism includes a rotatable shaft 180 which is connected to a drive shaft of the motor through a belt and pulley arrangement 182. First links 184 are connected at each end of shaft 180. Each first link 184 is connected at an end opposed of shaft 180 to a second link 186. Each second link 186 is connected to a tab 188 which extends upward on a side of door member 174. The drive and transmission mechanism shown are exemplary and other drives suitable for achieving selective movement may be used.

Figure 9:
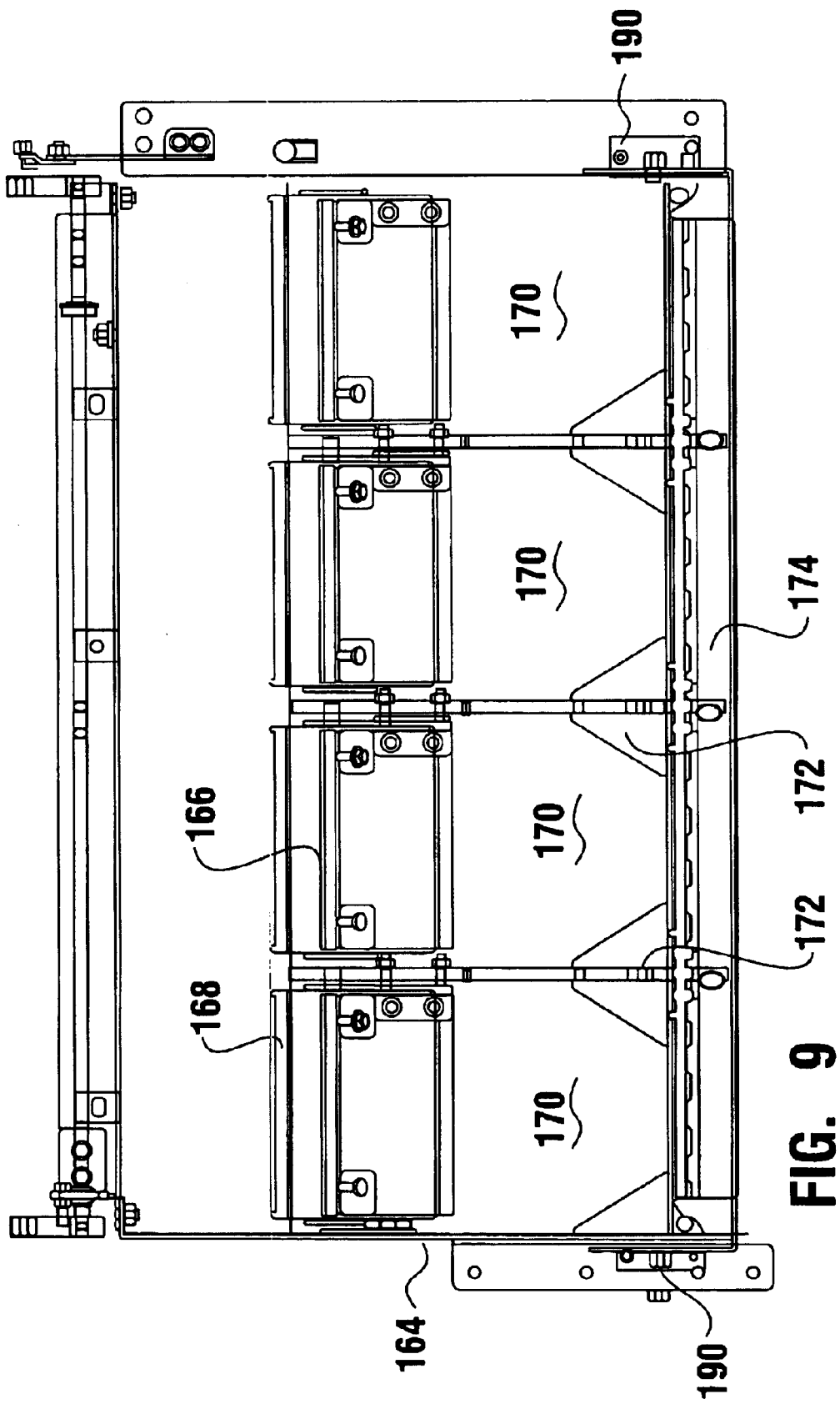
FIG. 9 is a front plan view of the mechanism shown in FIG. 8.
Figure 10:
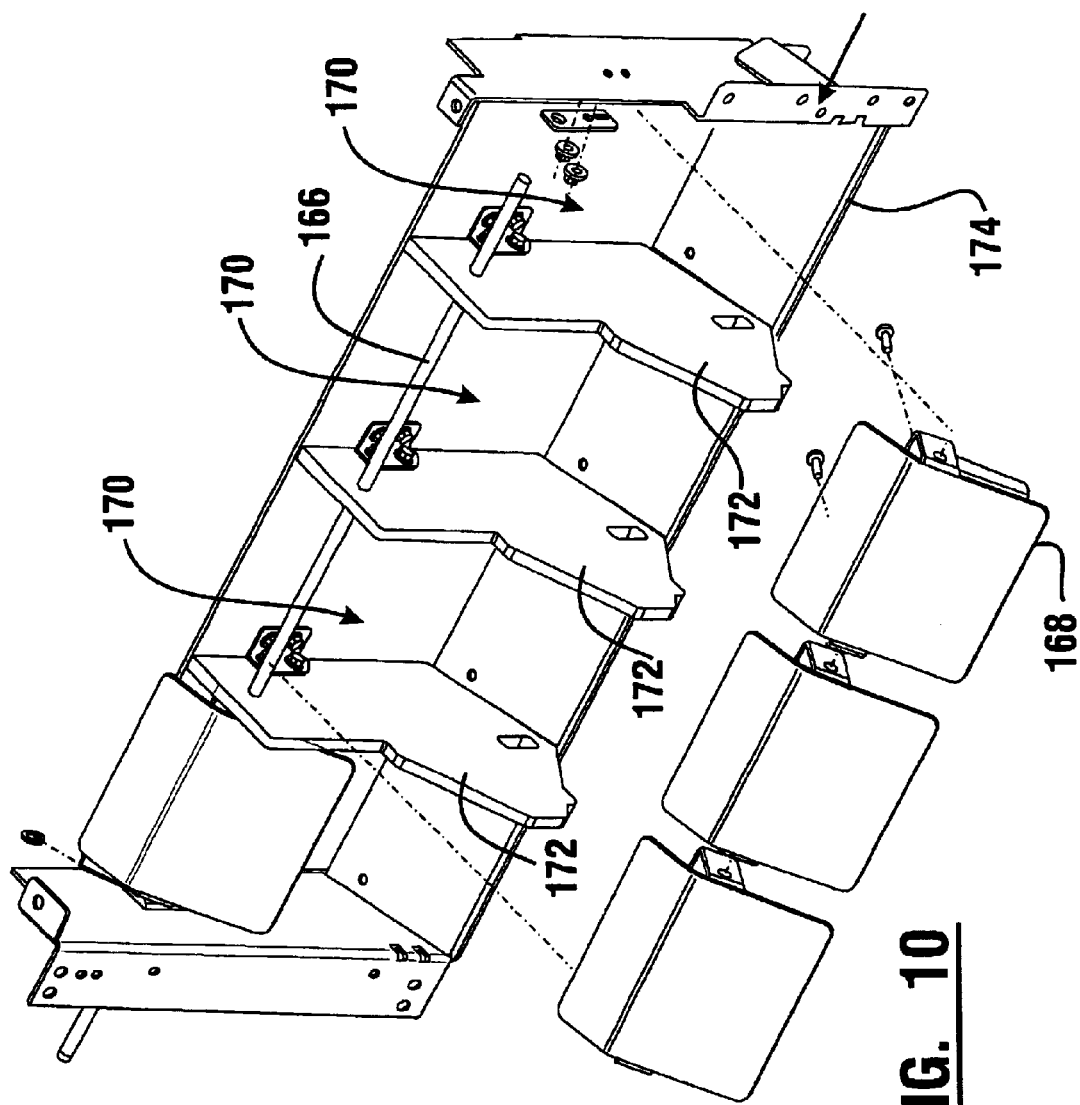
FIG. 10 is a partially exploded isometric view of the mechanism shown in FIG. 8.
Figure 11:
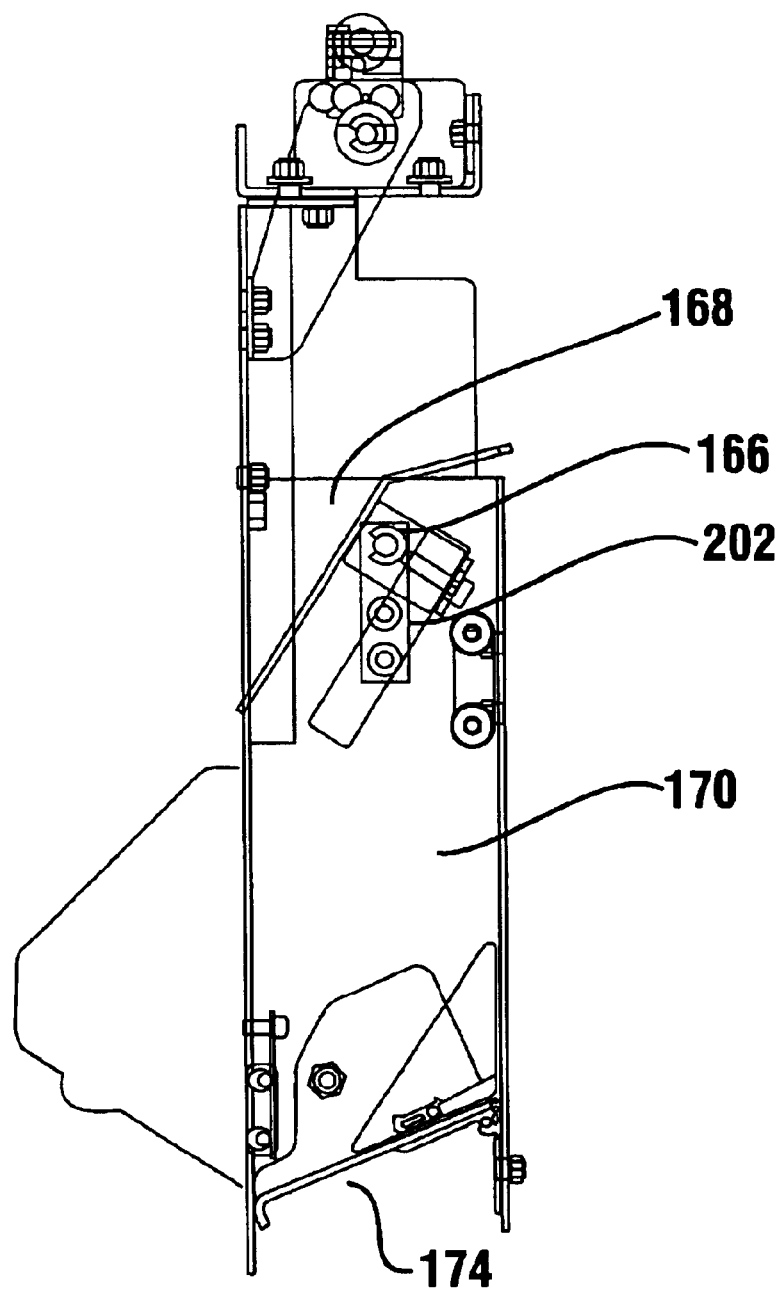
FIG. 11 is a side cross-sectional view of the mechanism shown in FIG. 8.

As shown in FIG. 9, sensors 190 extend at opposed ends of housing 164. In the described form of the invention, sensors 190 include a radiation emitter and receiver. The sensors 190 are operative to sense the presence of coin rolls in the passages. Openings 192 or apertures extend in generally aligned relation in each of the dividers 172 so that the presence of coin rolls between any of the dividers is detected. The sensors shown are exemplary and other sensors suitable for sensing coin rolls may be used.

Figure 12:
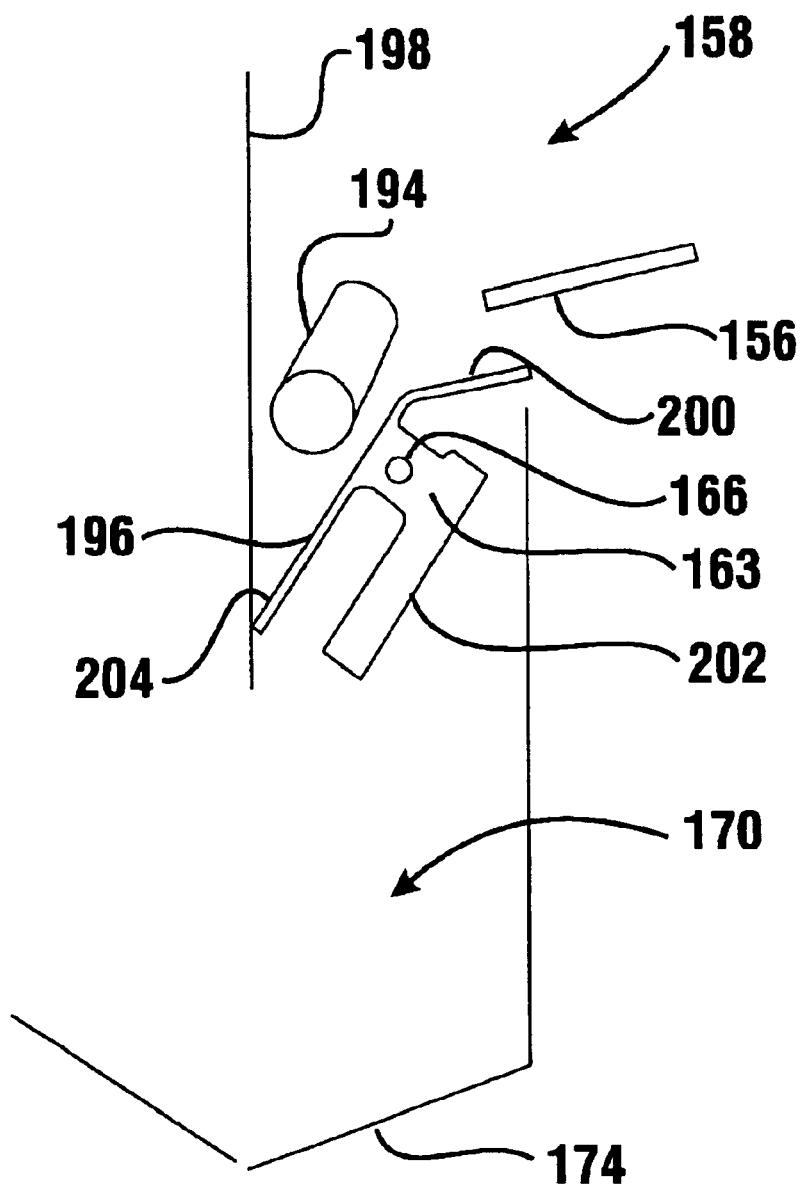
FIGS. 12–14 are side schematic views showing the operation of the rolled coin deflectors in positioning and absorbing energy from a coin roll being dispensed.

In the operation of the exemplary coin straightening, delivery and retracting mechanism, coin rolls dispensed move from the respective rolled coin dispensers 140 on the coin ramps 156 as represented by coin roll 194 in FIG. 12. Such rolled coins are not necessarily traveling along the coin ramp in a condition parallel to deflector support shaft 166. Rather, such coin rolls may be substantially skewed from the desired position as represented in FIG. 12. The deflector 168 includes a first coin engaging surface 196. The first coin engaging surface extends generally adjacent to a coin aligning surface 198 which in the described embodiment is an inner surface of door 160. Coin deflector 168 further includes a second engaging surface 200. Second engaging surface 200 is operative to guide coins to engage the first coin engaging surface 196. In the described embodiment the second engaging surface 200 is also configured to prevent unauthorized access to the coins in the mechanism.

Deflectors 168 further include a counterweight portion 202. Counterweight portion 202 in the exemplary embodiment is disposed on an opposed side of shaft 166 from the coin-engaging surface 196. Counterweight portion 202 is preferably sized and configured to bias the end area 204 of first coin-engaging surface 196 to engage or at least be in close adjacent relation to coin-aligning surface 198. Counterweight portion 202 is preferably configured such that a relatively substantial increase in force is required to move the end area 204 of surface 196 a greater distance away from the coin aligning surface 198 as the end area moves further away from the aligning surface. As a result of this configuration a greater force is required to move a larger diameter coin roll between the coin-aligning surface 198 and the end area 204 than is required to move a smaller diameter coin roll.

Figure 13:
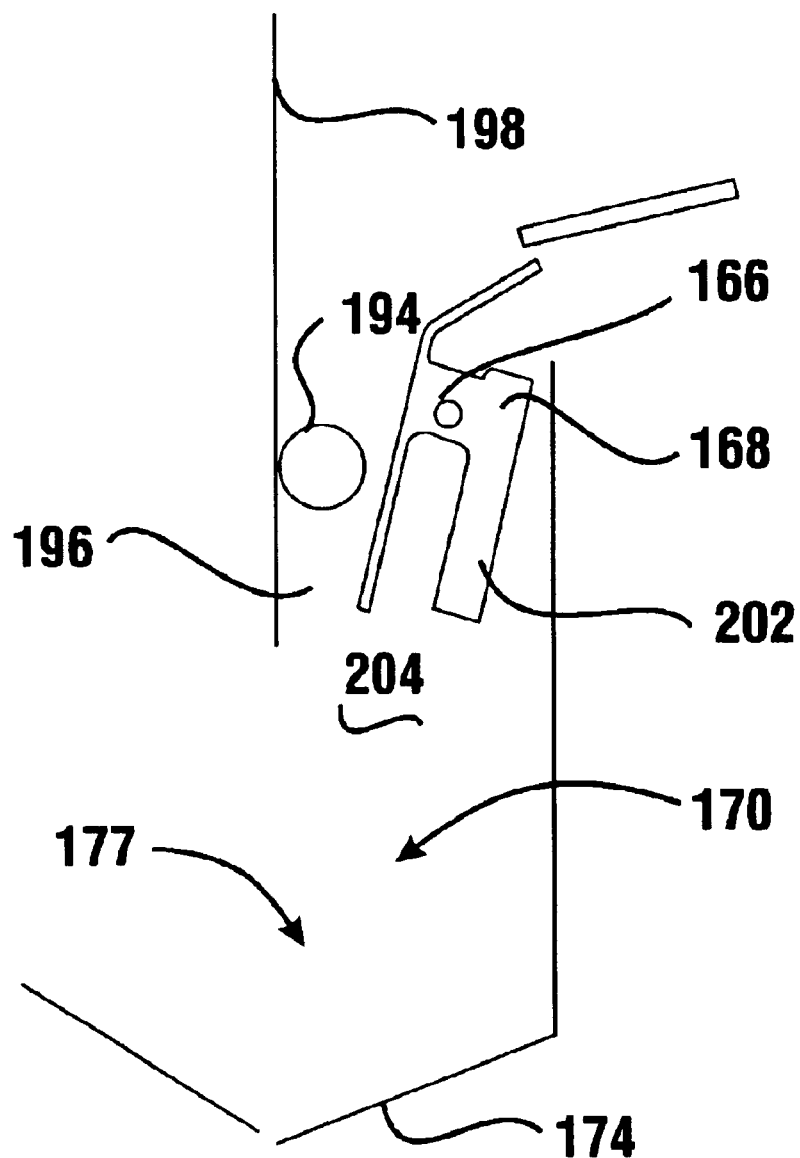

As represented in FIG. 13, the engagement of the coin roll 194 and the surface 196 directs the coin roll to engage the aligning surface 198. The end area 204 extends generally parallel to the aligning surface. As a result the coin roll passing the deflector is generally aligned with its axis parallel to surface 198 and shaft 166. The relatively large mass associated with the deflector 168 and particularly the counterweight portion 202 absorbs kinetic energy from the moving coin roll. As a result the coin roll is slowed when it engages the deflector member. The force associated with the weight of the coin roll 194 causes the deflector member to move and rotate about shaft 166 a sufficient degree to enable the coin roll to move past the deflector in the passage 170. The coin roll generally moves past the deflector in engagement with the aligning surface. As previously discussed, the larger the diameter of the coin roll the greater the force that is required to move the deflector 168 and its associated counterweight portion 202 to enable the roll to pass downward therefrom into a holding area generally indicated 177.

Figure 14:
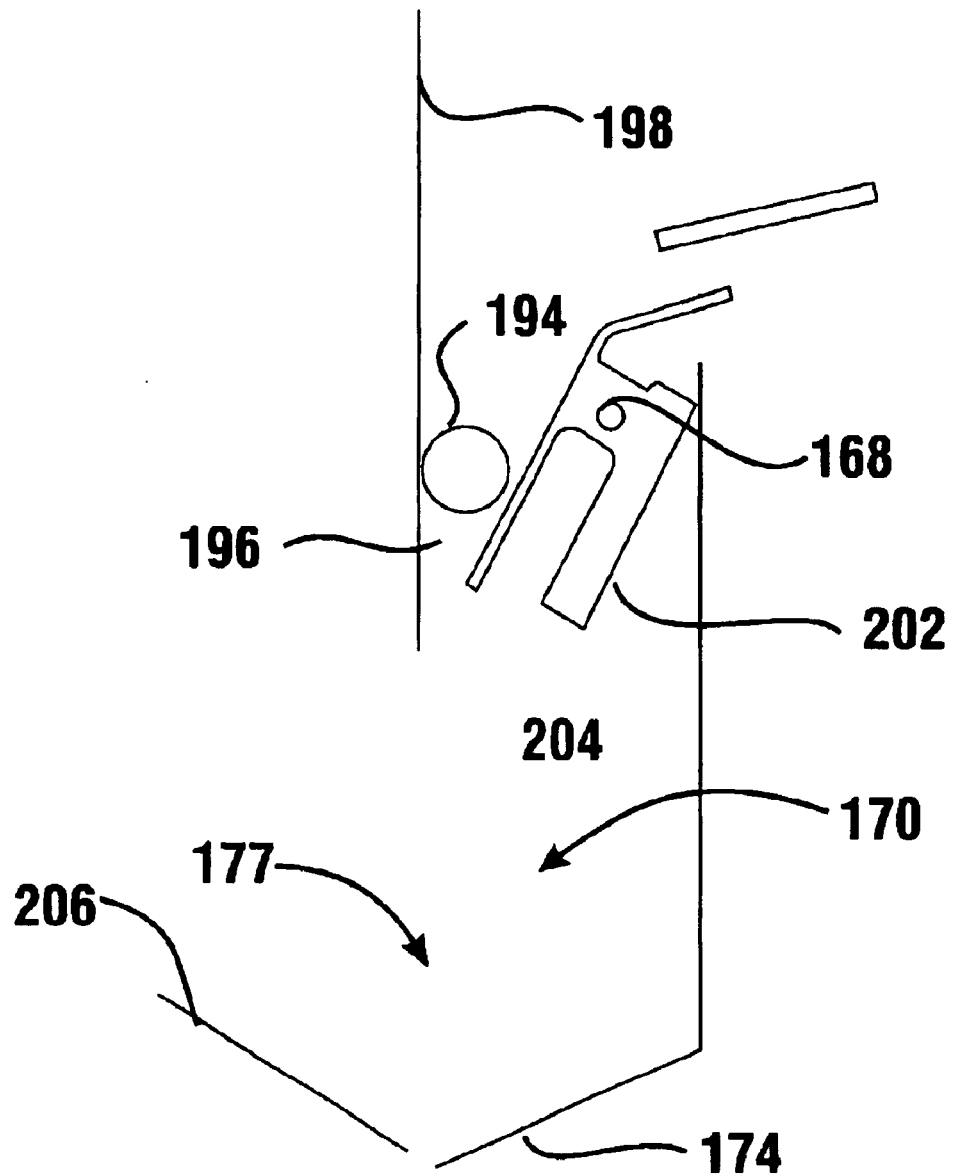

As shown in FIG. 14, the force associated with the weight of the coin roll eventually rotates the deflector 168 sufficiently so that the coin roll is enabled to pass downward in the passage 170. Once the coin roll passes the deflector, it is held in the holding area 177 in supporting connection with the door member 174 and a downward and inward extending ramp surface 206. In the described embodiment the front area 204 and coin aligning surface 198 are generally in alignment with the trough area generally indicated 208 where the ramp surface 206 meets the door member 174 in the closed position. This trough area serves as an impact area from which the surfaces bounding the holding area for the coin rolls extend generally upward in cross section. This configuration generally results in the dispensed coin rolls falling downward in a manner that minimizes bouncing and causes the coin rolls to stack so that they can be readily removed from the holding area by users accessing the mechanism 162.

Figure 15:
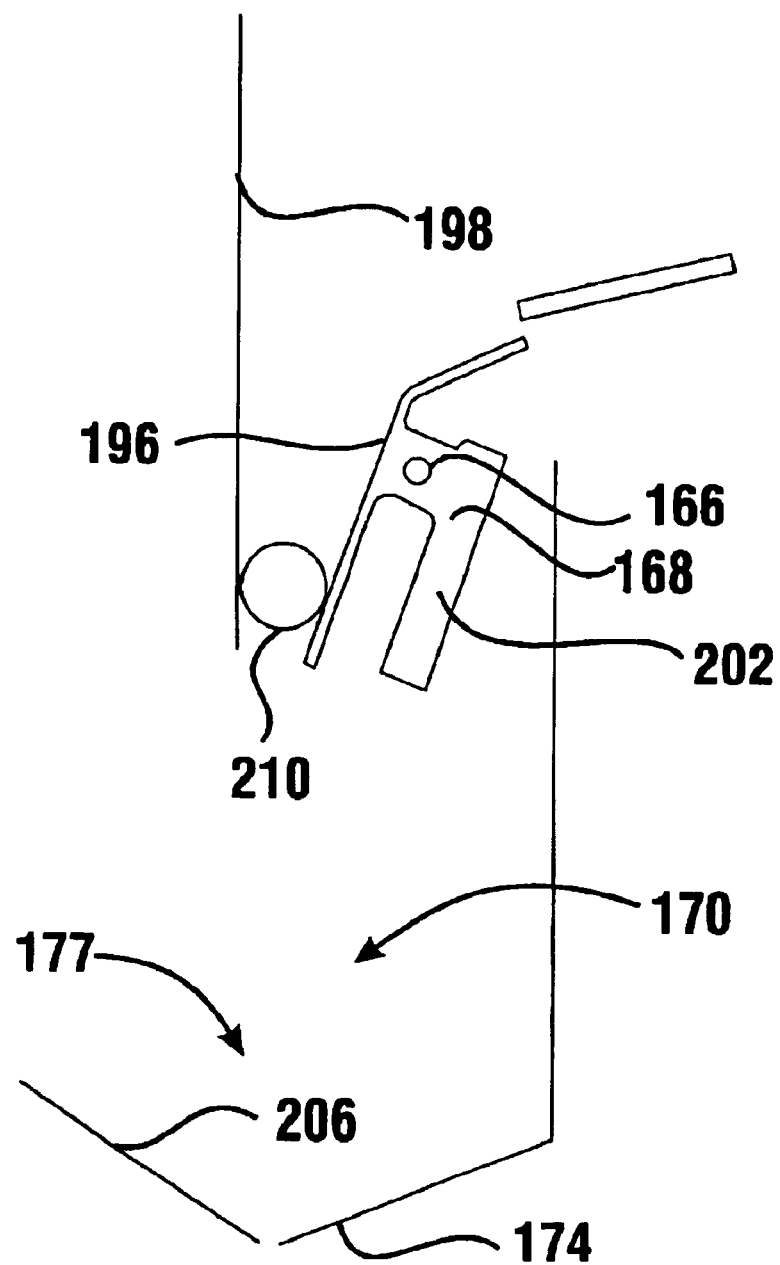
FIG. 15 is a side schematic view showing the operation of the coin deflectors in connection with a small diameter coin roll being dispensed.

The exemplary form of the deflector member 168 is configured such that the counterweight portion 202 has its center of mass generally below and somewhat disposed inward from the axis of rotation of the deflector member 168 about shaft 166. As will be appreciated, the mass of this counterweight portion must be overcome by the mass of the coin rolls which pass the deflector member between the surface 196 and the aligning surface 198. Smaller diameter coin rolls which generally have less mass than larger diameter coin rolls, do not have to move the deflector member as much. As a result, smaller diameter coin rolls are enabled to pass the deflector member and do not become hung-up thereon. In addition, smaller diameter coin rolls which do not possess as much kinetic energy when dispensed are more readily aligned by the deflector. An example of a relatively smaller diameter coin roll 210 being aligned and passed downward past the deflector member in the exemplary embodiment of the invention is schematically represented in FIG. 15.

Figure 16:
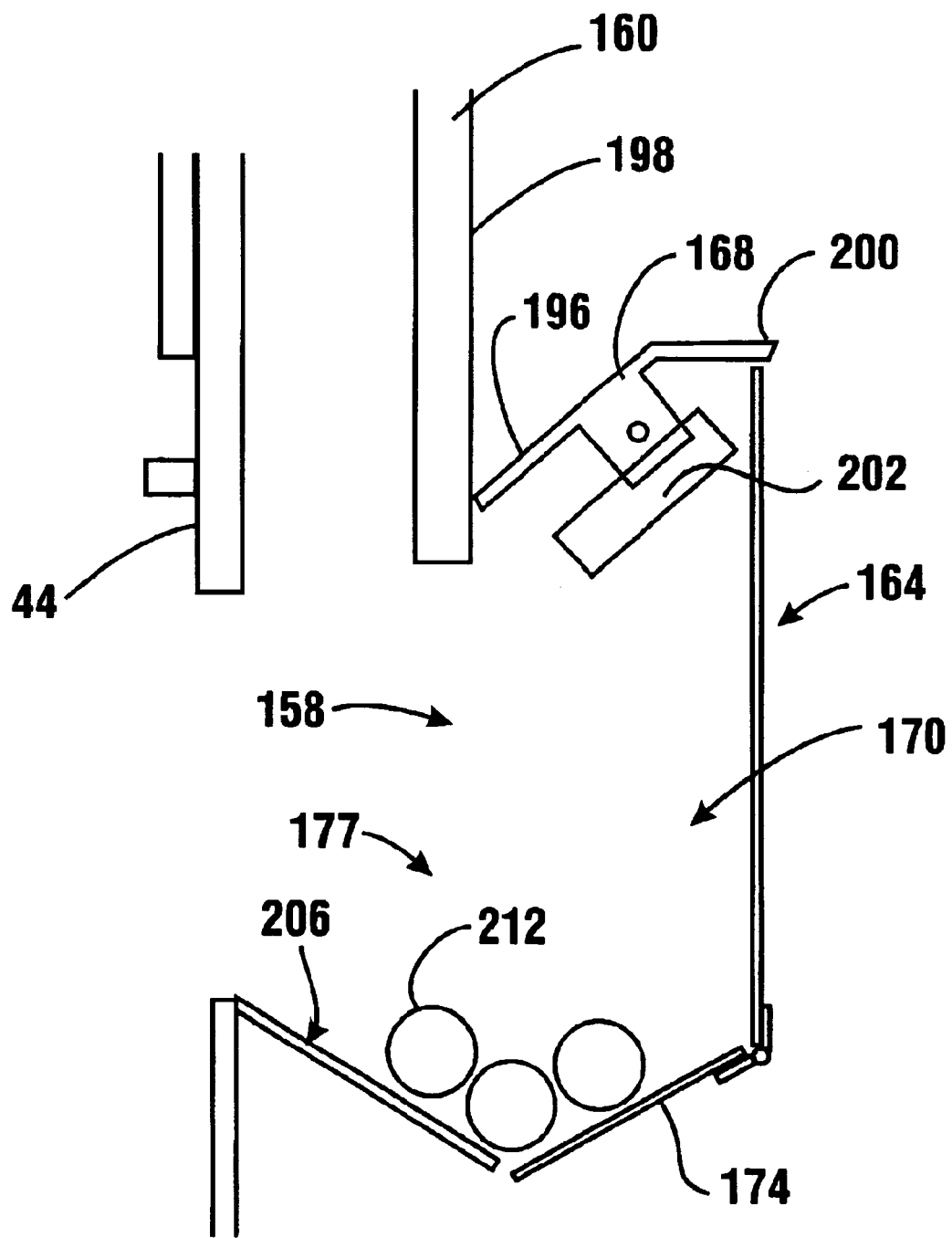
FIG. 16 is a side view of coin rolls in position to be taken by user.

As shown in FIG. 16 coin rolls which have been dispensed, are held in the holding area in supporting connection with the door member 174 and ramp surface 206 in the passages 170. When the door 44 on the fascia cover unit is moved to an open position responsive to the operation of the terminal processor as shown in FIG. 16, the dispensed coin rolls 212 are accessible through an opening to the user from the exterior of the machine. As previously discussed, these dispensed coin rolls are preferably aligned by action of the deflectors and are segregated by denomination in the plurality of holding areas bounded by the dividers 172. A user is enabled to reach in through the opening 158 in the housing door 160 to extract the dispensed coin rolls.

As represented in FIG. 16, the deflectors 168 are also preferably configured to prevent users from reaching upward through the passages to access the coin-dispensing mechanism. This is achieved in the exemplary embodiment by the second-engaging surface 200 being in close relation with a wall of housing 164 and coin-engaging surface 196 being in close proximity to aligning surface 198. This configuration blocks efforts to move an instrument upward in passages 170. Similarly the counterweight portion 202 is operative to resist attacks which may be directed upward through the passage portions. The configuration of the rolled coin dispensers 140 with the coin outlet 152 positioned above the coin roll storage cassettes 142 also reduces the chance of unauthorized personnel gaining access to the interior of the unit.

During the course of transactions in which coin rolls are dispensed, users will generally remove their coin rolls from the passages. If a transaction is concluded and a user has failed to take dispensed coin rolls, the presence of one or more remaining coin rolls is sensed by sensors 190. In response to sensing remaining coin rolls at the end of the transaction, the terminal processor is operative in accordance with its associated programming to cause mechanism 162 to retract such coin rolls into the coin retraction pocket 176 of the machine. In an exemplary embodiment the retraction is done responsive to a user failing to take the dispensed coin rolls a time after they are dispensed or after a transaction. The terminal processor includes a timer function to carry out the retraction of coin rolls in accordance with its programming.

Figure 18:
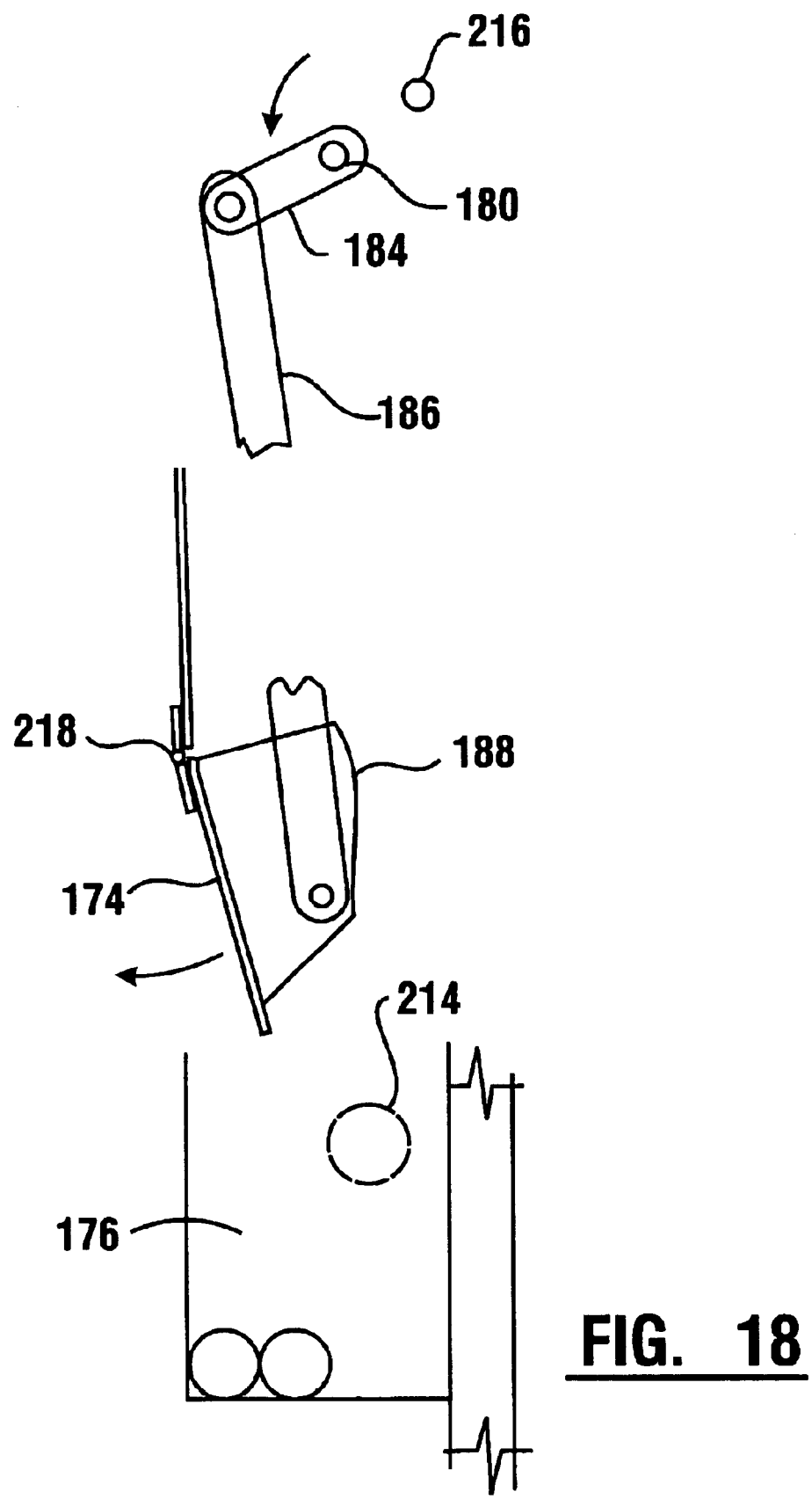
FIG. 18 is a schematic view similar to FIG. 17 with the roll coin retraction unit moved to a position to retract coin rolls within the machine.

How coin rolls are retracted is shown schematically in FIGS. 17 and 18. In response to at least one of sensors 190 sensing a coin roll 214 remaining after a transaction, drive 178 is operative to rotate shaft 180 from the initial position shown in FIG. 17. It should be noted that in this initial position, first link 184 is in an over-center position relative to the axis of rotation of shaft 180. In this over-center position link 186 is engaged with a stop 216. As a result, efforts to move the door member downward from this position will be resisted by the stop 216. This configuration helps to prevent unauthorized persons from gaining access to the coin retraction pocket 176.

When the coin rolls supported on the door member 174 are to be retracted, shaft 180 is rotated so that first link 184 rotates in a counterclockwise direction as shown in FIG. 17. Such movement causes link 186 to move downward rotating door member 174 in a clockwise direction as shown about a pivot hinge connection 218. As a result of door member 174 rotating downward, coin roll 214 in the holding area falls into the coin retraction pocket 176. The retracted coin roll remains in the retraction pocket which serves as a storage area until authorized personnel access the interior of the housing and remove the roll therefrom. The terminal processor then operates the drive 178 to return the door member 174 to the position shown in FIG. 17. If the sensors 190 continue to sense coin rolls in a position within the passages, the terminal processor may be operative to repeat the process in accordance with its programming a number of times until either a failure status is indicated or the coin roll falls into pocket 176. The particular programming of the system may make several attempts to clear coin rolls and may provide an indication of a failure if after several attempts coin rolls are still sensed within the passages 170. As the terminal processor moves the member 174 it operates to maintain coin roll door 44 in a closed position.

Figure 7:
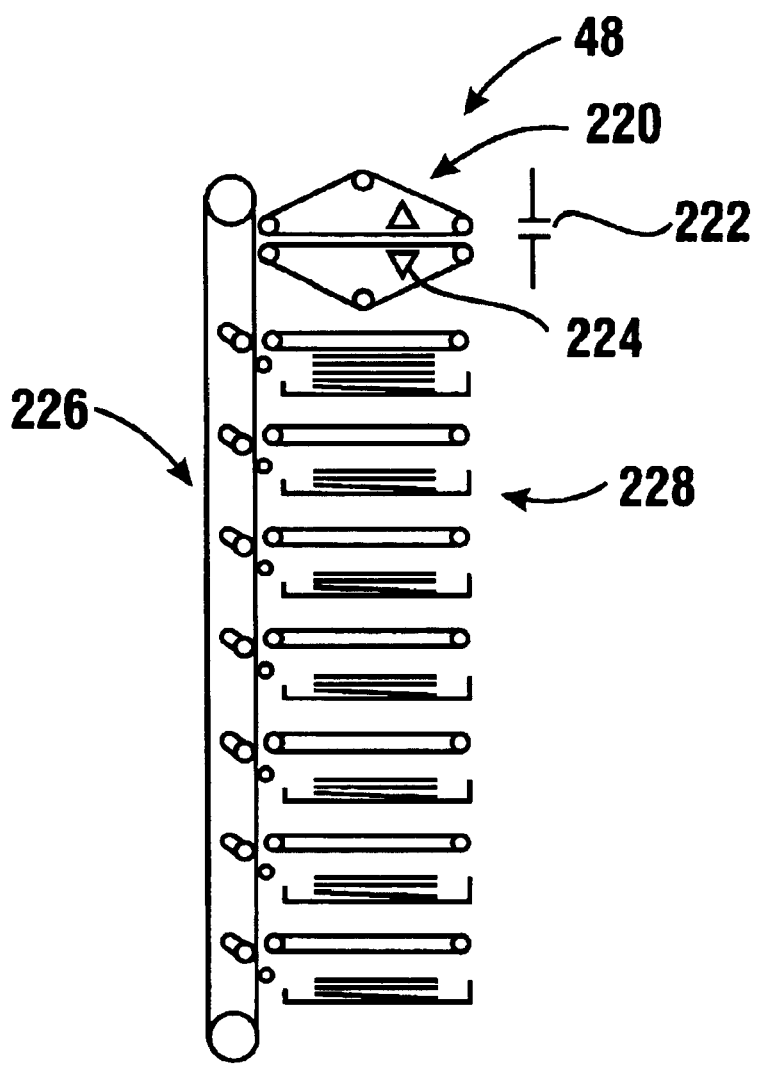
FIG. 7 is a schematic view of a note acceptor unit used in an exemplary embodiment of the present invention.

Housing portion 214 includes note acceptor 48. The note acceptor 48 is schematically shown in FIG. 7. In embodiments of the invention the note acceptor may be of a type shown in U.S. patent application Ser. No. 08/980,467 or U.S. patent application Ser. No. 60/067,319 filed Nov. 28, 1997, both of which are incorporated herein by reference as if fully rewritten herein. As shown in FIG. 7, the note acceptor of the exemplary embodiment includes a transport 220 for moving notes accepted through an opening 222 which extends through door 160. The transport 220 is operative to move inserted notes past sensory units 224. Sensory units 224 determine the type of notes inserted and distinguish valid notes from invalid notes. Sensory units 224 may be of the type shown in U.S. patent application Ser. No. 08/749,260 owned by now U.S. Pat. No. 5,923,413, the Assignee of the present invention and which is incorporated herein by reference as if fully rewritten herein. Such sensors may work in connection with a terminal processor or other processors within the apparatus 10 for purposes of processing signals from the units to determine the denomination and genuineness of notes passed through the transport 220. Of course, it should be understood that many types of devices for identifying and validating notes may be used in embodiments of the invention.

Notes determined as valid and acceptable by the sensors 224 are passed through further transports 226 to note storage areas 228. Each note storage area 228 is preferably configured for holding a particular type and/or denomination of note therein. The note validator may be operative depending on its programming and the nature of the note acceptor to reject notes which cannot be identified or which are invalid by passing them outward through the opening 222. Alternatively such notes may be accepted into the mechanism and stored in a designated note storage area for later analysis.

The notes accepted into the machine may remain in the note storage areas until removed therefrom by personnel accessing the interior of housing portion 14. Alternatively, embodiments of the invention may operate in the manner of the incorporated disclosures, to accept and store notes in the machine as well as to dispense previously accepted notes in response to requests by users. The approach taken will depend on the particular requirements and capabilities required of the apparatus.

Figure 22:
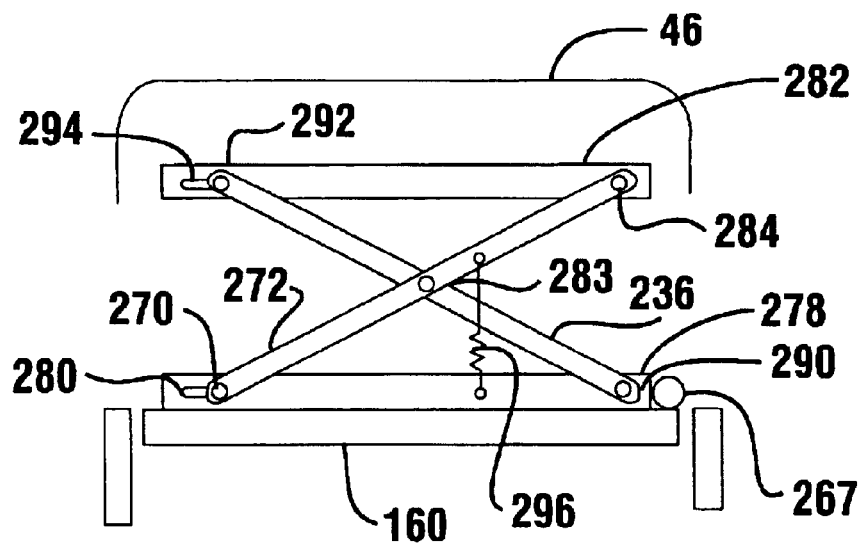
FIG. 22 is a schematic view showing the upper fascia moving mechanism in an extended position.
Figure 23:
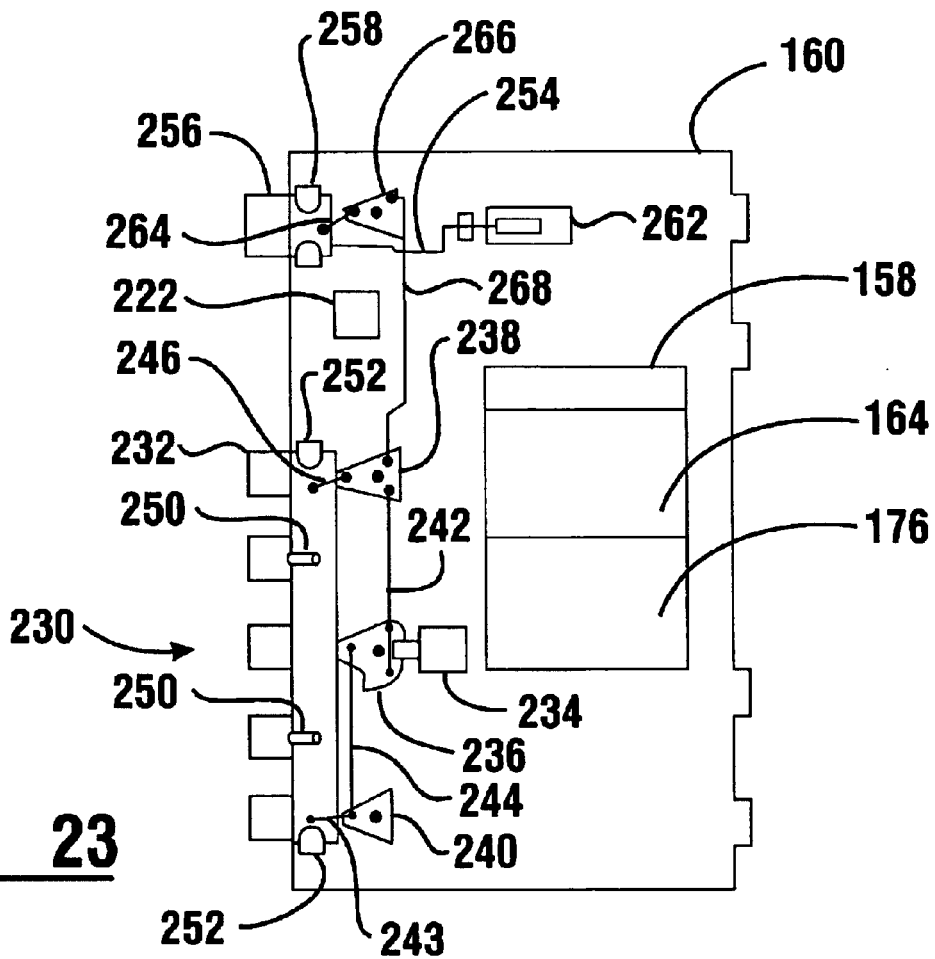
FIG. 23 is a rear schematic view of the boltwork and deadbolt used in connection with the housing for the rolled coin dispenser and note acceptor.

The described exemplary embodiment of the invention includes a movable fascia 46 on housing portion 14. The movable fascia is operative to move outward,relative to the access door 160 overlying the interior area of the second housing portion 14. This is accomplished in the described embodiment by the mechanism shown in FIGS. 19 through 23. As shown in FIG. 23, the interior of door 160 has a boltwork generally indicated 230 in supporting connection therewith. Boltwork 230 is part of a holding mechanism for door 160 and includes a movable bolt 232, which is movable in an unlocked condition between an extended position in which the bolt engages the housing to hold the door closed, and a retracted position in which the door 160 is enabled to be opened. The ability to move the bolt 232 is controlled by a locking mechanism 234. The locking mechanism is controlled by a lock dial 235 similar to lock dial 70 previously discussed or other suitable locking mechanism. In an unlocked condition of the locking mechanism 234, a rotatable member 236 is enabled to be rotated by rotating a handle 237 extending on the exterior of the door 160. The handle may be of the type previously described or other suitable handle for rotating the rotating member.

Movement of the bolt 232 is accomplished by the rotating member 236 rotating idler members 238 and 240. The idler members are connected to the rotating member 236 through intermediate links 242 and 244. The idler members 238 and 240 are respectively connected to the bolt 232 by further links 246 and 248. The bolt is selectively movable inward and outward in supporting connection with central slotted guides 250 and outer guides 252. Except as otherwise specifically described herein, the boltwork of the described embodiment is similar to the boltwork disclosed in International Publication No. WO98/26380 owned by the Assignee of the present invention and which is incorporated by reference as if fully rewritten herein.

In the exemplary embodiment, a supplemental bolt 256 is disposed adjacent to the upper end of door 160. Bolt 256 is movably mounted in supporting connection with guides 258 which are shown schematically. Supplemental bolt 256 is in operative connection through a tie rod 254 with an actuating member 260. Actuating member 260 extends in a slot 262 in door 160 (see FIGS. 24 and 25).

As shown in FIG. 23 supplemental bolt 256 is connected to a link 264 through a rotatable idler member 266. Idler member 266 is rotatably mounted in a manner similar to members 236, 238 and 240 in supporting connection with door 160. Idler member 266 is connected through a link 268 to idler member 238. As a result of this connection, supplemental bolt 256 moves between the extended and retracted positions in coordinated relation with bolt 232. The supplemental bolt 256 acts with bolt 232 in the extended position to hold door 160 in a closed position. Likewise, in response to opening locking mechanism 234, bolt 232 as well as supplemental bolt 256 may be retracted so that door 160 can be opened.

Figure 25:
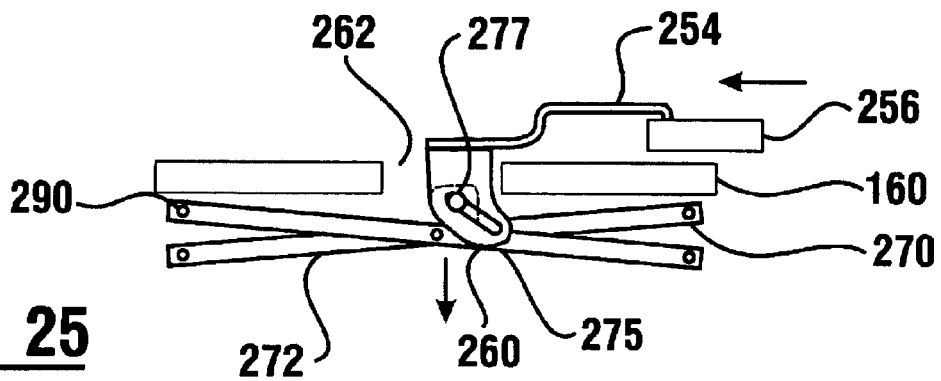
FIG. 25 is the schematic view of the movable upper bolt portion which is operative to move the fascia moving mechanism.
Figure 24:
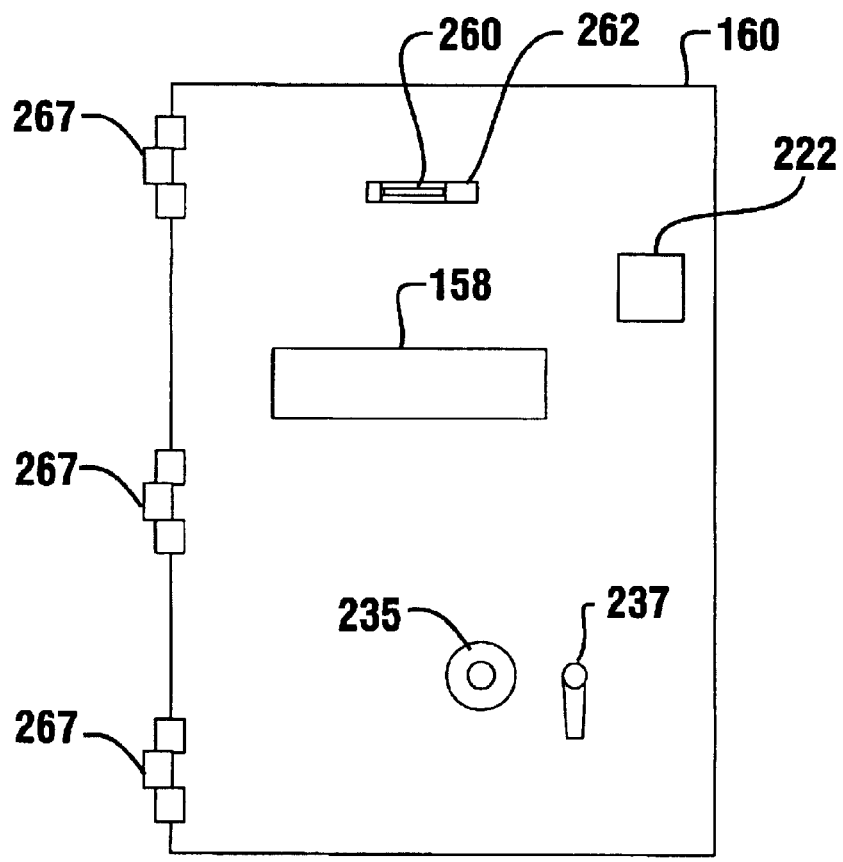
FIG. 24 is a front view of the door of the enclosure housing the rolled coin dispenser and note acceptor.

As can be appreciated in FIGS. 24 and 25, as supplemental bolt 256 moves from the extended to the retracted position, actuating member 260 moves relative to slot 262. Actuating member 260 is a flat cam which includes a slot 275 therein. A pin member 277 is connected to a further member 272. As schematically indicated in FIG. 25, the movement of pin member 277 is operative to cause fascia cover unit 46 to move outward in response to the retraction of supplemental bolt 256. This is desirable in the described exemplary embodiment to enable door 160 to be opened.

Figure 19:
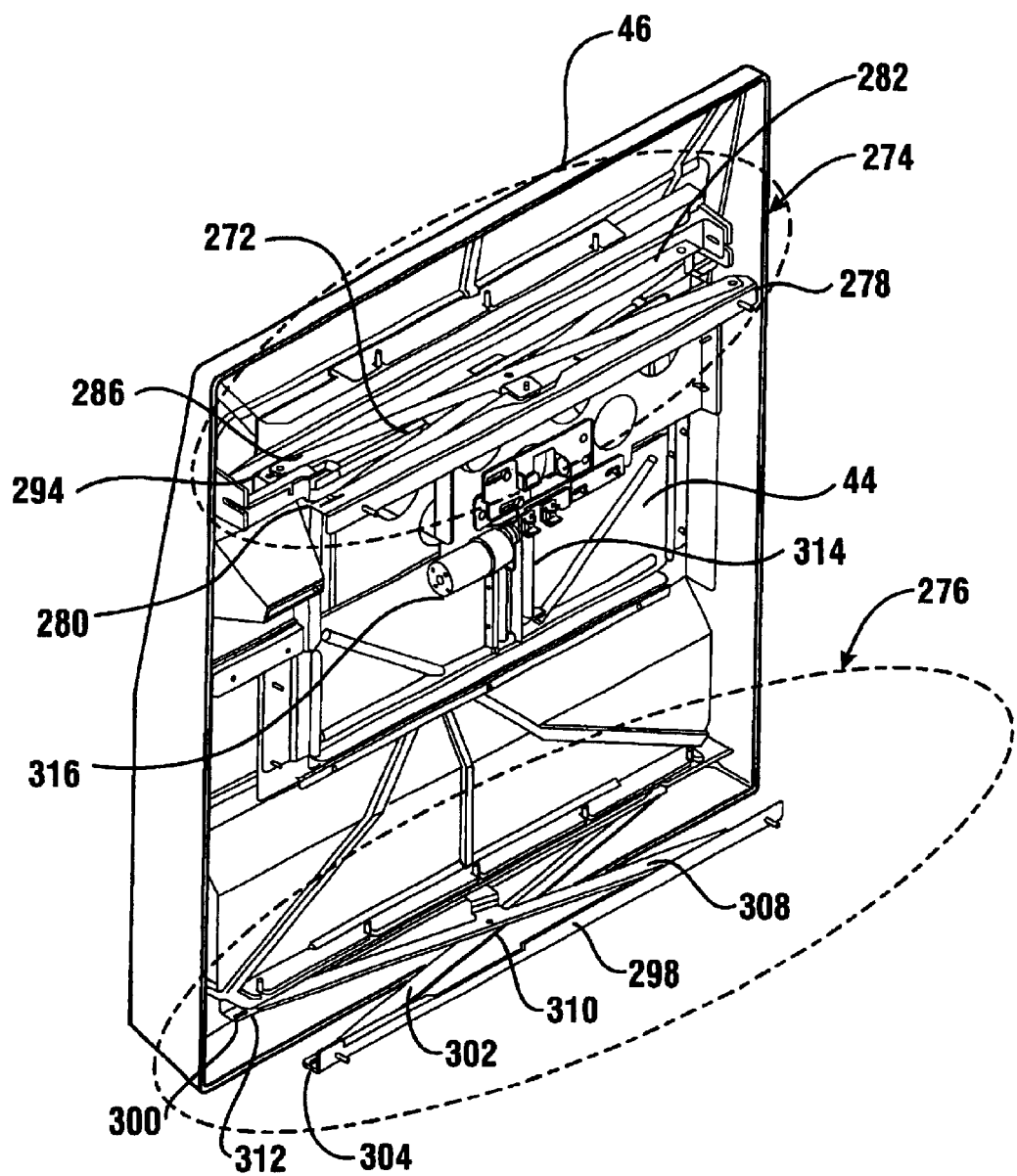
FIG. 19 is a back view of the fascia associated with the rolled coin dispenser and note acceptor unit.
Figure 20:
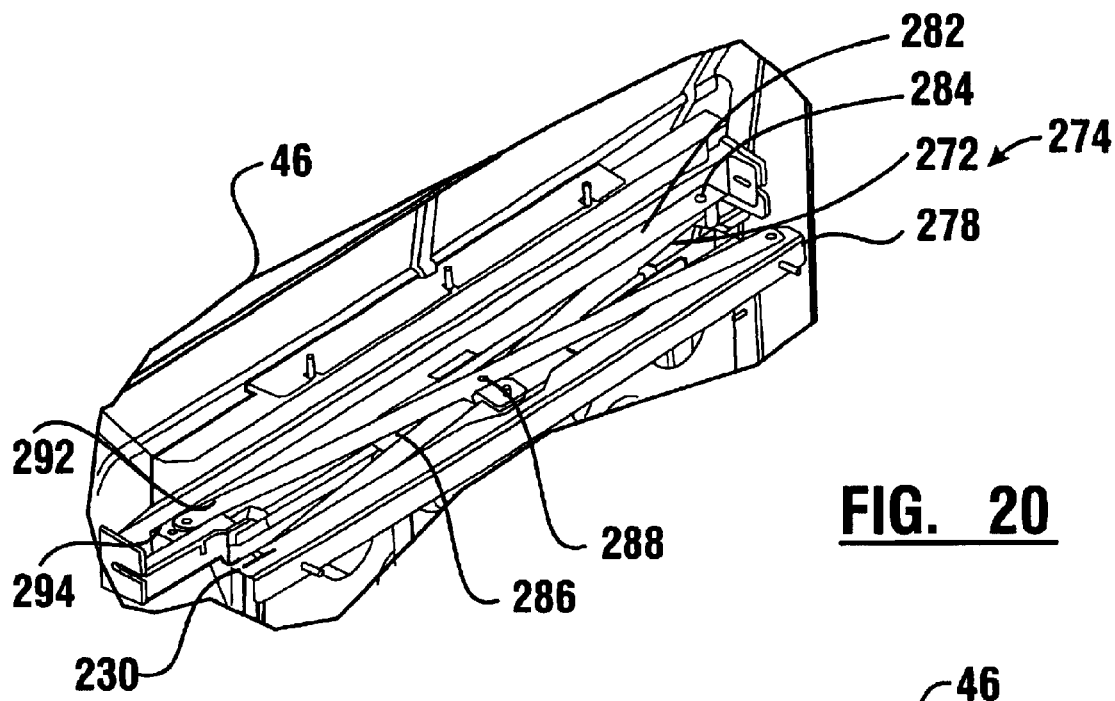
FIG. 20 is an enlarged view of the upper fascia moving mechanism shown in FIG. 19.
Figure 21:
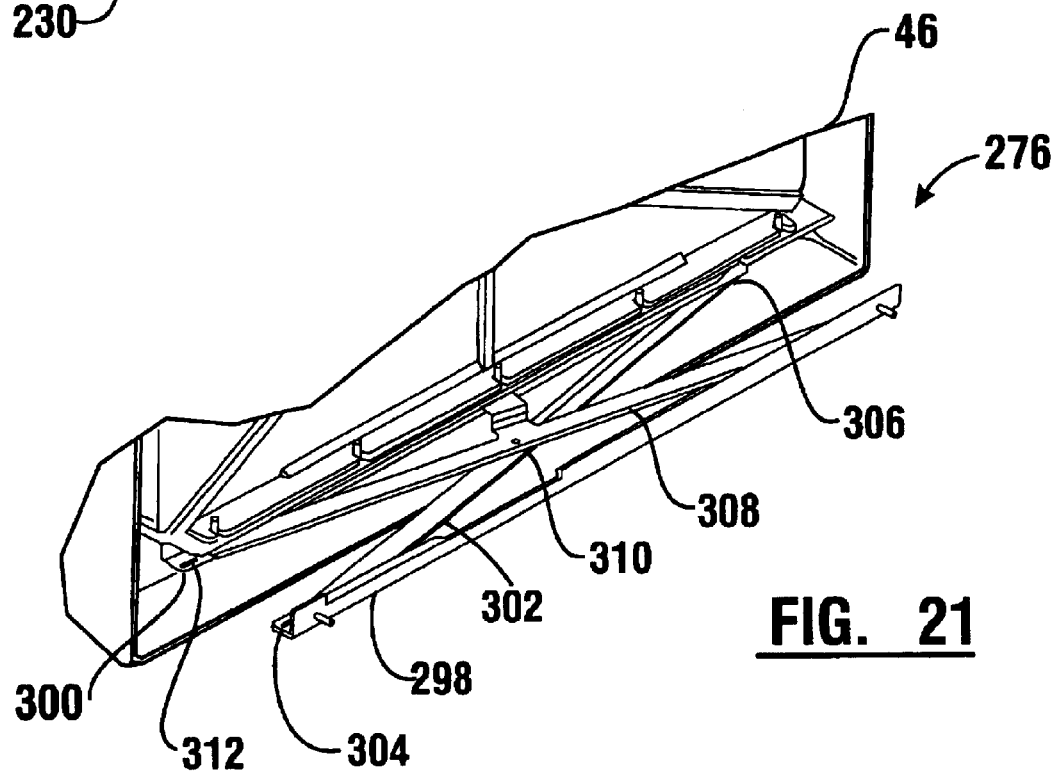
FIG. 21 is an enlarged view of the lower fascia moving mechanism shown in FIG. 19.

In the described embodiment, the fascia unit 46 is configured in the locked condition of the door 160 to fit generally in flush relation against the walls of the housing. To achieve this construction in the closed position of the unit, provisions are made for the fascia 46 to move away from the unit so that the door 160 can be opened. As shown in FIG. 19 through 21 this is achieved by mounting the fascia cover 46 to the door 160 through an upper extension mechanism 274 and a lower extension mechanism 276. The upper extension mechanism 274 is mounted to door 106 through a support 278. The support 278 includes a slot 280 which extends generally parallel to the face of door 160. As best shown schematically in FIG. 22, a pin 270 on member 272 extends through slot 280 so that movement of the actuator member 260 causes the pin 270 to move therein.

A further support 282 is attached to the fascia cover 46. Link 272 is attached in pivoting connection to support 282 at an end opposite of slot 280. The connection of link 272 to support 282 is through a pin 284 having an axis rotation that is fixed relative to support 282.

Link 272 is rotatably connected to a further link 286 about a central pin 288. Link 286 is attached to support 278 through a pin 290 having a fixed axis of rotation. Link 286 is attached to support 282 through pin 292 which is movable in a slot 294. As best shown in FIG. 22, a biasing member 296 acts on the upper extension mechanism in a manner tending to hold cover 46 adjacent to door 160.

The lower extension mechanism 276 generally is constructed in a manner similar to upper extension mechanism 274. Extension mechanism 276 includes a support 298 in operative connection with door 160. A support 300 is in operative connection with the movable cover 46. A link 302 is in movable connection with support 298 through a first slot 304 and is in pivoting connection with support 300 through a pin 306. A further link 308 is connected to link 302 by a pin 310 and is connected to support 298 about a pin not shown. Link 308 is further connected to support 300 through a slot 312. A biasing member (not shown) is connected to the lower extension mechanism 276 to bias the cover 46 in an inward direction.

As will best be appreciated from FIGS. 22 and 23, movement-of the supplemental bolt 256 to a retracted position moves actuating member 260 inward relative to slot 262. This moves pin 277 outward relative to slot 275. Such movement causes links 272 and 286 to move in a scissors action moving cover 46 outwardly relative to door 160. Links 302 and 308 of the lower extension mechanism 276 moves similarly further urging the fascia cover 46 outwardly to the position shown in FIG. 22. The access door is connected through hinges 267 to the housing. When the holding mechanism is opened the fascia 46 moves outward away from the hinges and the housing. This enables the door 160 to be opened without interference from the fascia 46.

Similarly when door 160 is closed, movement of the bolt 232 and the supplemental bolt 256 to an extended position moves the actuating member 260 and link 272 to move fascia 46 inward. Thus as the boltwork on door 160 is moved to a secure condition, the cover 46 is moved against the enclosure. As can be appreciated alternative forms of the fascia or other cover may extend around one or both sides and/or the top of the enclosure provided the cover moves outward sufficiently to enable opening the door.

It should be understood that in alternative embodiments the movement of the bolt 232 may be used to move the lower extension mechanism 276 in a manner similar to the way that the upper extension mechanism 274 is moved by the supplemental bolt 256. In such alternative embodiments the positive movement of the mechanisms at both ends of the fascia provide for reliable and controlled movement of the cover 46.

As shown in FIG. 19 the cover 46 includes the movable door 44 which is moved to provide a user with access to dispensed coin rolls. Door 44 in this exemplary embodiment has thereon projections generally indicated 314. The projections 314 generally define one or more Z-shaped slots on an inner face of the door. An actuator 316 is operative-to move a follower member (not shown) relative to the slot. Movement of the actuator 316 is controlled responsive to the terminal processor so that when a user is authorized to receive coin rolls, the user is enabled to move door 44 to an open position. When the user is not authorized to open the door, the actuator 316 operates to hold the door in a closed position. In an exemplary embodiment the door and actuator are configured to operate in a manner similar to that disclosed in U.S. Pat. No. 5,590,609 owned by the Assignee of the present invention and which is incorporated by reference as if full rewritten herein. Of course, in alternative embodiments of the invention alternative types of actuator mechanisms may be used.

Figure 26:
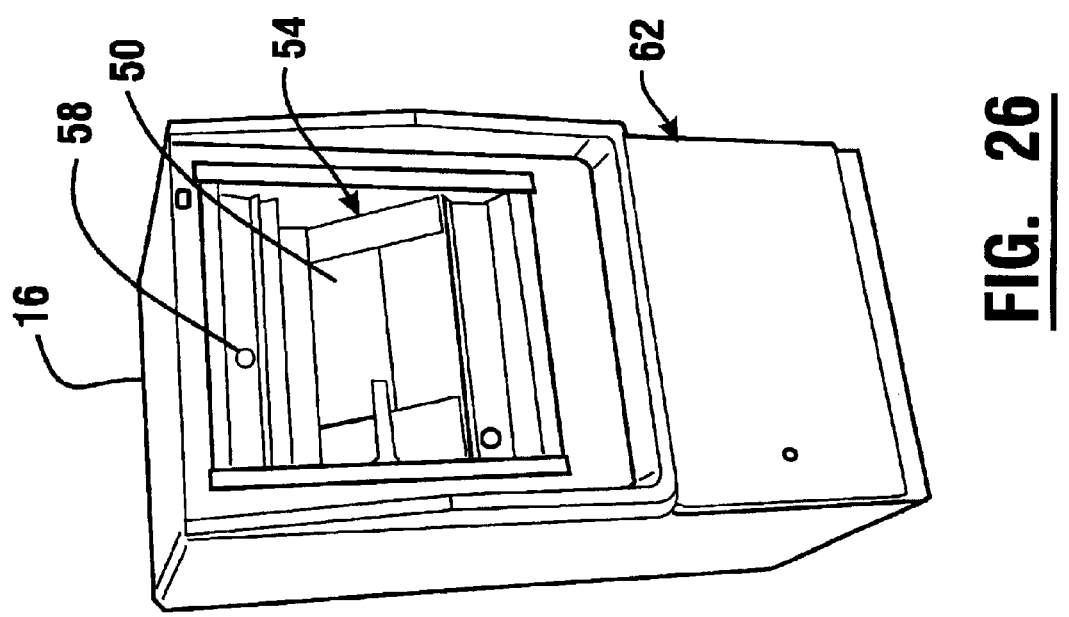
FIG. 26 is a front isometric view of the bag depository portion of the apparatus shown in FIG. 1.
Figure 28:
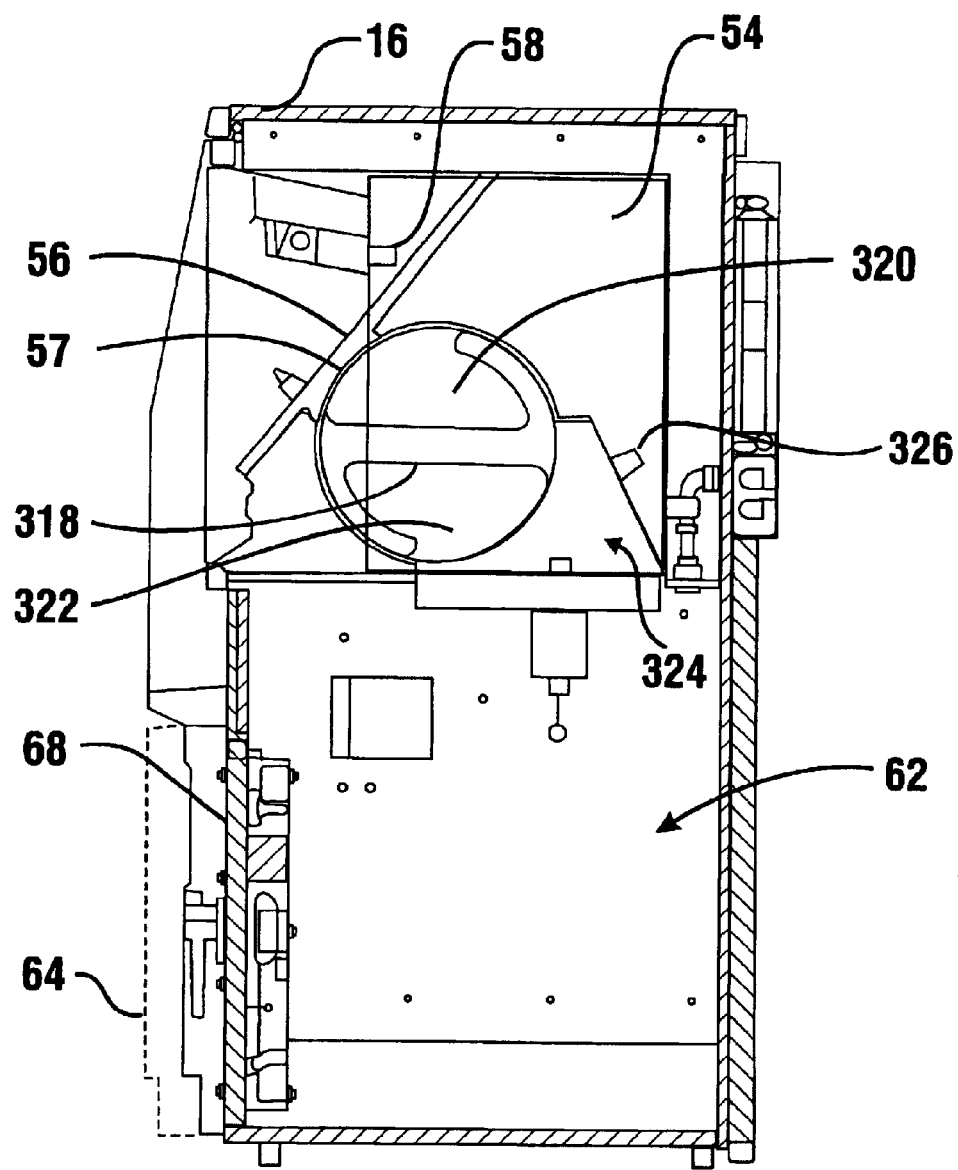
FIG. 28 is a cross-sectional view of the bag depository portion shown in FIG. 26.

FIGS. 26 through 28 describe housing portion 16 which is operative to accept bag deposits or other types of deposit items therein. Depository head portion 54 includes a rotating pocket assembly 318. Rotating pocket assembly 318 serves as an item transport for deposit items and is rotatable responsive to a drive or similar moving device to rotate relative to head portion 54. Rotating pocket assembly 318 includes a first pocket 320 and a second pocket 322. When door 56 is moved to an open position a user is enabled to access the interior area of the housing and the pocket adjacent thereto through the open access opening 57. After a user inserts a bag or other item to be deposited into the adjacent pocket, the rotating assembly 318 is rotated preferably in a clockwise direction as shown in FIG. 28. The deposited item is transported away from the access opening so it cannot be accessed through the opening by a user. The deposit item is passed by gravity out of the pocket through a throat area 324 and moves into the internal storage area of the secure chest 62. As will be appreciated from FIG. 28 the rotating assembly need only rotate one hundred eighty degrees to transfer each deposited item into the secure chest portion.

In the embodiment shown, the head portion 54 includes the exterior camera 58 which captures the user image. The throat area 324 further includes a camera 326 therein. Camera 326 serves as an interior imaging device which has a field of view which includes the interior area of the housing. In one exemplary form of the invention the camera 326 is an infrared camera which is capable of delivering images of items in near total darkness conditions which may exist in the internal area of the housing in the vicinity of the throat area. This feature enables capturing images of both the user depositing items into the bag depository as well as the items deposited. This provides further documentation of the making of deposits. The internal imaging device and external imaging device may be placed in other locations in alternative embodiments. Of course, in alternative embodiments other types of cameras or imaging systems may be used. Such systems may include having lighting provided in the throat area so as to illuminate the deposited items. The images of the user and the deposited items are captured in the exemplary system using an AccuTrack™ digital video recorder playback system commercially available from Diebold, Incorporated of North Canton, Ohio or a system of the type described in connection with U.S. patent application Ser. No. 60/103,731 filed Oct. 9, 1998, the disclosure of which is incorporated by reference as if fully rewritten herein. Of course, in alternative embodiments other image capturing mechanisms may be used.

In the exemplary embodiment the user image and the corresponding item image are stored as digitized images in a data store operatively connected to the imaging devices and at least one computer. The images are preferably stored together or in correlated relation such that they can be recovered together to show what the deposit item looked like and the appearance of the person who deposited it. In some exemplary embodiments the user image and item image are stored together as a single combined image to create a permanent correlation between the user and the deposit item.

The operation of the described exemplary embodiment in connection with conducting merchant banking transactions is explained in connection with the screens presented in FIGS. 29 through 54. The exemplary embodiment of the invention is operative to perform deposit and exchange transactions in the manner described responsive to inputs to the user interface. Of course, in other embodiments additional or alternative transactions may be performed.

Figure 29:
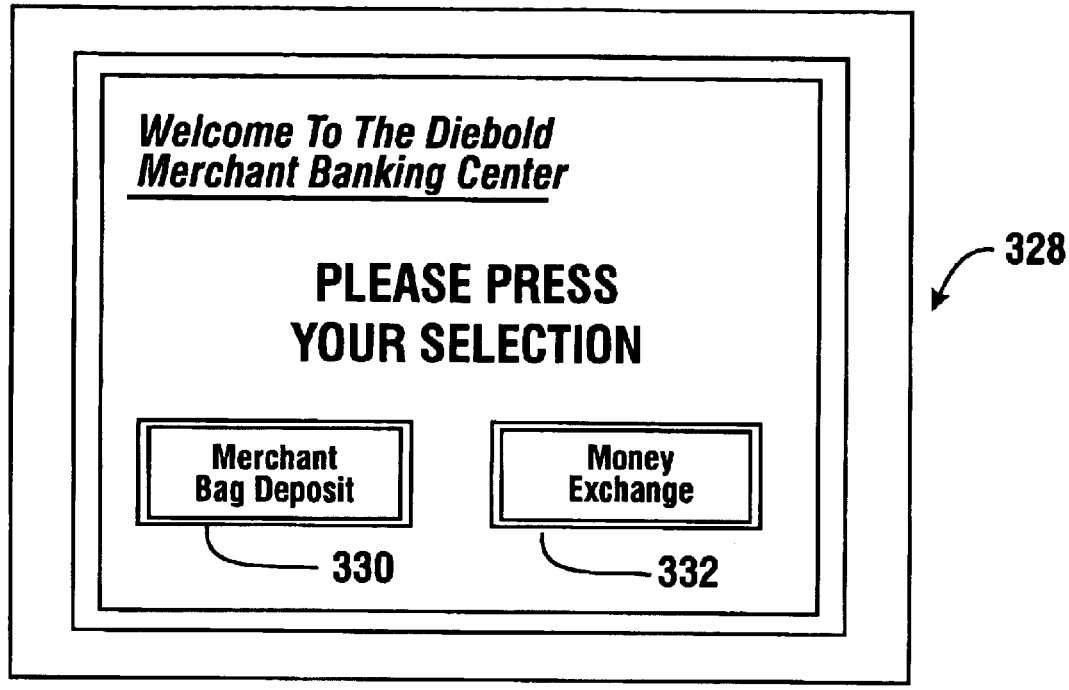
FIGS. 29–43 are exemplary screen displays output through the user interface of the apparatus which exemplify a logic flow used in connection with money exchange transactions.

In the exemplary embodiment, when the apparatus 10 is in a wait or idle state waiting to conduct a transaction, a screen 328 which is shown in FIG. 29 is presented. The screen is produced in the exemplary embodiment responsive to the terminal processor 74 and data in the data store 76. Screen 328 prompts the user to select either a merchant bag deposit icon 330 or money exchange icon 332. This is done by the user bringing their finger adjacent to the touch screen. Of course, in other embodiments other screens may be presented.

It should be understood that embodiments of the invention may operate to present other types of opening screens. Such screens may provide marketing information to prospective users approaching the machine. Such marketing information may be provided from the information stored in the data store 76 or may be based on presentations loaded into the apparatus 10 from a remote location such as marketing server 120 shown in FIG. 4.

For purposes of describing an exemplary transaction, it will initially be assumed that a user selects the money exchange icon 332 in FIG. 29. This causes the terminal processor to display a screen 334 shown in FIG. 30. This screen prompts the user to select either an icon 336 indicating that they intend to use a bank card when conducting the money exchange transaction or alternatively an icon 338 in which a money exchange transaction is conducted without the use of a bank card. For purposes of this exemplary transaction it will be presumed that the user selects icon 338 which is an input through which they indicate that they are not going to use a card.

Figure 30:
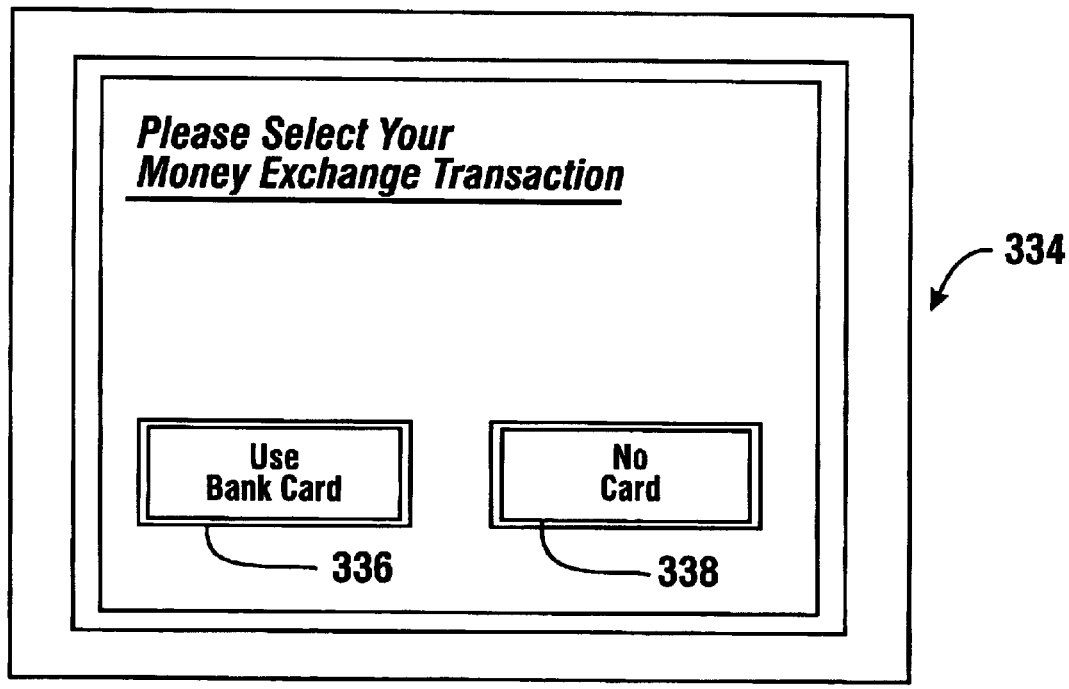
Figure 31:
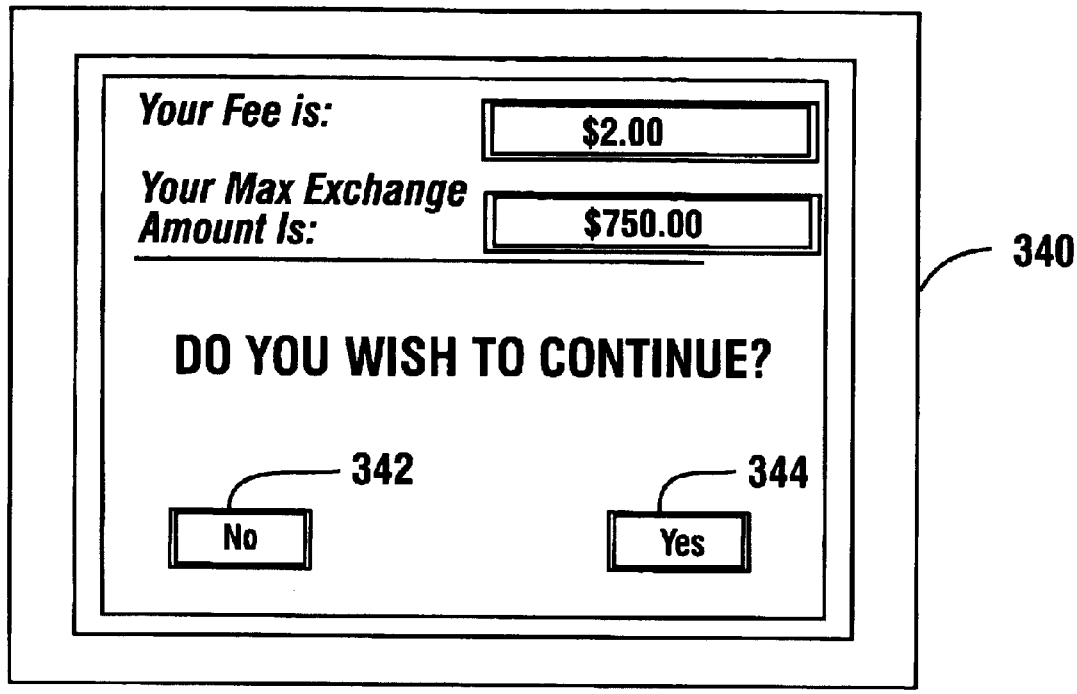
Figure 32:

In response to the user selection in FIG. 30, a screen 340 shown in FIG. 31 is caused to be displayed by the terminal processor on the touch screen 20. Screen 340 advises a user in this exemplary transaction that a $2 fee will be charged as a service charge amount and that the maximum amount that can be exchanged is $750. Of course, these thresholds are settable by the owner of the apparatus through programming of the terminal processor. In screen 340 the user is given the option of selecting icon 342 if they wish to discontinue the transaction. The user is also presented with the option of selecting icon 344 if they wish to continue. If the user selects icon 342 indicating that they wish to stop the transaction, the terminal processor responds to this input by displaying screen 346 shown in FIG. 32. Screen 346 indicates that the transaction has been canceled, and after a period of time the terminal processor returns the logic flow relative to the initial screen 328 or other appropriate screen.

Figure 33:
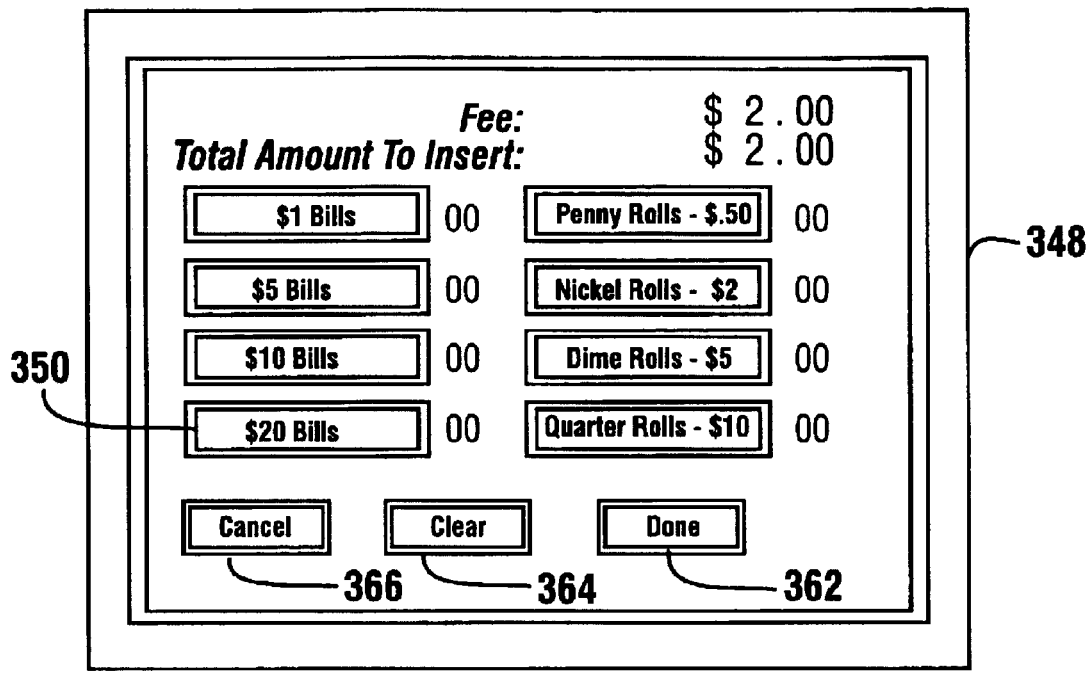

If the user elects to continue the transaction by touching icon 344 from screen 340, a screen 348 shown in FIG. 33 is displayed on the touch screen. In screen 348 the user is allowed to select the quantities of various bill types and roll coins that they wish to receive from the apparatus 10. Each denomination of bills and coins is associated with a respective icon which the user can touch to input the quantity of those particular items the user wishes to receive. In the exemplary embodiment the user can input the bill and coin types in any sequence selected by the user. For purposes of this exemplary transaction, it will be presumed that the user touches an icon 350 which corresponds to ten dollar bills.

Figure 34:
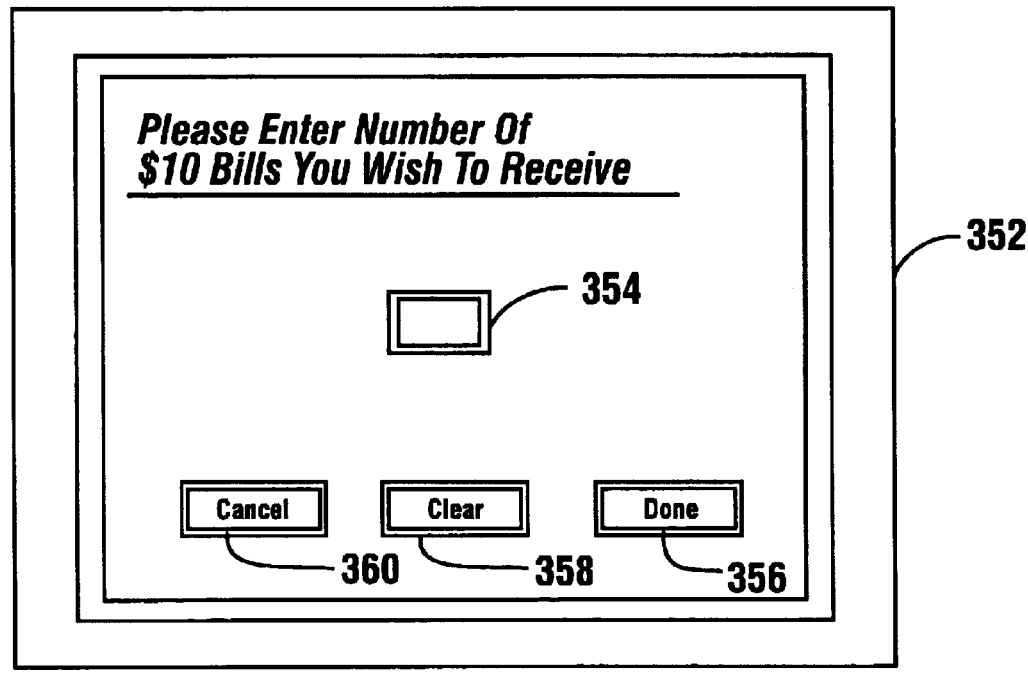

In response to the user touching icon 350 the terminal processor causes a screen 352 shown in FIG. 34 to be displayed. Screen 352 prompts a user to indicate the number or quantity of ten dollar bills they wish to receive. In response the user indicates the number of ten dollar bills by touching keys on the keypad 26. This number is displayed in a box 354 on the screen 352. If the user correctly inputs the number of ten dollar bills they desire, they can press the icon 356 to indicate they are done. The terminal processor returns to screen 348 shown in FIG. 33 with the number of ten dollar bills requested shown next to icon 350. If, however, from screen 352 the user decides that they have input an incorrect number of ten dollar bills, they can touch icon 358 and input a different number through the keypad. If the user decides that they do not want ten dollar bills, they can touch the icon 360 to indicate that they wish to cancel the request for ten dollar bills and return to the screen 348.

Once the user has input the amount of ten dollar bills they wish to receive, the user may repeat the process for each of the denominations of bills or coin rolls that they wish to receive. Each time an icon corresponding to a different denomination of bills or coins is selected, the user is enabled to input the quantity through a screen similar to screen 352. Through this entry of successive type and quantity inputs the user selects what they wish to receive. In the exemplary embodiment the terminal processor is operative to calculate the value associated with each quantity of each respective coin roll or bill type requested by the user. These amounts are included in a total amount which along with the service charge amount, is displayed to the user through the screen 348. The computer operates to update the total amount displayed by including the amount associated with each selection by the user of a quantity of coin rolls or bill types.

When the user has completed the process of indicating the bills and coin rolls they wish to receive, they may touch the "done" icon 362 in screen 348. If, however, the user has made a mistake and/or wishes to start over, they may touch a "clear" icon 364 in screen 348 which clears the screen to indicate zero quantities next to all denominations. Likewise if the user wishes to cancel the money exchange transaction, they may touch a cancel icon 366.

Figure 35:
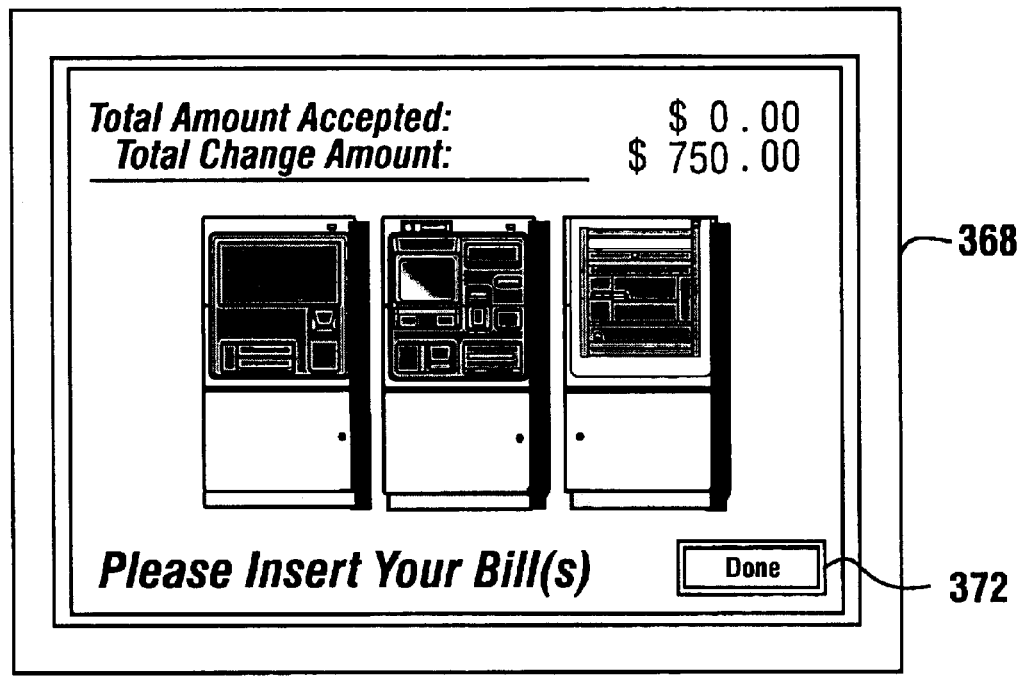

For purposes of the exemplary transaction, it will be presumed that the user requests a total of $748 in bills and coins, which with the $2 transaction fee produces a total change amount of $750. When the user presses the "done" icon 362 from screen 348 a screen 368 shown in FIG. 35 is caused to be displayed on the touch screen. Screen 368 includes a graphic representation of the apparatus 10 with an arrow indicating to the user where to insert their bills into the machine. This arrow points to a graphic representation of the opening to the bill acceptor on the second housing portion. The user then inserts currency notes. The "total amount accepted" quantity shown in screen 368 is incremented upwards each time the user inserts notes that are identified and accepted by the note accepting mechanism.

If the user inserts notes that are not identifiable or acceptable by the note accepting mechanism, such notes are returned to the user who may try to reinsert them again or may try other notes. The user may input notes equaling the total change amount or may input a somewhat greater or a lesser amount. If in the process of inserting the notes the user is slower than a time which is programmed in the data store associated with the terminal processor, a screen 370 shown in FIG. 36 may be displayed. Screen 370 includes icons which can be touched to indicate that the user needs more time or that the user is not requesting additional time.

When the user has inserted the funds that they intend to insert into the note acceptor in response to screen 368, the user touches the "done" icon 372. In response to touching the icon 372, the terminal processor operates the note dispensing mechanism and the coin dispensing mechanism to dispense the quantities and types of bills and coin rolls that the user has requested. In the described embodiment the requested bills are output through the opening from the note dispenser 30 in the first housing portion 12. The coin rolls are dispensed into the coin mechanism 162 and the user is enabled to slide open the door 44 to remove such coins. The terminal processor 74 may further output screen prompts for the user to take the dispensed bills and rolls. This may include screens with graphics similar to those in screen 68 which show the apparatus along with indicating arrows showing the user where to remove the bills and/or how to open the door to access the coin rolls. Such graphical presentations are helpful to a user who may be unfamiliar with the operation of the machine. Alternatively, other approaches such as flashing indicators in the area of the coin roll door or note dispenser may be used.

In some circumstances a user will not be able to insert the exact amount of cash that is required to produce the change and service charge. If from screen 368 the user touches the icon 372 when the total amount accepted is above the total change amount, the terminal processor is operative to dispense to the user all of the change requested as well as change in the form of additional bills (and/or coin) corresponding to the excess amount that the user has input. In this way the user is enabled to insert the amount they have and receive change from the machine. If the user indicates that they are "done" by pressing the icon prior to having input the amount they requested, the terminal processor will satisfy as much of the request as the user has provided funds to accomplish. This will be done in accordance with the programming of the terminal processor. In the exemplary embodiment the terminal processor is operative to satisfy the dispensing requests by dispensing items until any further dispense would be in excess of the credit the user has on the machine. The user's credit in this situation is the amount the user has input less the service charge. In the case of a card based dispense which is done in response to messages from a host computer, the maximum credit may be set by the institution and the limit may be this maximum less the service charge amount.

In exemplary embodiments of the invention the apparatus operates to satisfy the customer's requests in a sequence. The sequence may consist of actually dispensing the items in an order or allocating the customer's available credit to certain of the items requested prior to making the dispense. The sequence is generally established in a predetermined manner based on the programming of the terminal processor.

In some exemplary embodiments the terminal processor is programmed so the sequence causes the terminal processor to be operative to satisfy the requests for the lowest denominations first until the money is used up. Thus, for example, the terminal processor will operate in accordance with its programming to first fulfill the user's request for penny rolls, then one dollar bills, then nickel rolls, then five dollar bills, then dime rolls, then ten dollar bills, then quarter rolls, and then twenty dollar bills. If the amount of money cannot satisfy the request for one denomination of coin or currency, the terminal processor will dispense as many of the requested denomination as the user has provided value for and then will dispense appropriate change. Alternative embodiments of the invention may be programmed to provide either the coin first then the notes or vice versa. The sequence may be lowest to highest denomination or other order.

Other alternative embodiments may be programmed to deliver partial requests in the order that the user input them. For example, if the user requested ten dollar bills first in the input of the request, all of the ten dollar bills that the user requested will be dispensed (assuming that the user has input sufficient money to cover the requested ten dollar bills). Then the next item input will be dispensed until the value input has been used up. In this way the user is enabled to receive the full value in change of the amount of funds they input. In addition, if the user still requires additional funds, such funds may be obtained by either accessing a source of monetary value associated with a card in a manner later discussed or by reinserting dispensed bills and by obtaining change therefore.

Figure 37:
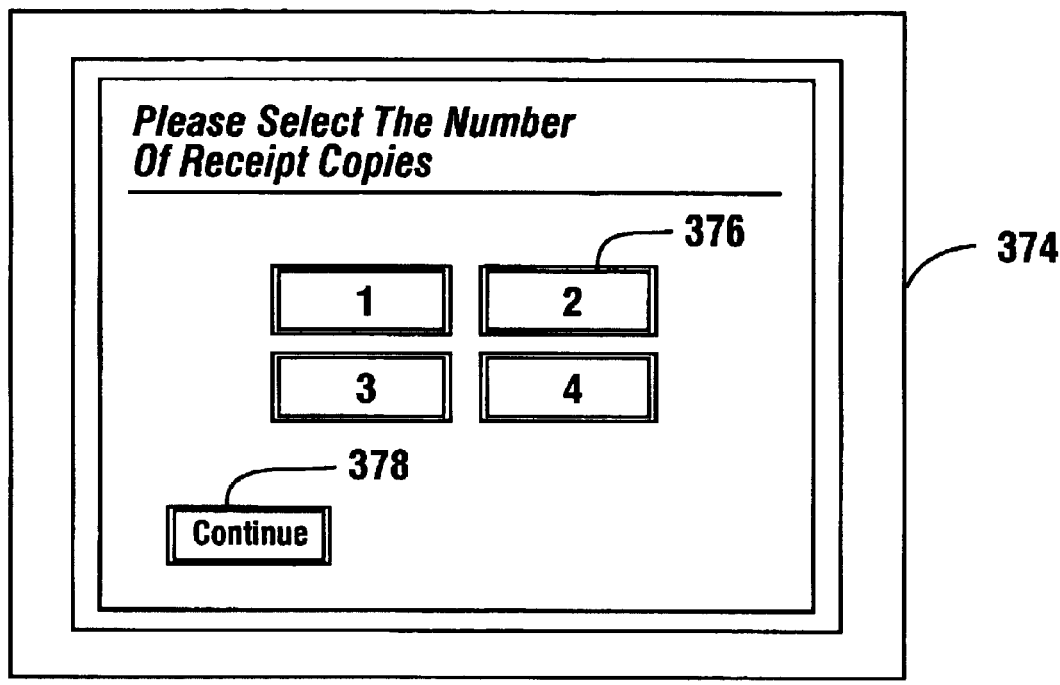
Figure 38:
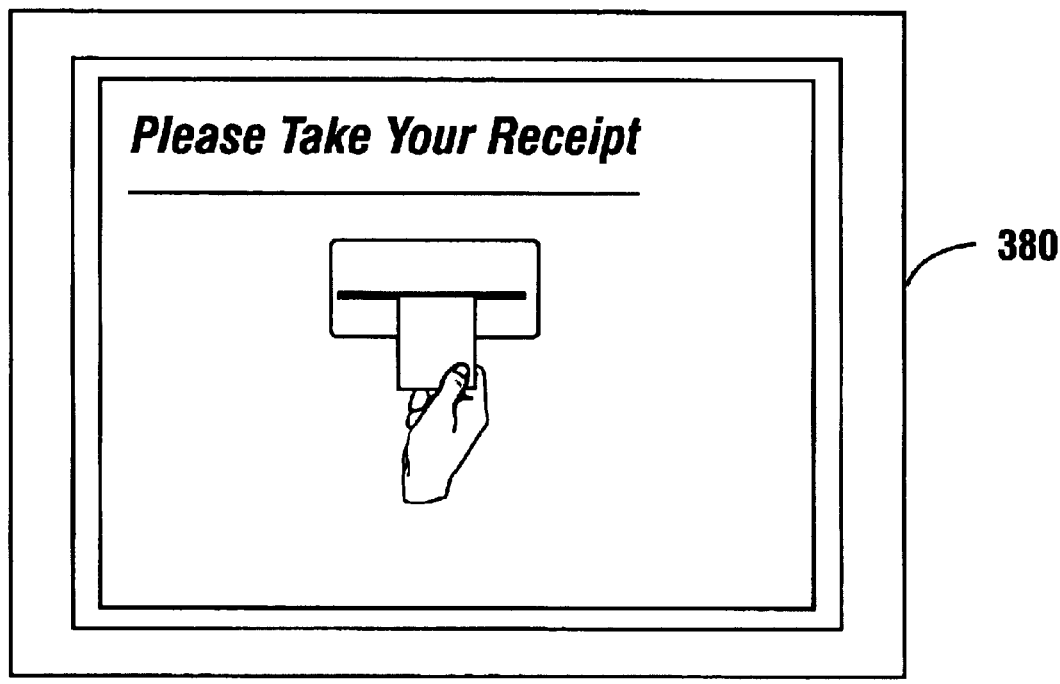
Figure 39:
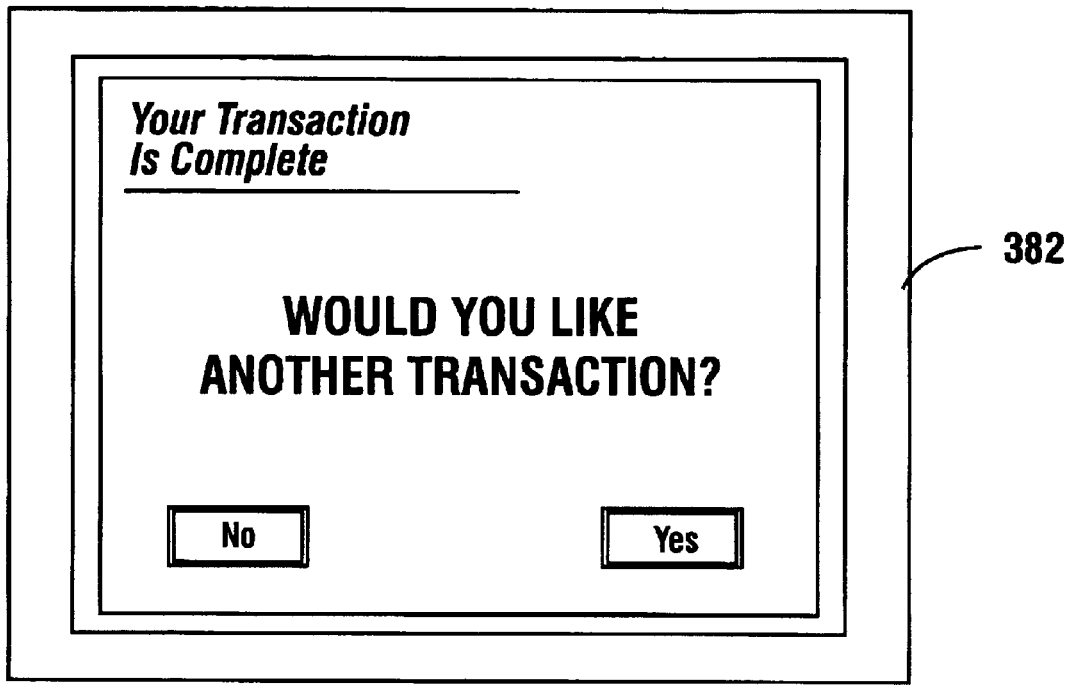
Figure 40:
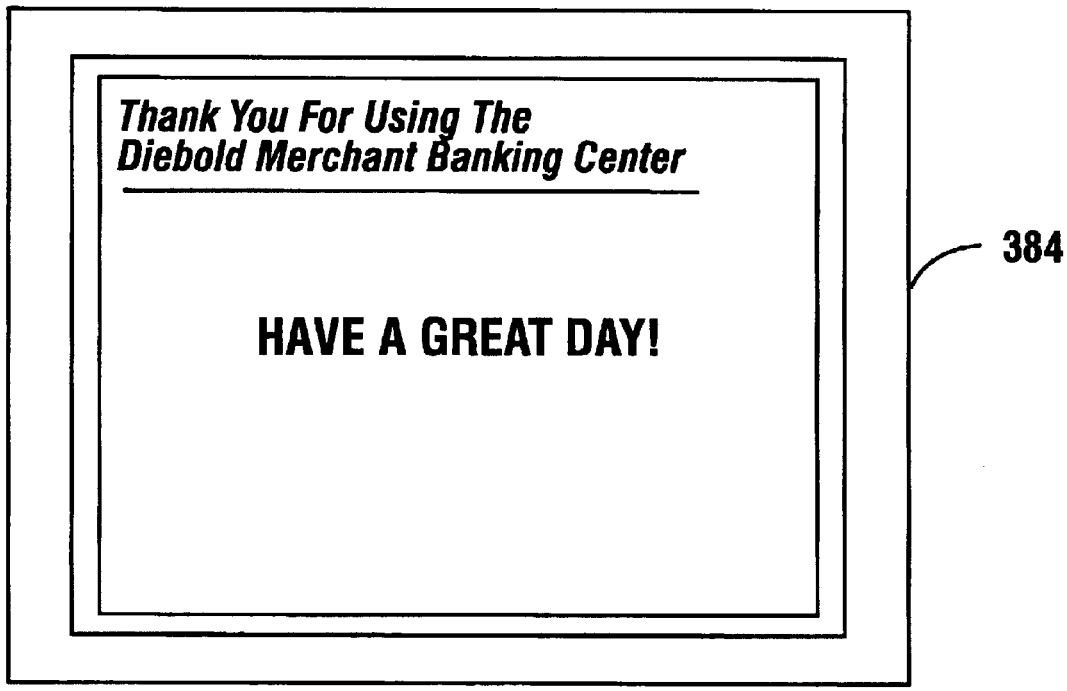

In response to the completion of the dispensing transaction, the terminal processor of the exemplary embodiment causes a screen 274 shown in FIG. 37 to be displayed on the touch screen. Screen 374 prompts the user to select one of four icons 376 indicating the number of receipt copies that they wish to receive. Often a user will prefer to receive several copies of the receipt for the transaction. Multiple copies of the receipt may be used to help verify that the deposit has been made. For example, a user may deliver one copy to their employer and retain one copy for their records to evidence the fact that the deposit was made. Likewise, multiple copies may be provided so one may be kept by the employee making the deposit, the store manager, the accountant and by other persons who may need to be notified of the transaction.

In addition or in the alternative, embodiments of the invention may provide for printing machine readable indicia instead of or in addition to human readable indicia on one or more copies of the receipt. As previously discussed in some embodiments the receipt may be provided electronically by the input of data to a portable module. The machine readable indicia may facilitate accounting and tracking deposits made into the machine. The receipt will generally include amount data and other data pertinent to the transaction. Some users may wish to not have a receipt printed and in screen 374 a user is enabled to avoid having a receipt printed by touching an icon 378.

In response to a user touching one of icons 376 a-receipt providing mechanism within the apparatus provides the requested number of receipt copies. This is preferably done with the printer 24 in the device printing the requested number of copies. The copies are passed outward through an opening in the first housing portion to the user of the machine. The terminal processor then causes a screen 380 shown in FIG. 38 to be displayed. Screen 348 prompts a user to take the receipt copies. Appropriate sensors are provided for sensing that a user has removed the receipt copies from the opening of the first housing portion. In response to sensing that the user has taken the receipts, the terminal processor of the exemplary embodiment is operative to cause a screen 382 to be displayed on the touch screen. Screen 382 prompts a user to indicate by touching either a "yes" icon or a "no" icon to indicate whether they would like to conduct another transaction. If the user touches the "no" icon, the terminal processor of the exemplary embodiment causes a screen 384 shown in FIG. 40 to be displayed.

If from screen 382 the user touches the "yes" icon, the terminal processor returns in the logic flow to cause screen 328 to be presented on the touch screen. From the screen 328 the user may select either of the icons presented therein. For example, the user may select icon 330 if they wish to deposit a bag of cash, checks, credit slips or other materials. If such icon is selected the terminal processor will execute the logic that will be later described in detail. If the user selects icon 332 the terminal processor will cause screen 334 to be presented again.

While the user could conduct a similar transaction to the one just described by touching icon 338, for purposes of the exemplary transaction it will be presumed that the user touches icon 336 to indicate that they wish to conduct a money exchange transaction using a bank card. Such a transaction will enable a user to receive notes or coin and charge them to an account such as a debit card account or credit card account. In alternative embodiments the user may also charge transaction amounts to other sources of monetary value such as other-accounts which may be accessed through a network or a source of monetary value which is represented by data on the card, such as data stored on a smart card.

Figure 41:
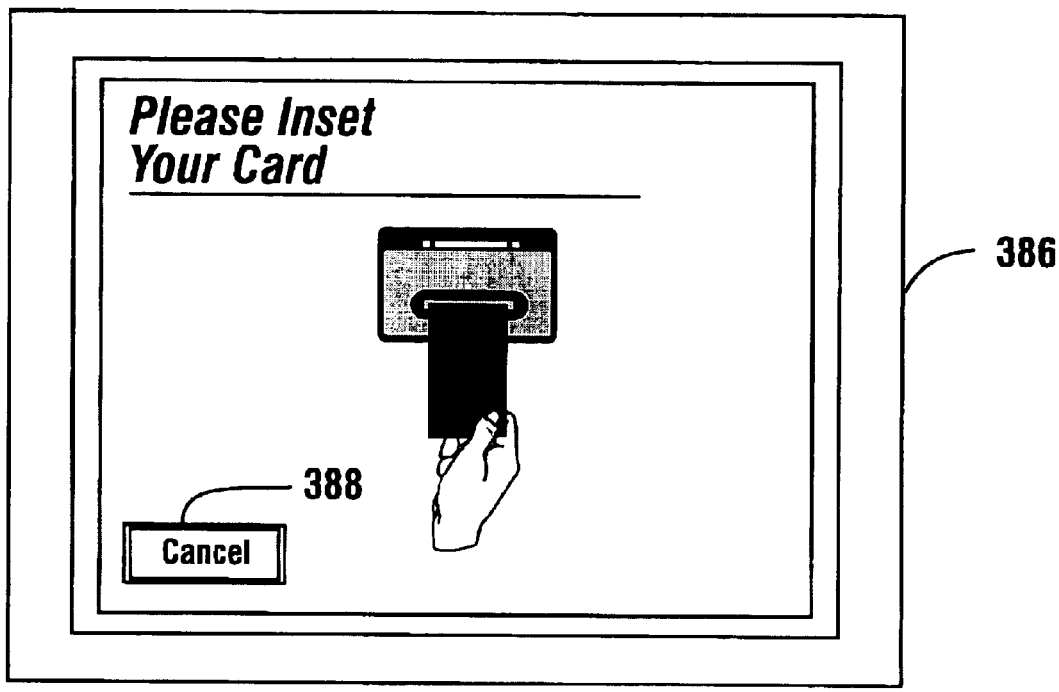
Figure 42:
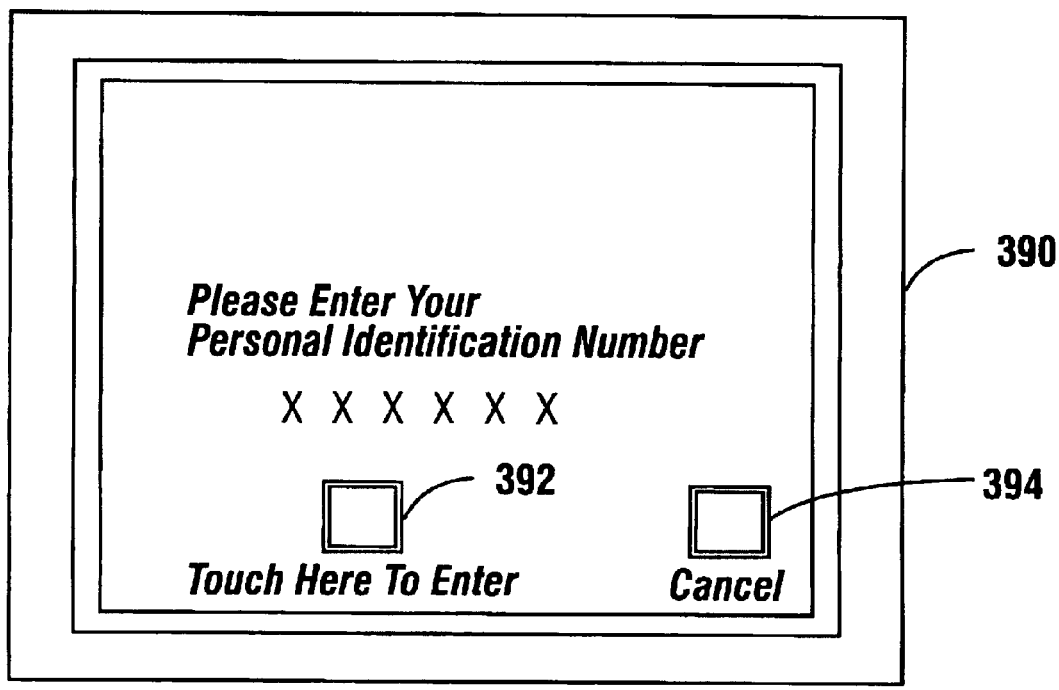
Figure 43:
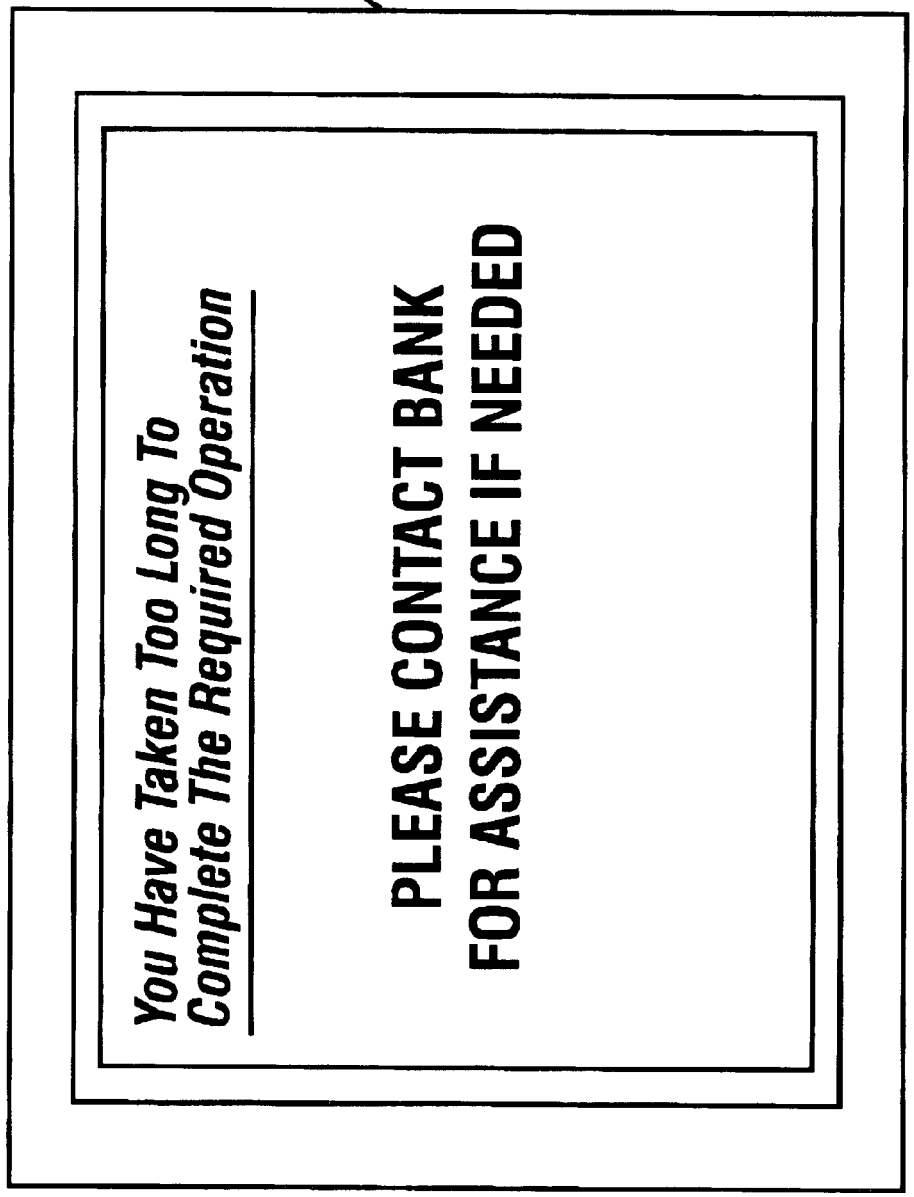
Figure 45:
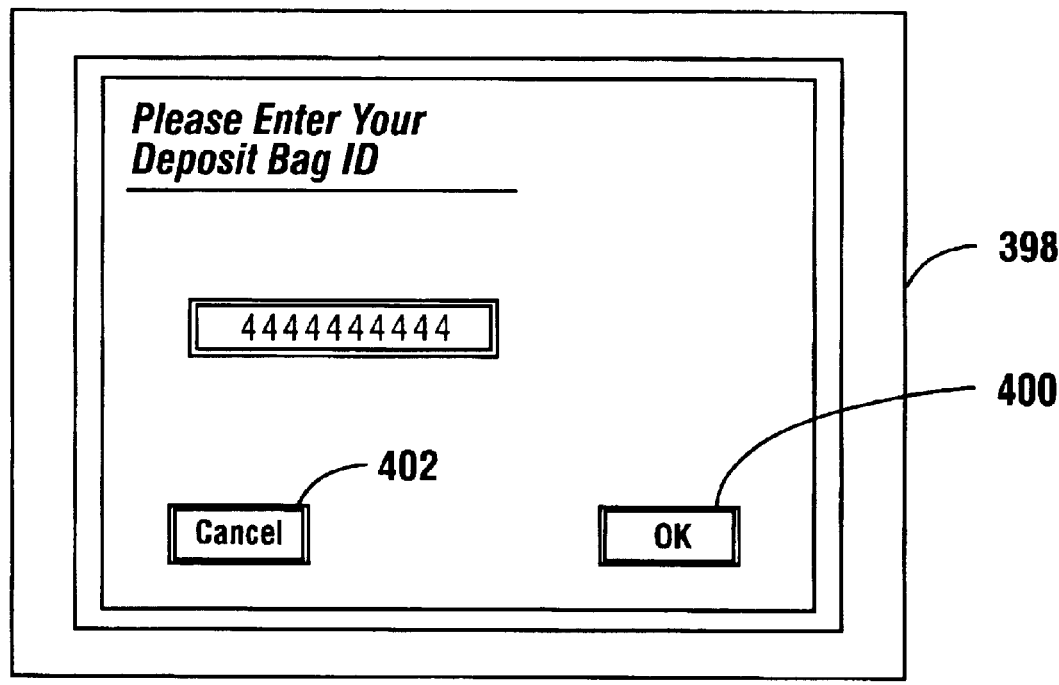
FIGS. 45–51, 53 and 54 are screen displays output by the user interface of the exemplary embodiment associated with a bag deposit transaction into the bag depository portion.

In response to the user selecting icon 336 in screen 334, the terminal processor causes a screen 386 shown in FIG. 41 to be presented. Screen 386 includes a graphic prompting a user to provide an input through insertion of their card into the card reader. As the card is inserted data encoded on the card is read. Screen 386 also includes an icon which a user may touch to cancel a transaction and to return to screen 328. In response to a user inserting a card into the card reader in response to screen 386, the terminal processor causes a screen 390 shown in FIG. 42 to be displayed. Screen 390 prompts a user to further provide a user input by entering their personal identification number (PIN) associated with their card. The user may enter their personal identification number through the keypad 26. On completing entry of the user input of the personal identification number, the user may touch an icon 392. If the user makes a mistake in the entry of their personal identification number, they can start over by touching an icon 394.

After the user has input their personal identification number, the terminal processor causes screen 340 to be displayed. If the user touches icon 344 in screen 340, screen 348 is displayed. The user is then enabled to select the quantity and denomination of coins and bills that they wish to receive in a manner similar to that discussed in connection with screen 352 shown in FIG. 34. In the exemplary embodiment the total of the amounts associated with each successive entry is displayed to the user. After the user has input the values of bills and coins that they wish to receive, they touch icon 362. Of course, if errors are made or the user wishes to cancel the transaction, the appropriate icons may be touched. In response to the user indicating the completion of the inputs in screen 348, the terminal processor is operative to generate a request message to the source of monetary value corresponding to the indicia encoded on the card input by the user. Such communication may be, for example, through exchange of Diebold 91 X financial transaction messages developed by Diebold, Incorporated, with a network processor. Alternatively, other forms of messages may be used.

In the exemplary transaction a source of monetary value which is usually a bank receives the request message from the apparatus 10. A host computer associated with the source of monetary value is operative to compare the inputs by the user of the data encoded on the card and the PIN for a corresponding relationship to stored data for authorized users of accounts. If the user input data corresponds to an account and an authorized user thereof the transaction proceeds. A host computer operated by the bank determines if the account associated with the indicia on the user's card contains the amount of funds that the user has requested to be debited to provide change, or if the user has credit available in the amount of finds that the user has requested. If so, the bank returns a response message through the network to the terminal processor in the apparatus 10. The response message includes indicia indicative of whether the user is to be granted a credit amount and/or the transaction should be allowed to proceed. If so, the apparatus 10 is operated by the terminal processor to dispense the requested quantities of coins and bills. If not, the terminal processor is operative to generate an output on the touch screen advising the user that the transaction could not be conducted. Alternatively the user may be provided with the items requested to the extent of their limit less the transaction fee.

If the transaction is carried forward, the user is again presented with screen 374 in which they are requested to indicate the number of receipts that they wish to receive. In response to indicating the number of receipts, the user is presented with the number of receipts they have requested, and the terminal processor operates in the manner previously discussed to complete the transactions. In addition, in the preferred embodiment, the terminal processor is operative to forward to the bank a completion message indicating that the transaction was properly completed.

An exemplary embodiment of a receipt provided by apparatus 10 at the conclusion of the money exchange transaction is shown in FIG. 44. This exemplary receipt 396 provides a record of the transaction including the quantities of bills and coin requested and the quantities actually dispensed along with amount data. Other information including the time and date, terminal number, service charge and other information is also shown. This provides the user with information concerning the transaction. Corresponding information concerning the transaction is also stored in the terminal to provide a record of amounts accepted and dispensed as well as charges against user accounts. Of course, corresponding information may be stored at the host, in other data stores and computers in the network to which the apparatus 10 is connected.

A useful aspect of the exemplary embodiment of the present invention is that the programming associated with the terminal processor 74 is operative to generate transaction messages which include indicia representative of denominations and quantities of bills and coin rolls dispensed to a user. Prior art systems have been operative to indicate only the monetary value to be charged or debited to a user's account. Such systems have not provided information representative of the particular denomination, type and quantity of items dispensed which make up the total amount of funds transferred.

In automated teller machine transaction systems commonly in use today, the messages exchanged between ATM terminals and host computers have predefined message formats. A common type among these formats are Diebold 91X formats developed by the Assignee of the present invention. The Diebold 91X formats, like other formats, includes a request message which is produced by the terminal which indicates among other things the type of transaction that the customer has requested, the total amount of value involved (if any), and the customer's account and PIN number. In addition, other transaction data may be included depending on the specific terminal or other circumstances involved.

In response to the request message, the host computer is operative to send back to the ATM a response message. A response message is operative to provide an indication of whether the transaction is authorized and the other account or balance information that responds to the transaction the user has requested. In response to carrying out the activity requested by the customer and authorized by the response message, the ATM terminal provides a completion message. The completion message indicates to the host computer the successful or unsuccessful carrying out of the transaction. If the transaction could not be carried out, the completion message may include an error message associated with the particular malfunction.

Exemplary forms of the messages used in connection with the present invention unlike conventional messages, include in at least one of such messages, type and quantity data for the items dispensed. Such type and quantity data may be included for each denomination of coin roll and bill type that the apparatus 10 is capable of dispensing. Such information may be included in the request message to indicate what the user wishes to have dispensed, as well as the total value to be charged to the user's account. Likewise, data representative of such items and quantities may be included in the response message to indicate to the apparatus 10 what is to be dispensed. Finally, the completion message may also indicate to the host the items and quantities that were actually able to be dispensed. In some embodiments, less than all the messages transmitted may include such quantity information. For example, only the request or the completion message sent to the host may include data representative of what is dispensed from the machine. Such information enables the operator of the machine to track what has been dispensed.

Alternative embodiments of the invention may include other approaches to dispensing requested items to a user. For example in systems where transaction fees vary between different categories of users or transaction types, the computer at the apparatus or the remote host computer may calculate the particular service charge amount for the particular user. The service charge amount may be based on various factors including the types and quantities of items the user wishes to have dispensed. The charge may be based on other factors such as the balance in the account, the type of account or the institution holding the account from which the credit amount applied to dispensing the items is obtained. In such embodiments the host calculates the service charge amount and includes it in a message from the host to the apparatus.

The apparatus preferably outputs the service charge amount on a display to a screen to the customer. The screen includes a prompt requesting that the customer provide an input through an input device concerning whether they agree to pay the service charge amount. If the customer provides an input indicating they accept the service charge amount the transaction is carried forward. If the customer provides an input indicating that they do not accept the service charge, or they fail to provide an input before a machine time out, the transaction does not proceed.

In the exemplary embodiment which uses the approach of using a three message set to communicate with a host for a transaction, two sets of messages may be used. In this exemplary embodiment a first request message is sent to the host. This first request message includes data corresponding to the card or account number, customer PIN and other data as may be necessary to identify the account or user, and to determine if the transaction is authorized. The first request message further preferably includes data representative of the transaction(s) the user is requesting which enables calculation of the service charge associated with the requested transaction.

The host or a connected computer verifies the card and calculates the service charge in response to the requested transaction type, account data and other parameters in accordance with its programming. The host then sends a response message which includes data representative of the service charge to the apparatus. Responsive to the service charge data the apparatus operates to display the service charge to the customer and a prompt to have the user indicate through an input whether they wish to accept the fee. The first response message may also contain data representative of the limits on available credit for the transaction and/or information on coin or bill denominations that can be dispensed to the user. This information may also be displayed on screens to the user. The apparatus sends a first completion message indicative that the service charge is being displayed and/or that the terminal is ready.

Responsive to the user providing the input indicating that the service charge is accepted by the user, a second request message is sent to the host. The second request message includes data indicative that the user has accepted the service charge. This may include the service charge or alternatively other data to carry out transactions which indicate the assessment of a service charge to the user.

In response to this second request message the host builds a second response message. The second response message indicates to the apparatus how to proceed with the transaction. The second response message may also include one or more instructions to carry out the transaction activities and to run the transaction devices in response to transactions requested by the user. The apparatus responsive to carrying out the operations in accordance with the second response message sends a second completion message to the host. Of course if a malfunction has occurred an appropriate status message will be generated or appropriate data will be sent in the completion message to the host.

An advantage of this exemplary approach is that it enables the use of these message transactions sets for which many ATM systems are already programmed. It also enables individual calculation and acceptance of transaction fees by users. It further provides for responding to request messages with responses more quickly and facilitates a synchronous transaction processing. Such features may find applicability in connection with merchant banking devices as well as with consumer operated ATM machines.

In the exemplary embodiment the information about dispensed denominations and quantities sent to the host or other connected computers is useful in determining when the various supplies of coin rolls and currency notes require replenishment. This information may be very accurately tracked if the operator of the machine requires all users to submit a merchant access card as a requirement to conducting transactions. In this way deposits to the note acceptor can be treated as deposits to the user's account, even though such deposits are going to be followed by immediate withdrawals represented by the dispensing of currency bills and coin rolls. Such activities present the advantage that all of the transactions for a particular merchant can be recorded, even those involving cash. Thus the merchant is enabled to track all transaction activity including currency exchange transactions.

Alternative embodiments of the invention may provide for sending messages corresponding to the dispense of notes or coin to locations in the network 116 other than the source of monetary value that is authorized to grant a user authorization to conduct a transaction. For example, messages indicative of the dispense of, coin rolls or currency, may be sent to servers associated with persons responsible for tracking the levels of various bills and coin rolls within the apparatus. Such messages may be received and appropriate calculations made as to when replenishment of such items may be required in various machines. Such information may be helpful, for example, in determining the amount and types of rolled coin to wrap, order or otherwise procure from another source. Such information may also be used in calculating pick up and delivery routes between various merchant banking apparatus that require such replenishment. Alternatively sensors can be used to sense levels of rolled coin types and bill types in storage. Upon the sensor reaching the set level a message may be selectively dispatched to the appropriate roll coin replenisher or bill replenisher. Such messages may be sent through various messaging systems including through the Internet and at various times or in response to sensing various levels. Of course, other approaches may be used depending on the nature of the system in which the apparatus 10 is operated.

As previously discussed, merchants operating the apparatus 10 are also enabled to make other types of deposits. For example, embodiments of the invention may enable the user to conduct money exchange transactions in response to the input of checks or instruments other than currency notes. This may be accomplished through the programming associated with the terminal processor 74 providing the user with additional screens and options to insert deposited items through the depository 32. Such deposited items may include, for example, instruments such as checks, which can be read by a check processing and imaging device and immediately credited to user's account. Alternatively, trusted merchants may be granted the authority to input instruments to a depository through envelope deposits (or even bag deposits as later described) and to have their account credited for the deposited amount. Other deposited items such as vouchers, credit slips, or other items may also be accepted through the depository 34 and credited immediately.

Alternative forms of the invention may have the terminal processor programmed to provide a user with the option to have deposited items credited to their account or alternatively to have change dispensed in the form of bills or coin rolls. Such options may be particularly appropriate in situations where the machine includes mechanisms which both accept, identify, store and redispense currency such as shown in the incorporated disclosure of U.S. patent application Ser. No. 08/980,467. Other alternative transactions may be conducted with the apparatus 10 based on the preferences of the operator of the apparatus through appropriate programming of the terminal processor 74.

Another type of merchant banking transaction that is accomplished using the exemplary embodiment of the invention is a bag deposit. The user of the machine may select the bag deposit option by providing an input by selecting icon 330 in screen 328. In response to the selection of icon 330, the terminal processor is operative to cause a screen 398 shown in FIG. 45 to be displayed on the touch screen. Screen 398 prompts the user to enter an identifying input which input includes data representative of a deposit item, a user, an entity with which the user is associated or all of these. In the exemplary embodiment the user is prompted to input a depository bag identification number through the keypad 26. When the user has properly entered their identification number, they can so indicate by touching an icon 400. If a user makes an error and needs to re-enter their identification number, they may do so by touching an icon 402.

Figure 36:
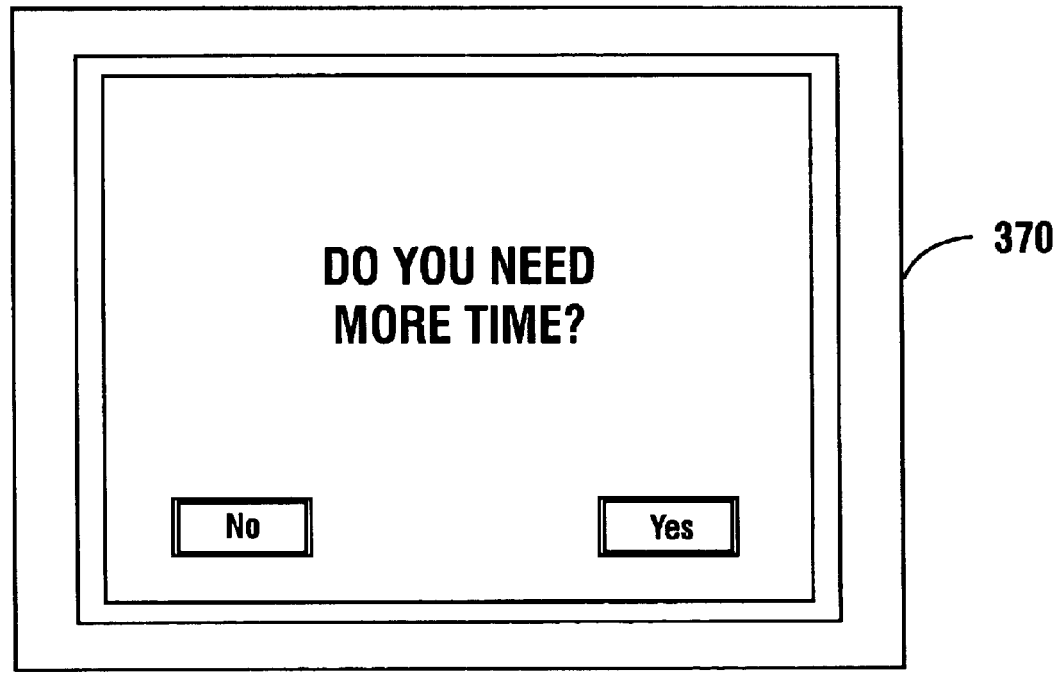

If in the course of entering the depository bag ID number or at other times a user takes too long to complete the transaction, screen 370 shown in FIG. 36 will be displayed. If the user delays beyond the predetermined time in taking any action, the transaction will be automatically canceled by the terminal processor and the screen 404 shown in FIG. 43 displayed. In addition, it should be understood that prior to the terminal processor displaying the screen 398, the terminal processor may be programmed to require the user to input a card and/or PIN to identify the user and their account. The input bag identification or other identification indicia input by the user through the input device may be compared to data in a data store to determine if there is a correlation between input data and the stored data. The correlation to stored data identifies one or more of the deposit, user, merchant or other entity with which the deposit is associated. The existence of the correlation may also be used to determine that the deposit transaction is authorized. The comparison of input data for a correlation to stored data may be made at the apparatus using data stored in a memory at the apparatus, or the comparison may be made to data stored at a remote host computer. Alternatively, the user may be identified based on inputs to other input devices such as encoded card data read by a card reader and/or an input PIN number input through a keypad. Such input data may be used to identify and determine the authority of the user. This may be done by comparing at least portions of the input data to at least portions of stored data for the existence of a corresponding relationship. The transaction is authorized responsive to the corresponding relationship being found. In systems which authorize transactions based on card and/or PIN data, a corresponding relationship for a deposit bag identification number to stored data may not necessarily be required. Various approaches to providing authority to make a deposit may be used and implemented through programming of the terminal processor.

Figure 46:
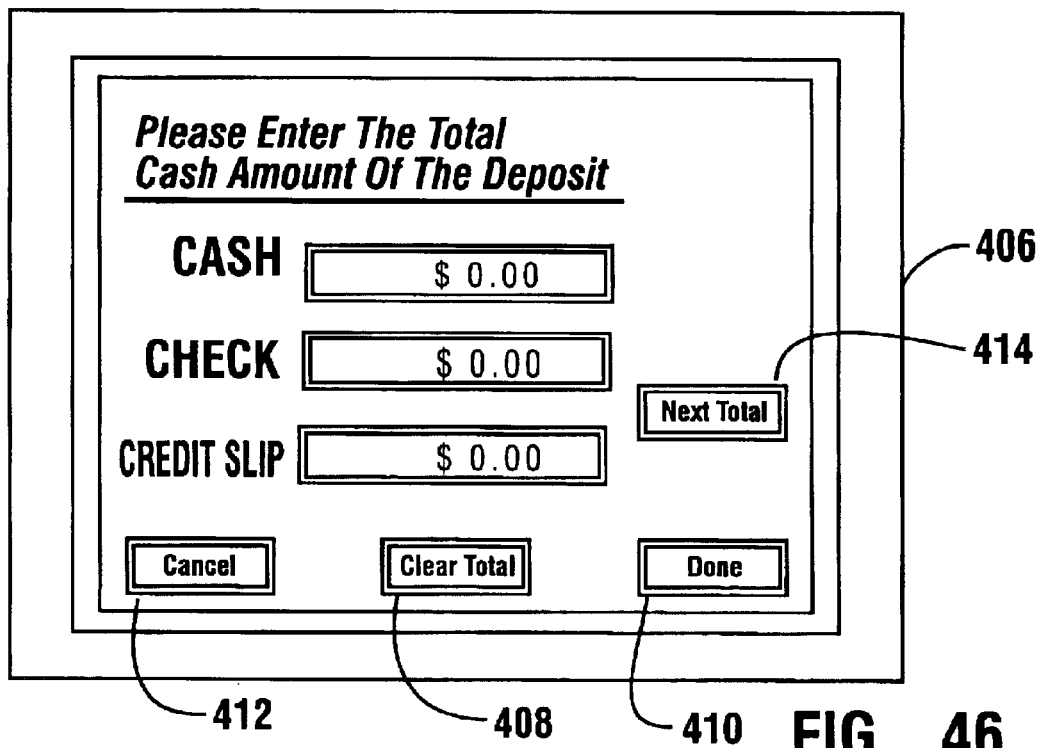

Once the user has identified themself, the deposit, the merchant account or appropriate identification as determined by the programming of the terminal either input by the bag number, input of a card and/or PIN, other data, or a combination of inputs, the terminal processor is operative to cause a screen 406 shown in FIG. 46 to be displayed. Screen 406 prompts the user to enter an amount of cash included among the items deposited in the bag deposit. The user is enabled to do this through inputs to the keypad 26. If the user makes a mistake they can clear the total by pressing an icon 408. If the deposit consists of only cash and there are no checks or credit slips included, the user can indicate this by touching the icon 410 to indicate that they are done. The user can cancel the deposit transaction by touching an icon 412. Typically, once the user has entered the total amount of cash, they can indicate the amount of other items that is included in the deposit by touching an icon 414.

Figure 47:
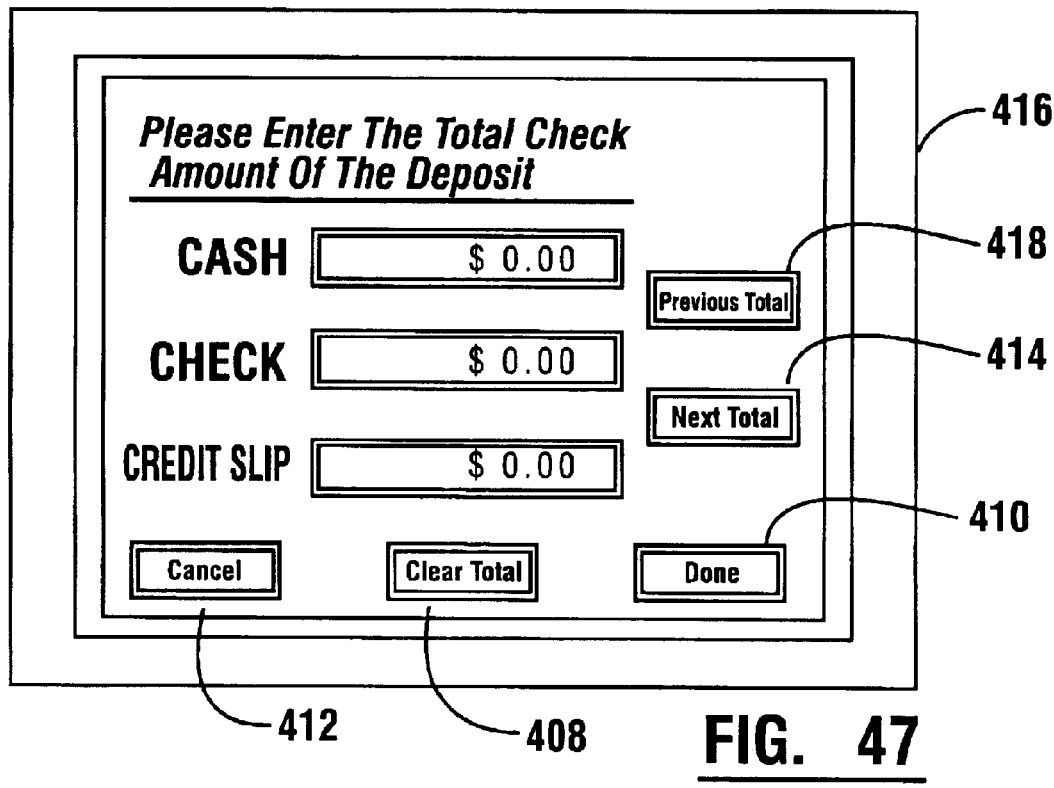

In response to touching icon 414 from screen 406, the terminal processor causes a screen 416 shown in FIG. 47 to be displayed on the touch screen. Screen 416 prompts the user to indicate an amount indicating value of checks included in the bag deposit. Screen 416 includes all of the icons from screen 406 and in addition includes an icon 418. Touching icon 418 enables the user to return to modify a previously input total such as the amount of cash included in the deposit. Once the user has input the total amount of checks included in the deposit through the keypad 26, the user may touch the "next total" icon 414 to input an amount of credit slips included in the deposit. Alternatively, if the deposit to be made includes only checks and cash, the user may so indicate by touching icon 410.

Figure 48:
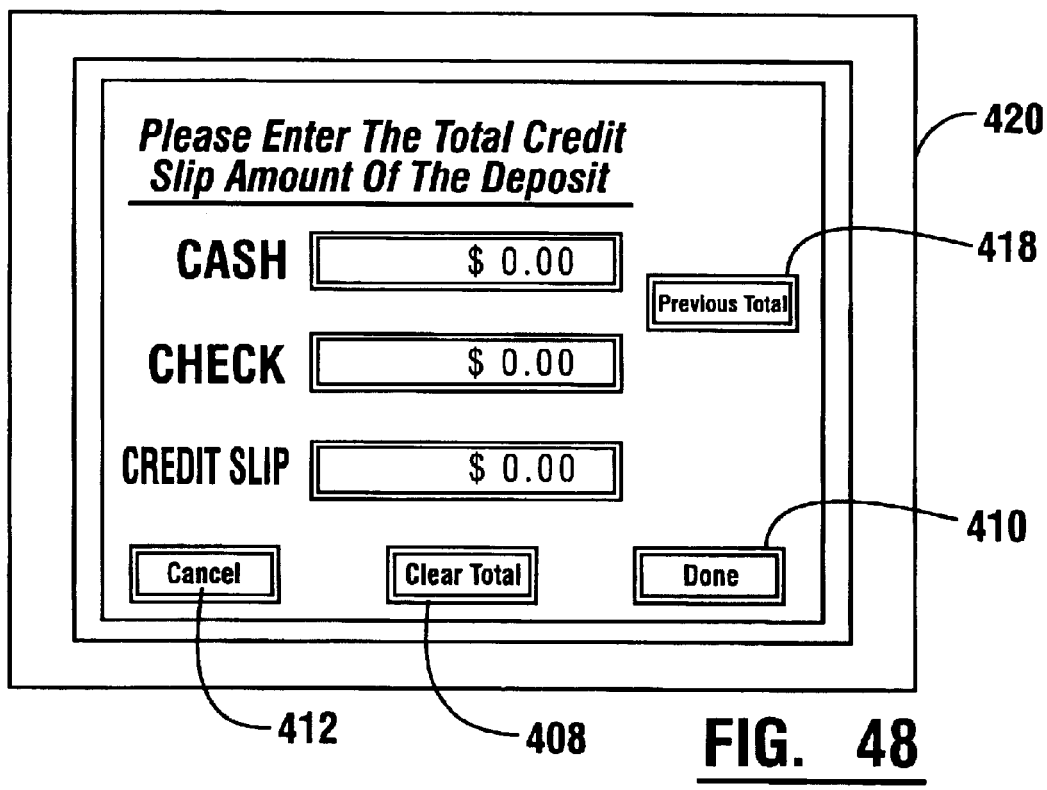

In response to touching icon 414 in screen 416, the terminal processor causes a screen 420 shown in FIG. 48 to be displayed. Screen 420 prompts the user to input a total amount of value in credit slips included in the bag deposit. Credit slips may include, for example, charge card records that the user has received from customers. Such credit slips may be included when a merchant processes credit card transactions on paper rather than electronically. Alternatively, in other embodiments, other forms of credit or charge slips may be used. The user may enter the value of the credit slips included through the keypad 26. The user may correct inputs by touching the icon 408. In addition, prior totals may be corrected by touching icon 418. If, however, the user has correctly input all of the values for cash, checks and credit slips, the user touches icon 410.

Figure 49:
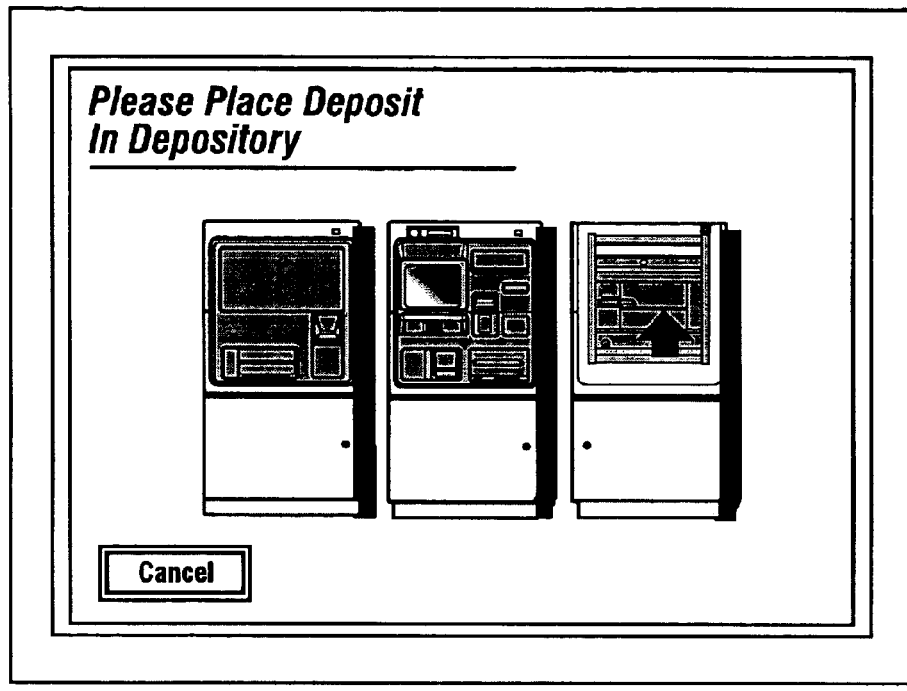
Figure 50:
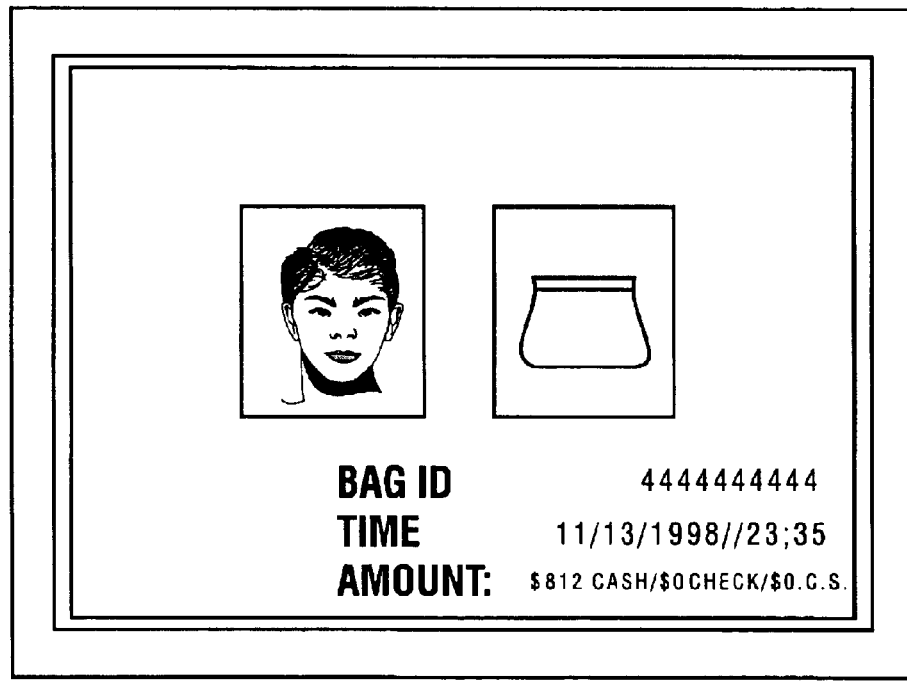

In response to the user touching icon 410, the terminal processor is operative to cause a screen 422 shown in FIG. 49 to be displayed. Screen 422 includes a graphical representation of the apparatus 10 with an arrow indicating that the user should open the bag depository door 56 in order to place the bag deposit within the head portion in the interior area of the bag depository. If when the terminal processor presents the screen 422, a user determines that they wish to cancel the transaction, they may do so by selecting a "cancel" icon in the screen. In addition, if a key is required to open the depository door screens may be presented to prompt the user to use their key to activate lock 60.

In response to sensing with a sensor that the user has opened the bag depository door 56 or that the terminal processor has displayed screen 422, or in response to other suitable sensing means, the terminal processor is operative to capture user image data from cameras 58 on the exterior of the housing portion 16 as well as an item image of the deposit item from camera 326 located in the interior area of the bag depository. Alternatively, terminal processor 14 may capture images from the cameras in response to sensing the insertion of the bag deposit through the depository door or in response to movement of the rotating mechanism 318 within the depository head. Such images may be captured concurrently or at times during the transaction steps which are timed to capture images of the user and the item the user has deposited.

Preferably the terminal processor is operative to capture images from the camera 58 and the camera 326 which show both the user and the items they have deposited. In one preferred form of the invention the terminal processor is operative to display on the touch screen display images corresponding to the images and data captured during the bag deposit transaction. In the exemplary embodiment, the terminal processor is operative to generate a screen 424 shown in FIG. 50. Screen 424 includes the user image and the deposited item, data representative of which are captured by a computer associated with the deposit accepting device and stored in memory in correlated relation or otherwise associated. Likewise, screen 424 in the exemplary embodiment includes data corresponding to the deposit such as the bag ID amount data as well as date and time information. The time information is preferably determined and caused to be displayed responsive to a clock device which tracks the current time (including date) at the deposit accepting device. The clock device is preferably operative in the terminal processor or other operatively connected computer. The time data is determined by the computer responsive to signals which correspond to execution of one of the process steps associated with the transaction. This may include for example the current time when the user image and deposit item image are captured. Alternatively, it may be the current time when the deposit item is fully secured in the interior area away from the user, or other time during the conduct of the transaction.

In the exemplary embodiment the computer operates the display to display the user image and the deposit item image to the user simultaneously. This provides the user with assurance that the deposit accepting device has recorded the fact that they made the deposit. In some exemplary embodiments the image of the user and the deposit item are captured as part of a single combined image. This may be done in analog systems through use of a frame splitter type device which records both images side by side in a storage medium. In digital systems this is accomplished by programming to layout the images within the image frame in selected areas so as not to interfere with the integrity of each image. Each associated image or the combined image may include certain of the transaction data such as time, amount, bag identification, user identification, merchant identification or other data such as a unique transaction number. Each associated image or a combined image of the user and deposit item may include a watermark of a visible or generally not visible type to provide greater assurance of the integrity of the image. Such a watermark may be imposed by the programming of the deposit accepting machine and/or may be variable with one or more of the values or information items associated with the particular transaction.

The image data corresponding to the user and the bag deposit in the exemplary embodiment is stored in a memory operatively connected to one or more computers in the machine. Such data may be stored in digital file formats (in a compressed or uncompressed forms) as well as in analog formats and/or on tape. The storage of image and/or transaction data may be accomplished under the control of the terminal processor 74 or other connected computers operating in connection the machine to capture and store such data. In addition or in the alternative, such captured image and/or transaction data may also be accessed through a server operating on the apparatus 10, through the network 116 and delivered to other servers in the network. As previously mentioned, the ability to remotely access image data from a remote computer enables merchants to verify the making of such deposits as well as the item that is deposited. In addition or in the alternative, bag deposits which employ tamper-indicating seals or the like may be employed to indicate that a bag has been deposited with such a seal in place. If, for example, at a later date when the bag is opened, a broken tamper seal is uncovered, image data may be accessed to provide an indication if such tamper-indicating seal was installed and its condition at the time of deposit. Other security procedures may be used which may be useful in tracking the source of shortages or losses which occur with respect to deposited items.

In other embodiments contact or noncontact type identifying indicia, such as bar code, "Dallas" chips, inductance type tokens, holograms and other programmable or nonprogrammable indicia may be included on deposited items. Such indicia may be read by appropriate reading devices on (including inside) the deposit accepting device to aid in tracking the deposits for example such indicia may include indicia corresponding to one or more of the deposit bag ID, the user making the deposit, the merchant, the amounts of various types of items in the deposit or other information. This information may be read by an appropriate reading device or devices on or inside the deposit accepting machine. The use of such indicia and readers can shorten the time a user spends at the machine. For example in such cases at least some and perhaps all user inputs for the transaction would be provided form the indicia on the deposit item. In some cases where the indicia is programmable, the media for the indicia can be cleared by the deposit receiving institution after the deposit is verified so the deposit carrier such as a bag may be reused. Alternatively, the indicia may be input by a user through a handheld or portable device which communicates with the deposit accepting machine through a contact or noncontact connection. In such situations the handheld or portable device may be preprogrammed by the person making the deposit or by others, with the necessary data. This enables the user to quickly input to the deposit accepting device data that may be needed or desired. It should be understood that deposit items may have various forms and indicia carrying capabilities in various embodiments of the invention.

It should also to be understood that in the exemplary embodiment, in addition to capturing images from camera 58 and camera 326, during deposit transactions, additional images may be captured during the course of transactions conducted at apparatus 10. For example, camera 28 in housing portion 12 may be actuated at various times during the course of transactions to capture images from users of the apparatus. Such images may be stored in one or more data stores in association with corresponding transaction data related to transactions conducted by users. Such transaction data may be captured and stored by terminal processor 74 or other connected processors, computers or devices which are capable of capturing and storing image and transaction data. As previously discussed, certain exemplary embodiments of the invention may operate to capture and store transaction data in the manner of the AccuTrack™ digital video recording and playback system commercially available from Diebold, Incorporated of North Canton, Ohio or described in U.S. patent application Ser. No. 60/103,371 filed Oct. 9, 1998, the disclosure of which is incorporated herein by reference. Of course, in other embodiments other procedures and approaches may be used.

Figure 51:
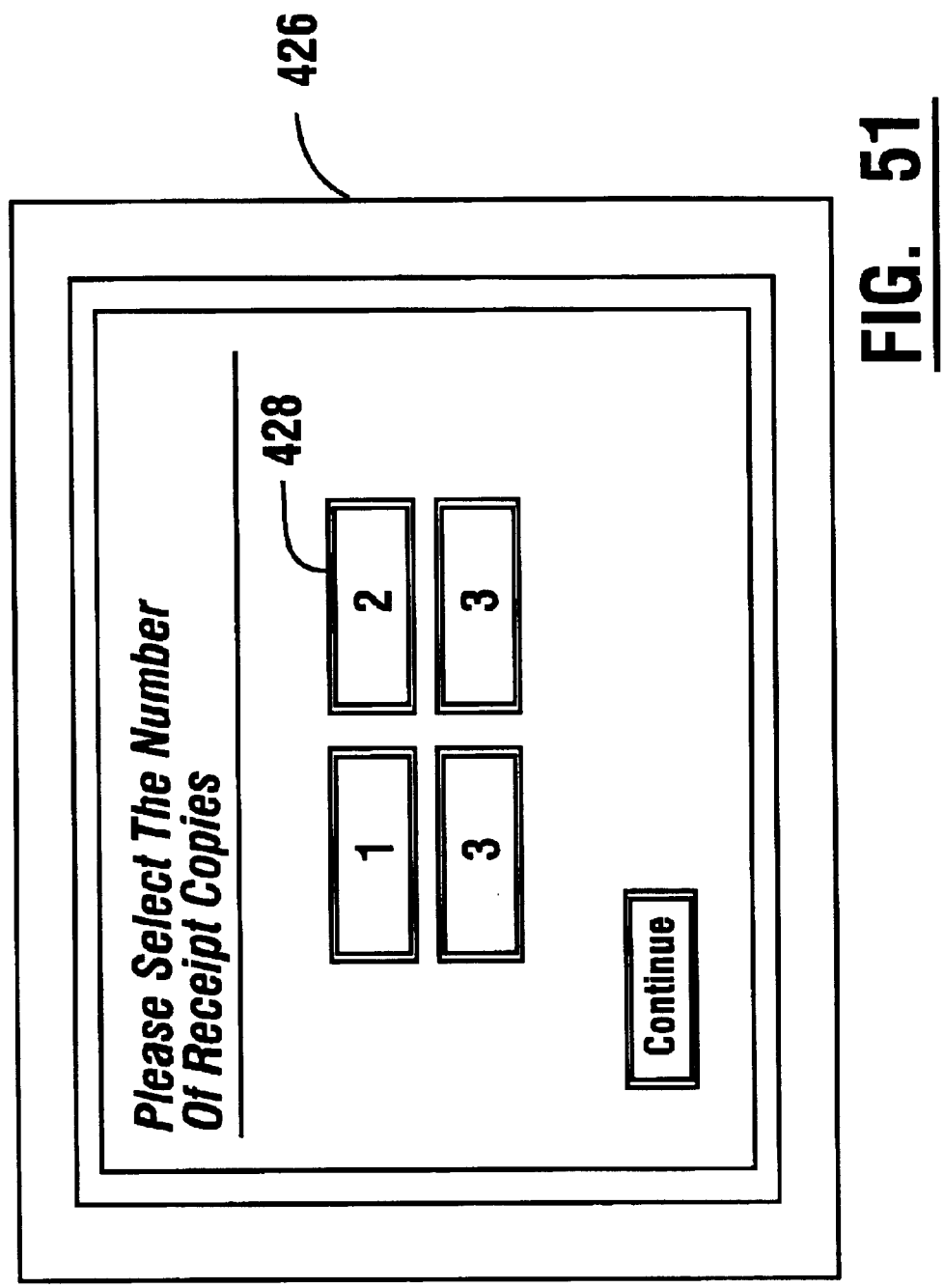

Returning to the description of a bag deposit and the transaction logic associated therewith, the terminal processor in the exemplary embodiment is operative to cause a screen 426 shown in FIG. 51 to be produced on the touch screen after the bag deposit has been made. Screen 426 in the described embodiment is identical to screen 374 and prompts the user to indicate the number of receipt copies they wish to receive by touching icon 428. As previously discussed, a user may wish to have several deposit receipt copies for purposes of tracking and documenting deposits. Deposit receipts may include machine readable indicia as well as human readable indicia for purposes of facilitating the tracking of deposit transactions.

Figure 52:
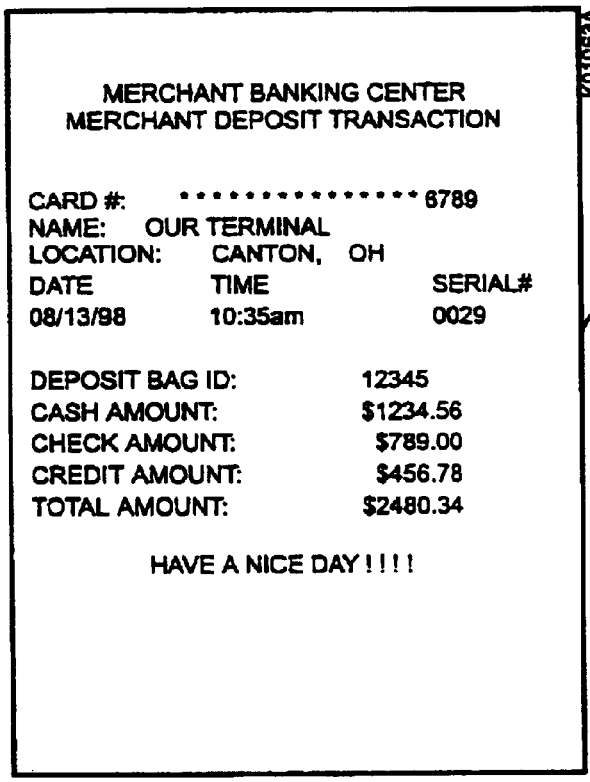
FIG. 52 is an exemplary deposit transaction receipt provided by the apparatus shown in FIG. 1 in connection with a bag deposit transaction.

FIG. 52 shows an exemplary receipt 430 for a deposit transaction. Deposit transaction receipt 430 indicates information regarding the bag deposit transaction including the time and date, bag identification numbers, one or more amounts, terminal, location, card number (if used), and serial number of the transaction. Of course, other information may also be included including machine readable information. The number of receipts requested by the user are produced by the machine responsive to the user input and provided to the user.

Figure 53:
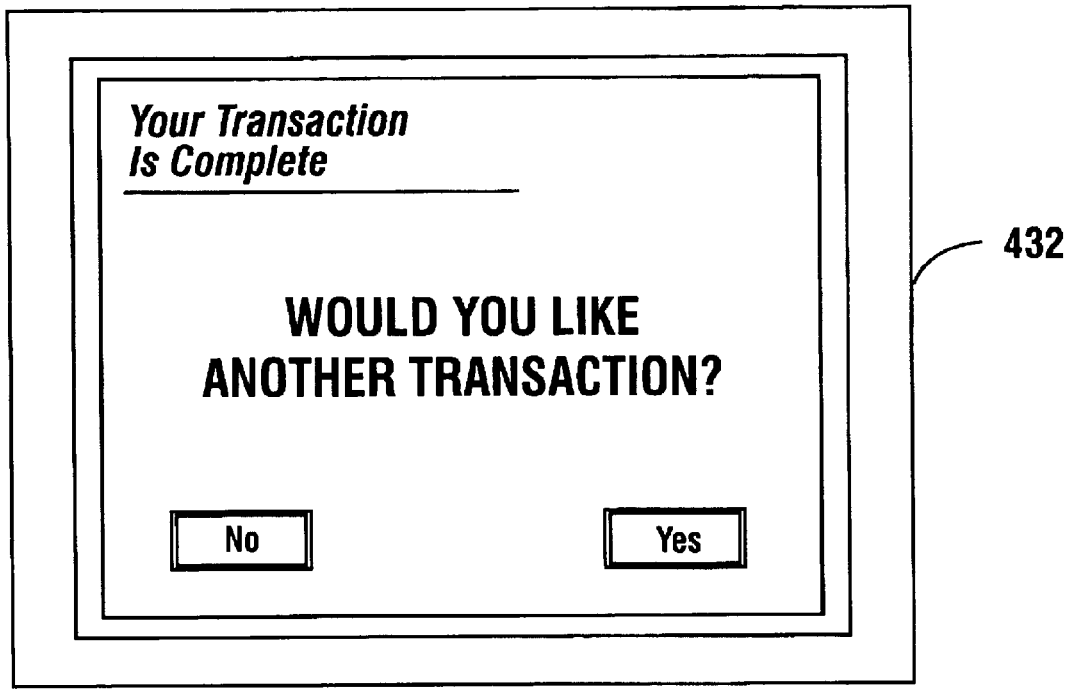
Figure 54:
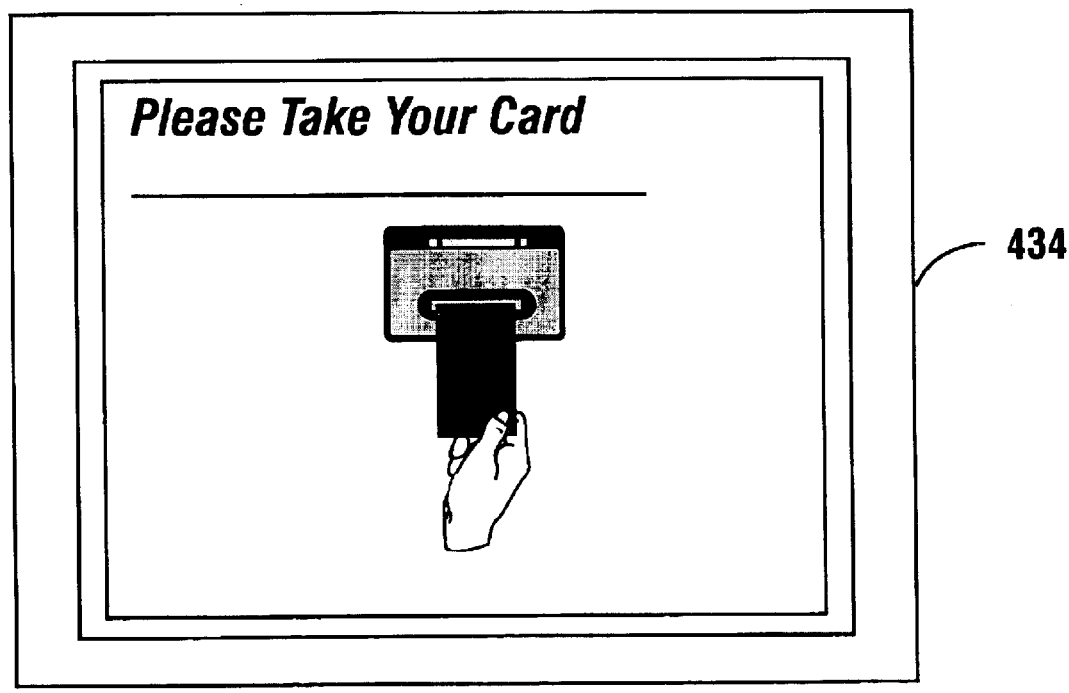

After completing the transaction concerning the bag deposit, the terminal processor is operative to cause a screen 432 shown in FIG. 53 to be displayed. Screen 432 prompts the user to indicate whether they wish to have another transaction conducted. If the user selects the icon which indicates they wish to have another transaction, the terminal processor returns the control logic sequence to the point where screen 328 is displayed. If the user indicates that they do not wish to have another transaction, the appropriate closing screens such as those previously discussed, are caused to be displayed by the terminal processor. In addition, if the transaction conducted is a card-based transaction in which a user has input a card, the terminal processor will cause a screen 434 shown in FIG. 54 to be output on the touch screen to remind the user to take their card.

It should be understood that the logic flow associated with the transaction screens described herein is exemplary. In other embodiments of the invention other or additional transaction screens may be presented. The inclusion of additional transaction function devices in the apparatus 10 may also require the terminal processor to output additional or different screens and to carry out other logic flows in order to prompt users in the operation thereof.

The exemplary embodiment of the automated merchant banking apparatus further enables authorized users of the machine to access the information stored in the data store 76 concerning transactions conducted at the machine. Such information may be recovered by users of the machine who are authorized to recover such information from the data store. In addition or in the alternative, such information may be reviewed or recovered by other authorized users operating terminals connected to the network 16. Such authorized remote users are enabled by accessing such data to monitor the overall operation of the merchant banking apparatus including the amounts it has received from and dispensed to merchants. In addition merchants themselves may be authorized to access data corresponding to their own transactions as well as corresponding image and account data so they may track activities regarding their account.

Figure 55:
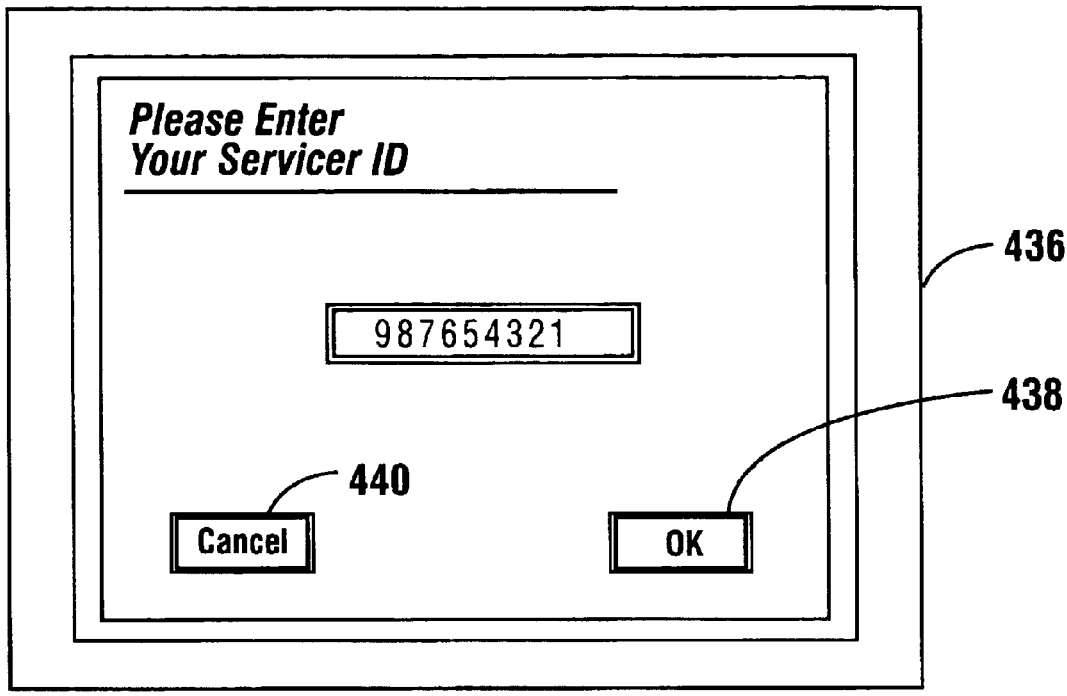
FIGS. 55–56 are exemplary screen displays output by the apparatus shown in FIG. 1 or a remote computer presented in connection with accessing data concerning transactions conducted at the apparatus shown in FIG. 1.
Figure 56:
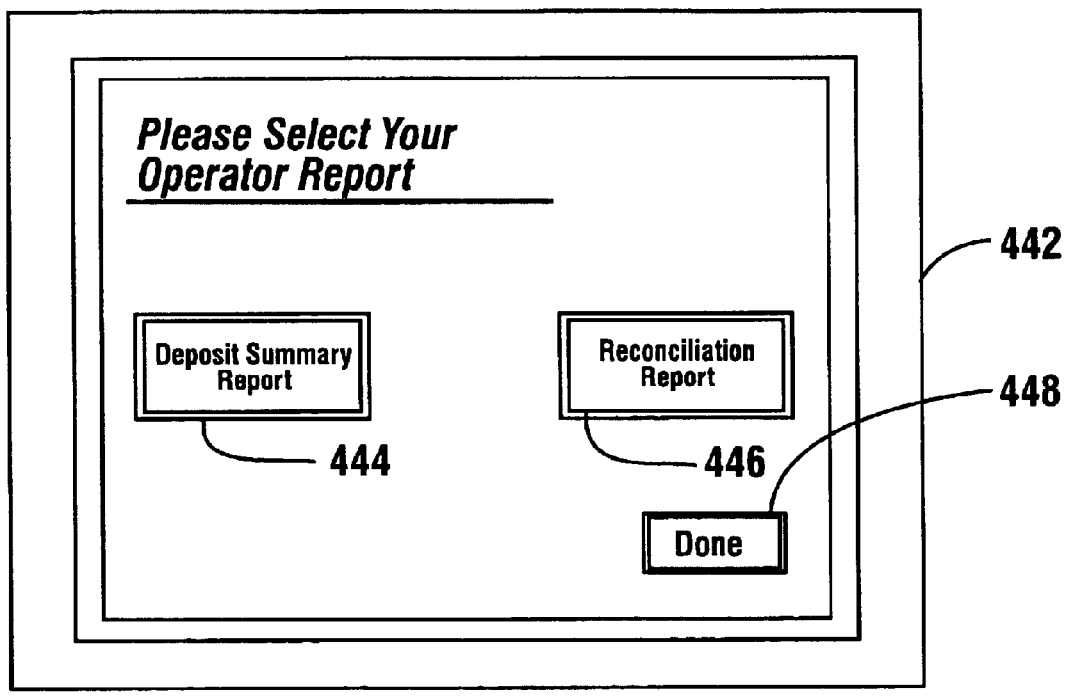

In the exemplary embodiment, authorized servicers are enabled to access data from the data store 76. This process is initiated by inserting a card with special servicer data into the card reader of the machine. The programming associated with the terminal processor responds to reading the indicia encoded on such card. The touch screen displays a screen 436 shown in FIG. 55. Screen 436 prompts the servicer to enter through the keypad 26 a servicer ID which in addition to their card identifies them as an authorized servicer who is permitted to recover data from the data store 76. If the user has properly entered their ID they touch an icon 438. If the servicer makes an error in entering the ID, they touch an icon 440 to cancel. If the identification number entered by the servicer corresponds to the card data as determined by the programming associated with the terminal processor, a screen 442 shown in FIG. 56 is displayed. In the screen 442 the user is presented with the option of printing a deposit summary report represented by an icon 444, as well as the option of printing a reconciliation report as represented by the icon 446. The user also has the option from screen 442 of touching an icon 448 to indicate that they have completed their activities.

If the user touches the icon 446 in response to screen 442, a reconciliation report is printed by the printer 24. An exemplary reconciliation report 450 is shown in FIG. 57. The reconciliation report indicates change dispensed, change available, currency accepted and miscellaneous totals, currency accepted and currency available. The reconciliation report also indicates fees assessed. Reconciliation report is useful for verifying the amount of currency and coin in the machine and for determining whether action is needed to either remove currency from or place additional coin or currency in the machine.

After the reconciliation report is printed, the terminal processor is operative to return to screen 442. If the servicer selects icon 444 from screen 442 a deposit summary report is printed by the printer 24. An example of the deposit summary report 452 is shown in FIG. 59. The deposit summary report 452 includes a summary of deposits that have been made into the apparatus 10. Summary report 452 includes only the total amount of deposits made.

Alternative embodiments of the invention may also be operative to print detailed reports of transactions conducted at the machine. For example, authorized servicers or persons with local or remote authorized access to data store 76 may access a detailed transaction log of all the different transactions conducted at the apparatus. Such reports may include, for example, a detailed transaction report such as report 454 shown in FIG. 58. Such a report may show selected or all details concerning deposit transactions or other types of transactions that have been conducted.

In addition to printing the various reports through the printer at the machine, embodiments of the invention may provide the capability of loading transaction reports or records in machine readable form. This may be done, for example, by recording data on a recording medium such as a smart card inserted into the card reader. Alternatively, such transaction logs may be recorded onto a computer disc, CD, or other recording medium that is inserted into an appropriate recording device on or in connection with the apparatus 10. Information regarding transactions conducted may be recorded on the recording medium for later analysis by appropriate personnel.

In the exemplary embodiment of the invention, authorized users operating terminals connected to the network 16 may be authorized to obtain information from data store 76 concerning the transactions that have been conducted. These may include, for example, terminals operated by employees of the entity which owns apparatus 10 and which tracks account activities by all of the users thereof. In the alternative, merchants themselves may be authorized to gain access to the network 116 and may access the stored data corresponding to their particular transactions. Of course, it should be understood that the transaction reports shown herein are exemplary and various types and formats of reports may be produced.

The merchant banking apparatus and its method of operation described in this exemplary embodiment of the present invention enables merchants to carry out banking transactions which are not achievable using conventional automated teller machines. The described embodiment of the present invention provides for attending to the needs of merchants and provides more convenient banking hours for merchants. In addition, the exemplary embodiment provides for carrying out merchant transactions with heightened levels of security and with provisions for closely monitoring and tracking such transactions in a manner commensurate with the increased amount of value such transactions may involve.

Thus the exemplary embodiment of the merchant banking apparatus and method of the present invention achieves the above-stated objectives, eliminates difficulties encountered in the use of prior devices and systems, solves problems and attains the desirable results described herein.

In the foregoing description certain terms have been used for brevity, clarity and understanding. However, no unnecessary limitations are to be implied therefrom, because such terms are for descriptive purposes and are intended to be broadly construed. Moreover, the descriptions and illustrations herein are by way of examples and the invention is not limited to the exact details shown and described.

In the following claims, any feature described as a means for performing a function shall be construed as encompassing any means capable known to those skilled in the art to be capable of performing the recited function and shall not be limited to the structures or methods shown herein or mere equivalents thereof.

Having described the features, discoveries and principles of the invention, the manner in which it is constructed and operated, and the advantages and useful results attained, the new and useful structures, devices, elements, arrangements, parts, accommodations, systems, equipment, operations, methods and relationships are set forth in the appended claims.

We claim:

1. A method comprising the steps of:
   (a) capturing a user image of a user with an external area imaging device, wherein the external area imaging device has a field of view including an exterior area outside of a deposit accepting machine;
   (b) capturing an item image of a deposit item placed inside the deposit accepting machine with an interior area imaging device, wherein the interior area imaging device has a field of view including an interior area inside the deposit accepting machine;
   (c) displaying the user image and the item image to the user through a display operatively connected to the deposit accepting machine.

2. The method according to claim 1 wherein in step (c) the user image and the item image are simultaneously displayed through the display.

3. The method according to claim 2 wherein the user image and item image are displayed as a single combined image, and further comprising the step of storing the single combined image in a storage device.

4. The method according to claim 1 and further comprising the step of:
   storing the user image and the item image in associated relation in a storage device.

5. The method according to claim 4 wherein the storage device is in operative connection with a server, and Her comprising the step of accessing at least one of the item image and the user image from a remote computer through the server.

6. The method according to claim 1 wherein the deposit accepting machine includes an access opening, wherein a movable door selectively enables access to the interior area through the access opening, and wherein in step (a) the user image is captured responsive to the user moving the door to a position opening the access opening.

7. The method according to claim 1 wherein the deposit accepting machine includes an access opening to the interior area, wherein the deposit item is passed to the interior area through the access opening, and wherein the deposit accepting machine includes an item transport extending in the interior area, and prior to step (b) fierier comprising the step of:
   moving the deposit item away from the access opening with the item transport to a
   first internal area wherein the deposit is not accessible through the access opening,
   and wherein the image of the deposit item in step (b) is captured when the deposit
   item is in the first internal area.

8. The method according to claim 7 wherein the interior area of the deposit accepting machine further includes a second internal area, wherein the deposit item is stored in the interior area in the second internal area, and subsequent to step (c) flintier comprising the step of passing the deposit item from the first internal area to the second internal area.

9. The method according to claim 1 and further comprising the steps of:
   receiving a user input from the user through at least one input device in operative
   connection with the deposit accepting machine;
   comparing through operation of a computer, data corresponding to at least a
   portion of the user input to data stored in a data store for a corresponding
   relationship;
   enabling the user to access the interior area to place the deposit item therein
   responsive to the input data and stored data having a corresponding relationship.

10. The method according to claim 9 wherein the user input received includes a deposit bag identifier.

11. The method according to claim 9 wherein the input device includes a keypad, and wherein the input received includes a deposit bag identification number input through the keypad.

12. The method according to claim 9 wherein the input device includes a card reader and the input received includes data encoded on a card.

13. The method according to claim 9 wherein the user input further includes amount data representative of an amount associated with the deposit item, and wherein in step (c) the amount is displayed through the display with the user image and the item image.

14. The method according to claim 13 and feather comprising the step of storing data representative of the amount, user image and item image in associated relation in a storage device.

15. The method according to claim 14 wherein in the storing step the amount, user image and item image are stored as a single combined image in the storage device.

16. The method according to claim 14 wherein the computer is in operative connection with a clock device, and further comprising recording at least one current time during execution of at least one of the method steps, and wherein in the storing step data representative of the recorded current time is stored in associated relation with the amount, user image and item image.

17. The method according to claim 16 wherein the storage device is in operative connection with a server, and further comprising the steps of accessing with a remote computer through the server the associated stored data representative of the recorded time, amount, user image and item image.

18. The method according to claim 9 wherein the user input further includes data representative of a first amount of a first type item included in the deposit item and a second amount of a second type item included in the deposit item, and wherein in step (c) the first amount and the second amount are displayed with the user image and the item image.

19. The method according to claim 9 and further comprising the steps of:

presenting on the display a prompt message for a user to input a receipt number corresponding to a number of receipts to be provided;

receiving from a user a receipt number input through an input device operatively connected to the deposit accepting machine;

providing with a receipt delivery device operatively connected to the deposit accepting machine, a number of receipts corresponding to the receipt number input by the user.

20. The method according to claim 19 wherein the receipt delivery device includes a printer, wherein in the providing step the printer is operative to print the number of receipts, wherein each receipt includes indicia corresponding to the amount.

21. An apparatus including the deposit accepting machine, external area imaging device, the internal area imaging device, and the display recited in claim 1, operated responsive to a computer to perform the method steps recited in claim 1.

22. A method comprising;

(a) depositing an item inside a deposit accepting a machine;

(b) capturing an image of the deposited item inside the deposit accepting machine with an imaging device;

(c) displaying an image of the deposited item through a display operatively connected tote deposit accepting machine;

(d) capturing a depositor image of a depositor with an imaging device;

(e) displaying the depositor image through the display.

23. The method according to claim 22 comprising simultaneously displaying the depositor image and the item image through the display.

24. The method according to claim 23 and further comprising receiving a depositor input through at least one input device in operative connection with the deposit accepting machine, wherein the input includes data associated with the item in (a); and simultaneously displaying the data, the depositor image, and the item image through the display.

25. The method according to claim 22 wherein the item image capturing device has a field of view including an interior area inside the deposit accepting machine, and wherein the depositor image capturing device has a field of view including an exterior area outside of a deposit accepting machine.

26. A method comprising:

(a) receiving a depositor input through at least one input device in operative connection with a deposit accepting machine, wherein the input includes data associated with a deposit item;

(b) depositing the deposit item inside the deposit accepting machine;

(c) displaying the data, a depositor image, and an image of the deposited item through a display operatively connected to the deposit accepting machine.

27. The method according to claim 26 wherein (c) includes simultaneously displaying the data, the depositor image, and the deposited item image through the display.

* * * * *